(12) United States Patent  (10) Patent No.: US 6,252,538 B1
Chignell  (45) Date of Patent: Jun. 26, 2001

(54) UNDERGROUND PIPE LOCATING SYSTEM

(76) Inventor: Richard J. Chignell, Langham Park, Catteshall Lane, Godalming, Surrey GU7 1NG (GB)

( * ) Notice: Subject to any disclaimer, the term of this patent is extended or adjusted under 35 U.S.C. 154(b) by 0 days.

(21) Appl. No.: 09/117,271

(22) PCT Filed: Jan. 24, 1997

(86) PCT No.: PCT/GB97/00214

§ 371 Date: Nov. 13, 1998

§ 102(e) Date: Nov. 13, 1998

(87) PCT Pub. No.: WO97/27496

PCT Pub. Date: Jul. 31, 1997

(30) Foreign Application Priority Data

Jan. 25, 1996 (GB) .................................................. 9601528

(51) Int. Cl.⁷ .............................. G01S 13/88; G01V 3/12
(52) U.S. Cl. ............................................. 342/22; 342/195
(58) Field of Search ............................... 342/22, 27, 191, 342/192, 195, 25, 196

(56) References Cited

U.S. PATENT DOCUMENTS

| | | | |
|---|---|---|---|
| 5,327,139 | * 7/1994 | Johnson | 342/22 |
| 5,557,283 | * 9/1996 | Sheen et al. | 342/179 |
| 5,673,050 | * 9/1997 | Moussally et al. | 342/22 |
| 5,829,437 | * 11/1998 | Bridges | 128/653.1 |
| 5,900,833 | * 5/1999 | Sunlin et al. | 342/22 |

FOREIGN PATENT DOCUMENTS

0316148A2 * 5/1989 (GB) .............................. G01S/13/90

OTHER PUBLICATIONS

"Radar modeling of a boreal forest", Chauhan, N.S.; Lang, R.H.; Ranson, K.J., Geoscience and Remote Sensing, IEEE Transactions on vol.: 29 4, Jul. 1991, pp.: 627–638.*

"Single frequency, single polarization SAR data inversion based on a Kalman filter approach", De Carolis, G.; Mattia, F.; Pasquariello, G.; Posa, F., Geoscience and Remote Sensing Symposium, 1993. IGARSS '93.Better Understanding of Earth Environment., Int.*

"Multi–stand radar modeling from a boreal forest: Results from the BOREAS Intensive Field Campaign—1993", Chauhan, N.; Lang, R.; Ranson, J.; Killic, O., Geoscience and Remote Sensing Symposium, 1994. IGARSS '94. Surface and Atmospheric Remote Sensing: Tech.*

"High resolution ISAR radar for nondestructive testing", Dube, F.N.; Devlin, J.C., AFRICON, 1996., IEEE AFRICON 4th vol.: 2, 1996 , pp.: 897–902 vol.2.*

"Synthetic aperture radar image reconstruction algorithms designed for subsurface imaging", Gough, P.T.; Hunt, B.R., Geoscience and Remote Sensing, 1997. IGARSS '97. Remote Sensing—A Scientific Vision for Sustainable Development., 1997 IEEE Internationa.*

"Detection of buried plant", Osumi, N.; Ueno, K., Radar and Signal Processing [see also IEE Proceedings—Radar, Sonar and Navigation], IEE Proceedings F vol.: 135 4, Aug. 1988, pp.: 330–342.*

* cited by examiner

Primary Examiner—John B. Sotomayor
(74) Attorney, Agent, or Firm—Paul J. Sutton

(57) ABSTRACT

A system for locating and identifying underground pipes, utilizing a ground-probing radar. The ground-probing radar system includes an antenna module and a transmit/receive sub-system. The system also includes a digital signal processing sub-system for processing the received signal to extract data corresponding to detected differences in dielectric constant and a master controller. The system still further includes a positioning sub-system, a display sub-system, a user interface and a data storage mechanism, display data and said operating parameters.

53 Claims, 91 Drawing Sheets

FIG. 2B

| | MAP MODE | PROCESS OPTIONS 1 | PROCESS OPTIONS 2 | CONFIRM EXIT | SELECT SITE | DATA |
|---|---|---|---|---|---|---|
| EXIT | | | | | | |
| | | MORE | ▽○△ | ✈ | | ❋❋ |
| | | ⌐ | ⇨E | | | MAP |
| | | ╲ | ⇦E | | ↘ | |
| | | | ↻⇩ | | | ⇨ |
| | ⇨ | ⇨ | ↻⇨ | | ⇨ | ⇦ |
| | ⇦ | ⇦ | ↻⇦ | ↗ | ⇦ | 📄 |
| | 6 | 7 | 8 | 9 | 11 | 12 |

FIG. 2C

| | MAP MODE | PROCESS OPTIONS 1 | PROCESS OPTIONS 2 | SURVEY START | SURVEY STOP | TOOLS |
|---|---|---|---|---|---|---|
| | EXIT | EXIT | EXIT | EXIT | EXIT | EXIT |
| | | MORE | ◯▽△ | M/ft | | |
| | | | E⇨ | C | | ⇳ |
| | | ≤ | E⇦ | B | | ∿ Ave |
| | | | ⌒⇩ | A | | ∿ |
| | ⇨ | ⇨ | ⌒⇨ | + | | ? |
| | ⇦ | ⇦ | ⌒⇦ | △ | ▨ | 🔧 |
| | 13 | 14 | 15 | 20 | 21 | 22 |

FIG. 2D

| | A | B | C | D | M/ft | EXIT ↗ | |
|---|---|---|---|---|---|---|---|
| ⇕ | | | | | | | 23 DATA COLLECTION OPTIONS |
| | | | | | | EXIT ↗ | 24 MONITOR TEMPERATURES |
| ▨ | | | | | | EXIT ↗ | 25 MONITOR RAW WAVEFORMS |
| ▨ | | | | | | EXIT ↗ | 26 MONITOR AVERAGED WAVEFORMS |
| ⇩ | ⇧ | | | ↙ | | EXIT ↗ | 27 ADJUST SAMPLING WINDOW |

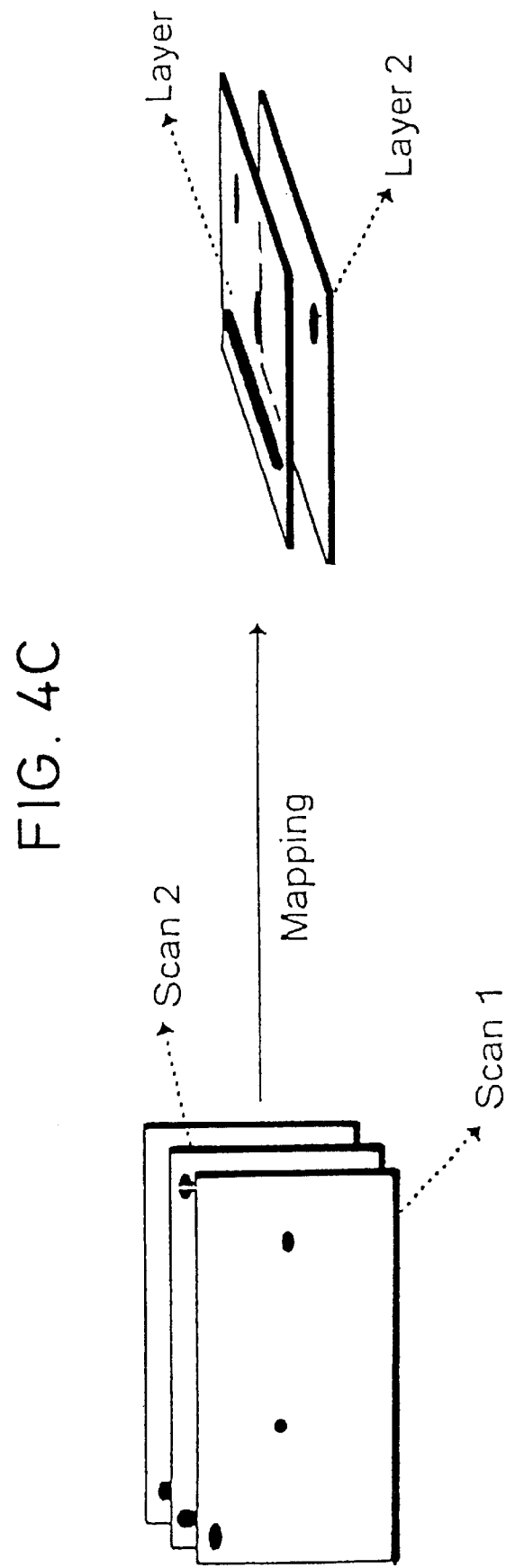

FIG. 4D
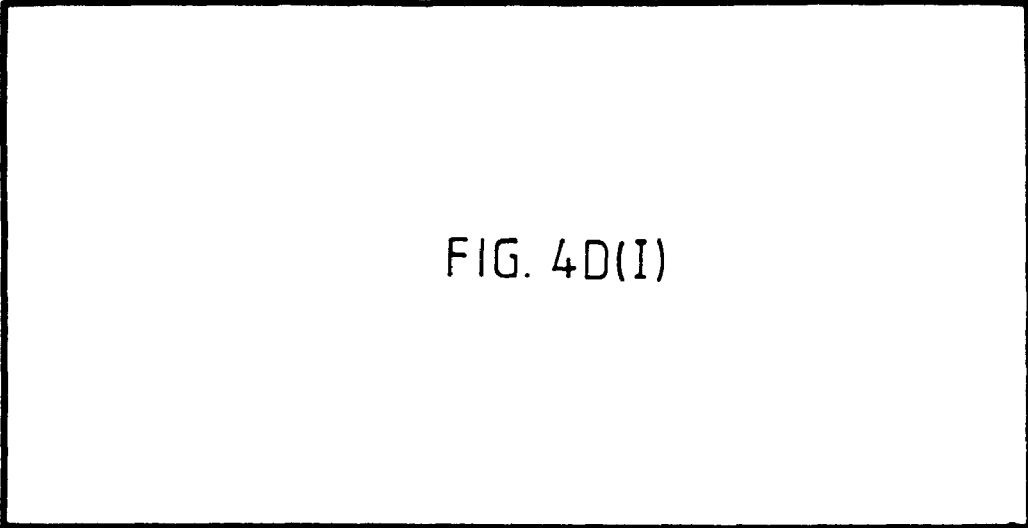
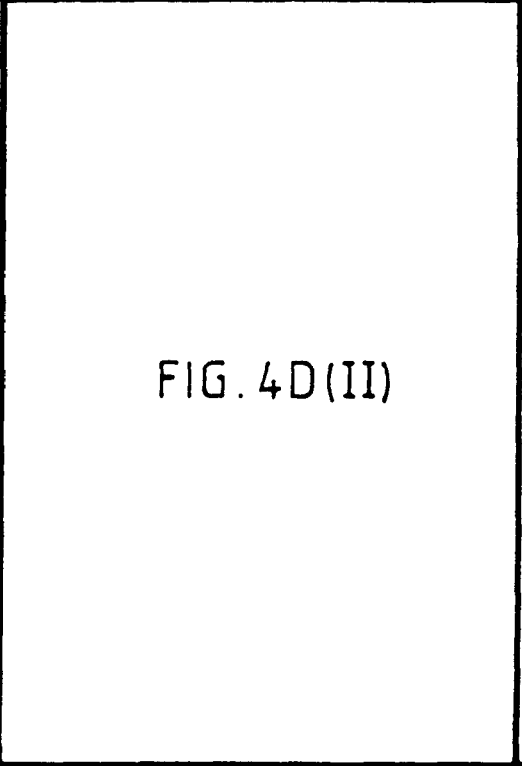
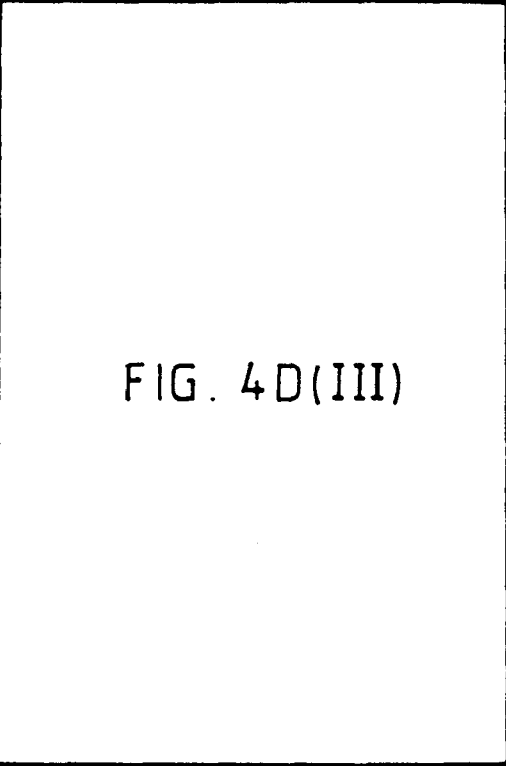

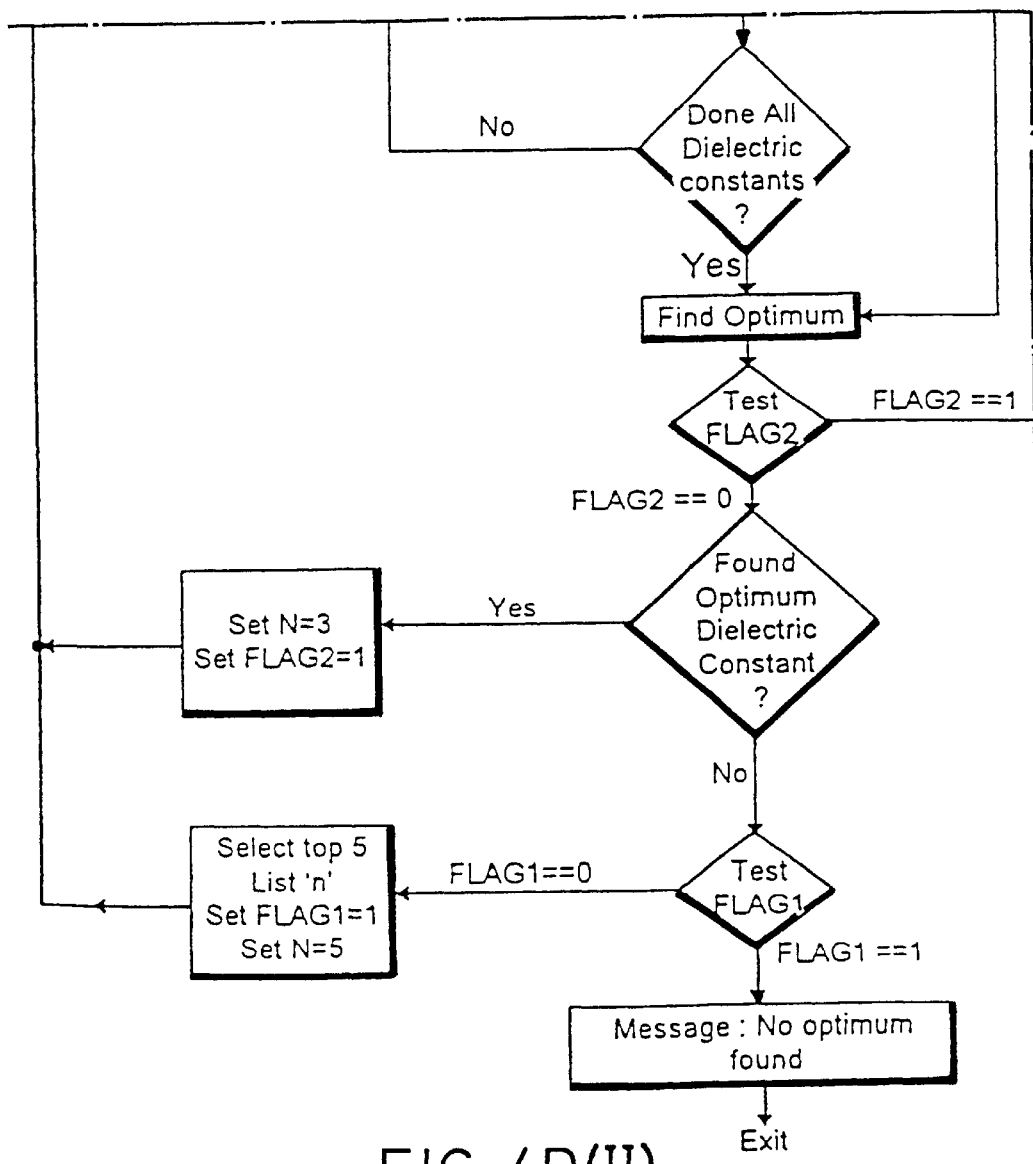
FIG. 4D(II)

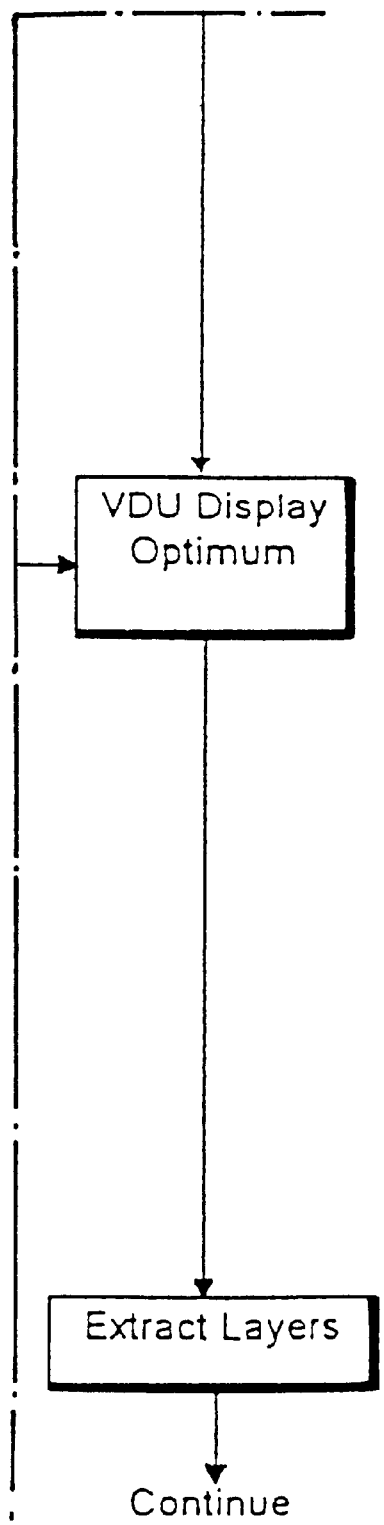
FIG. 4D (III)

IMAGE SPACE

ACCUMULATOR SPACE

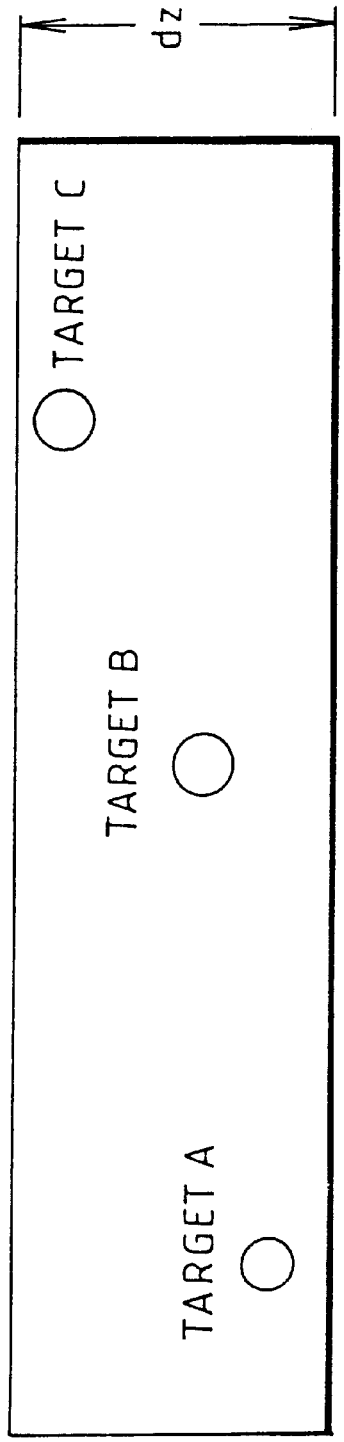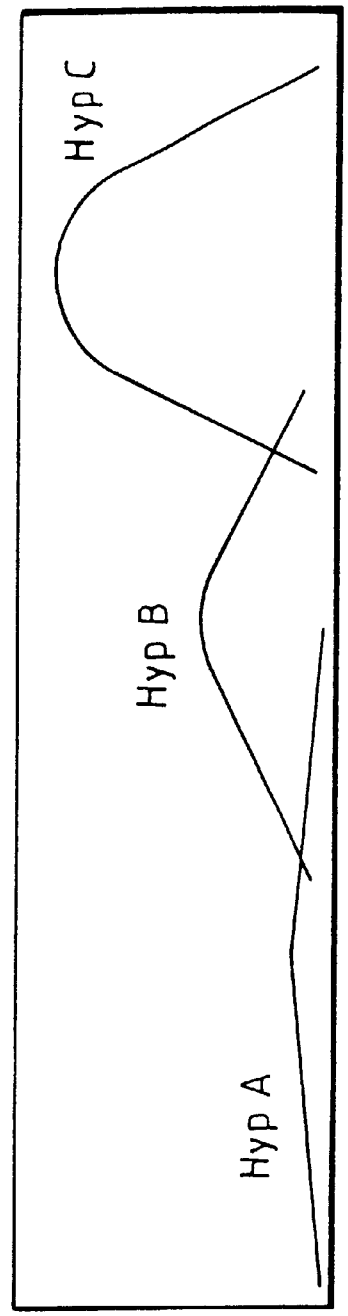

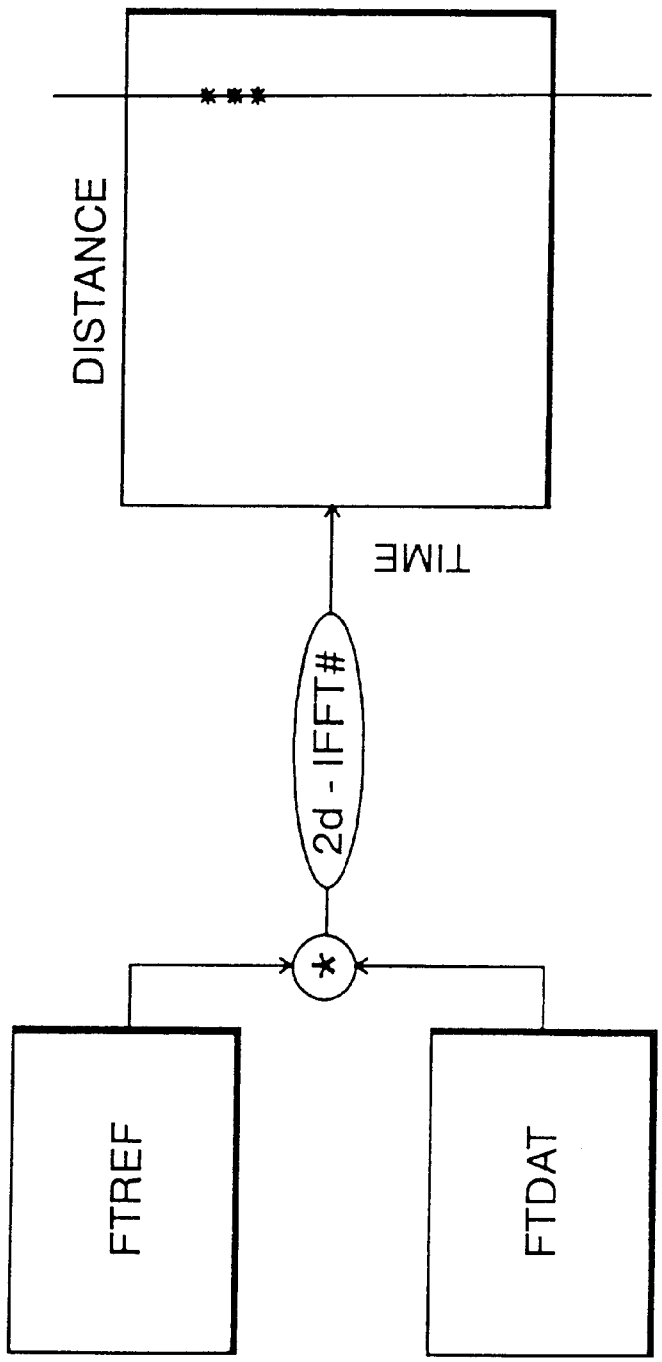
FIG. 15
FIG. 16

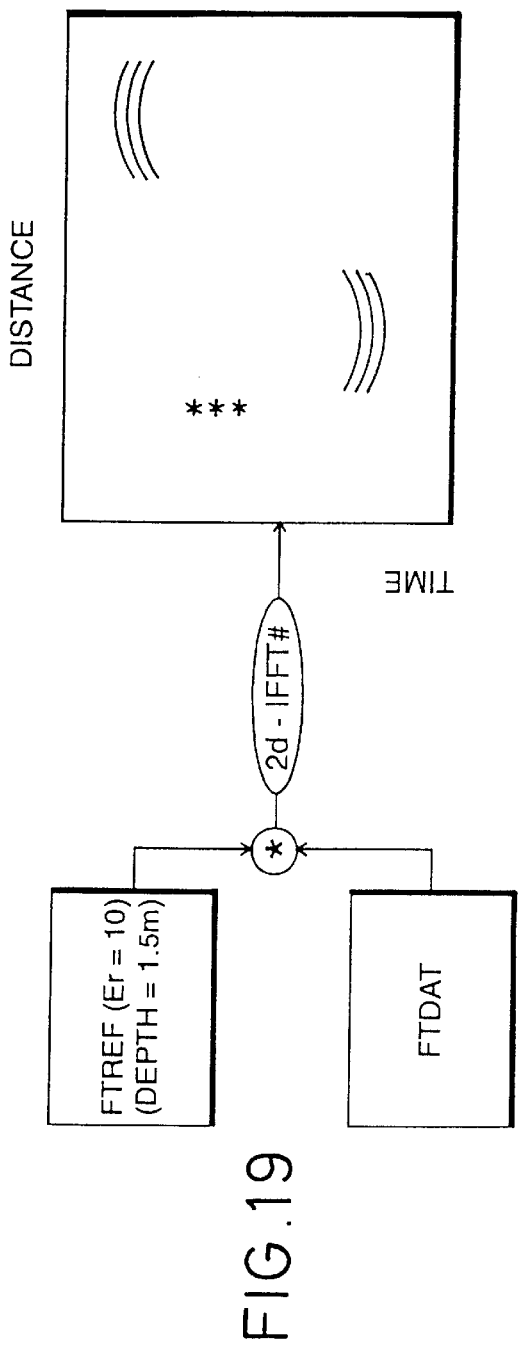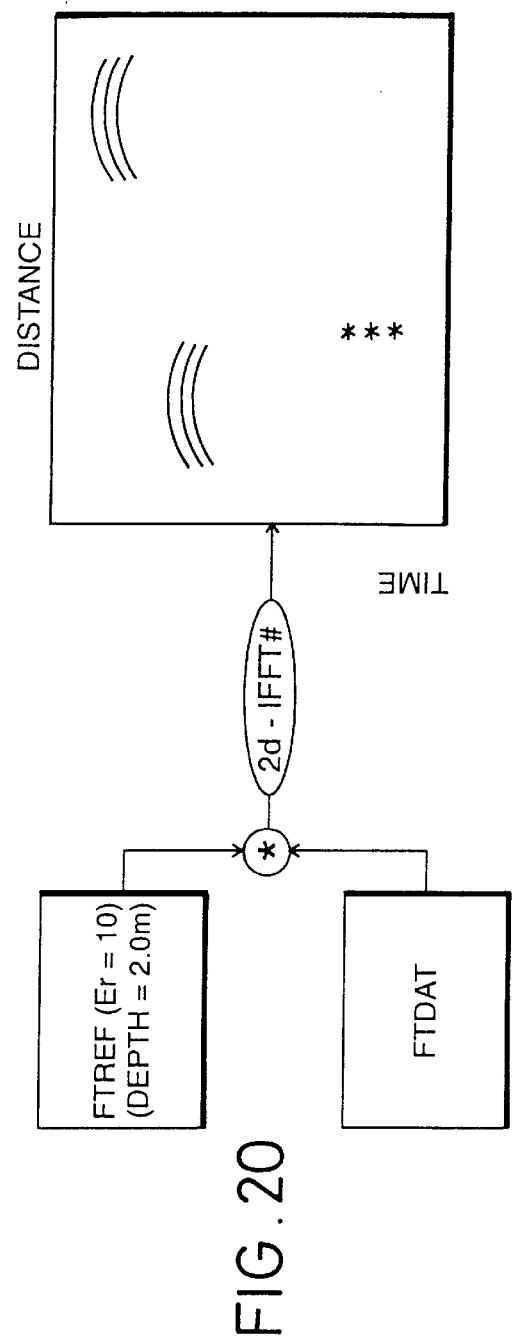

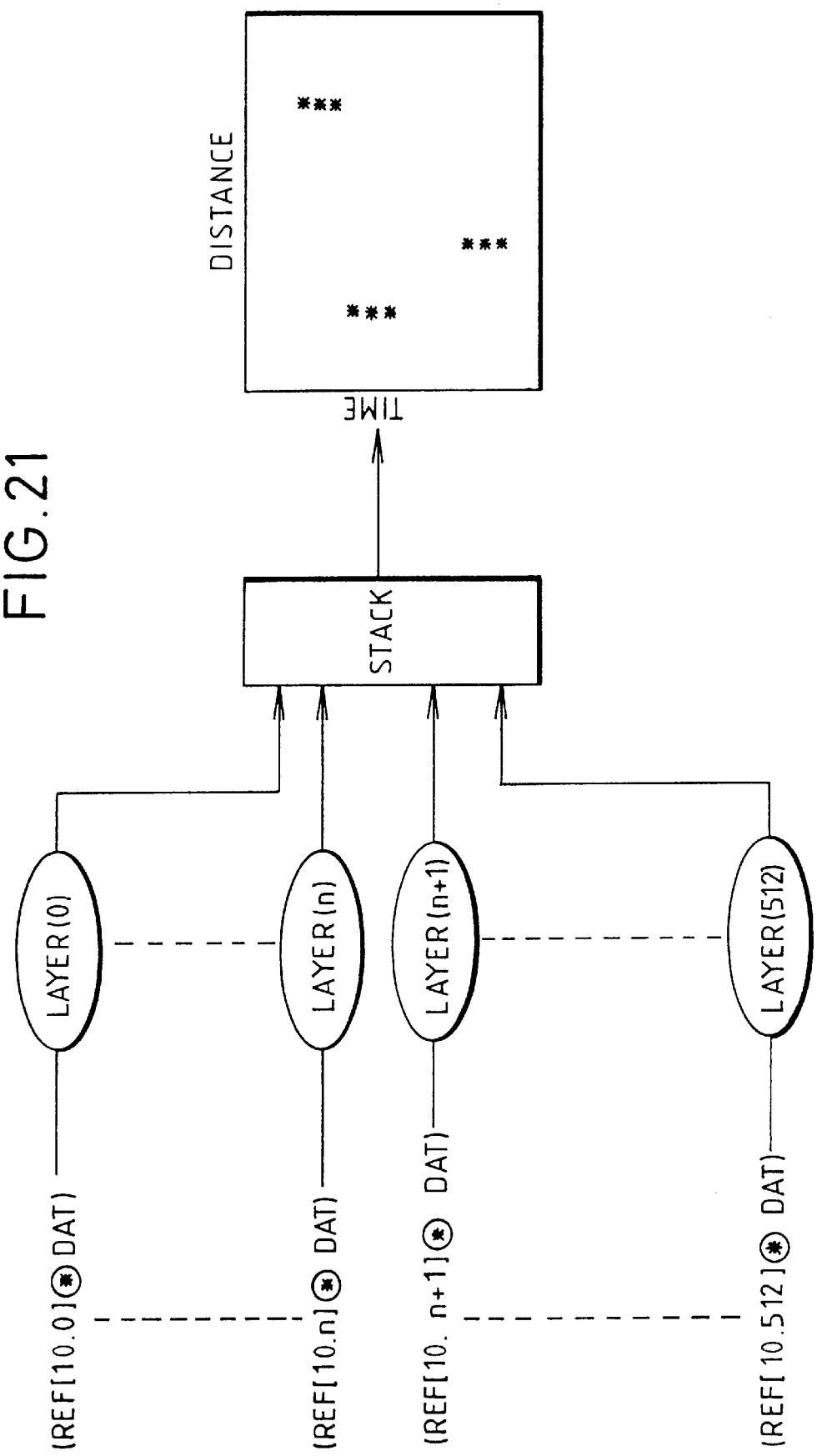

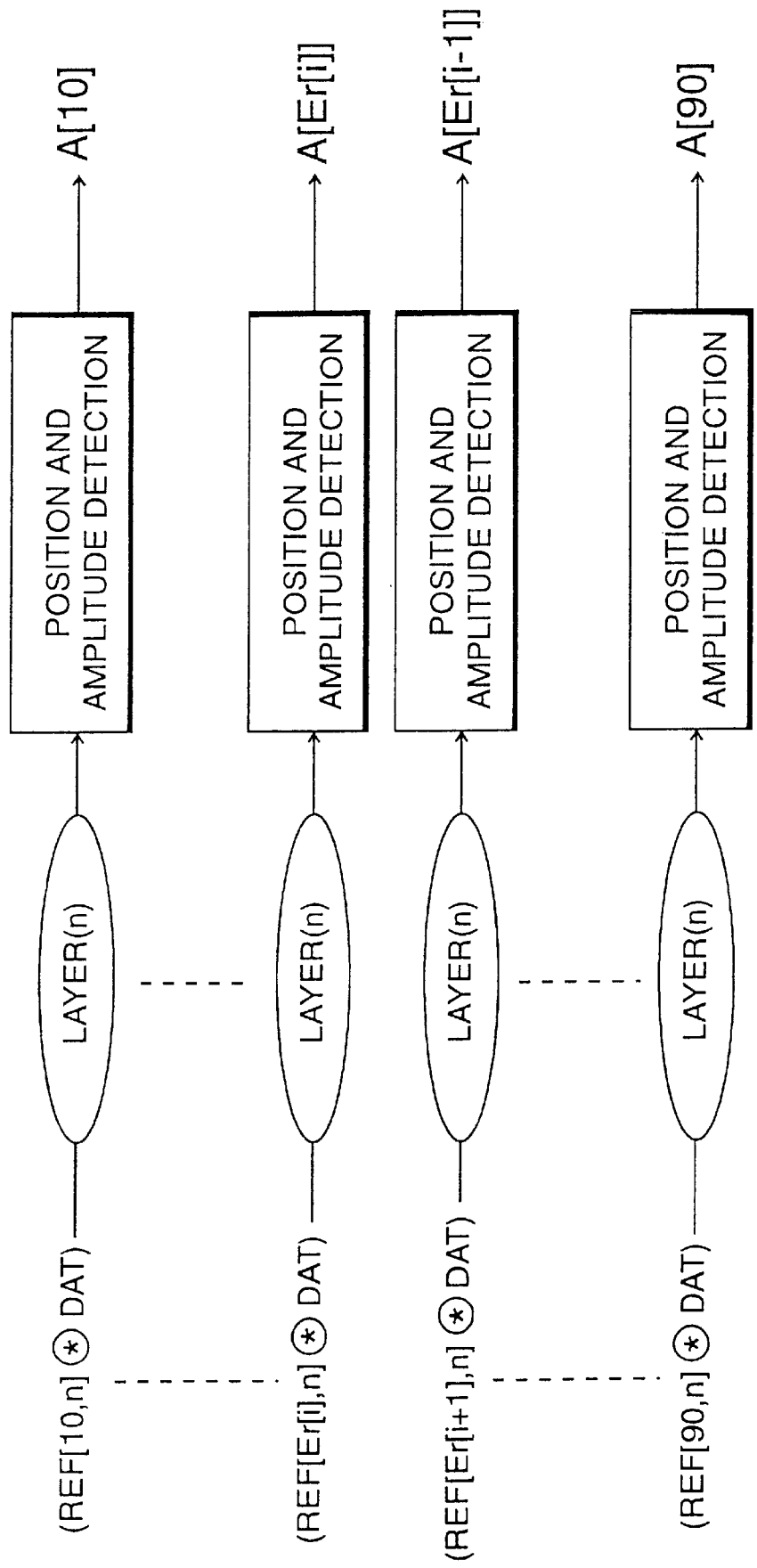

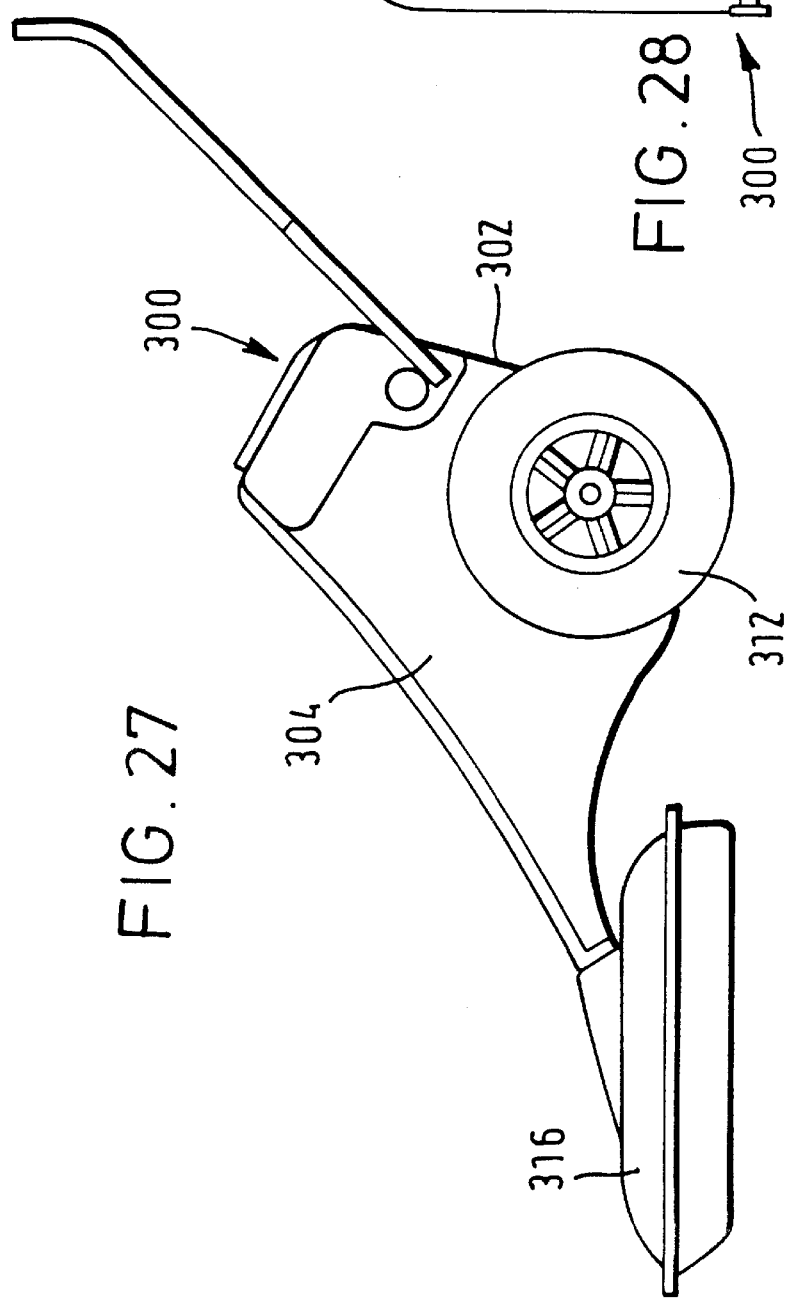
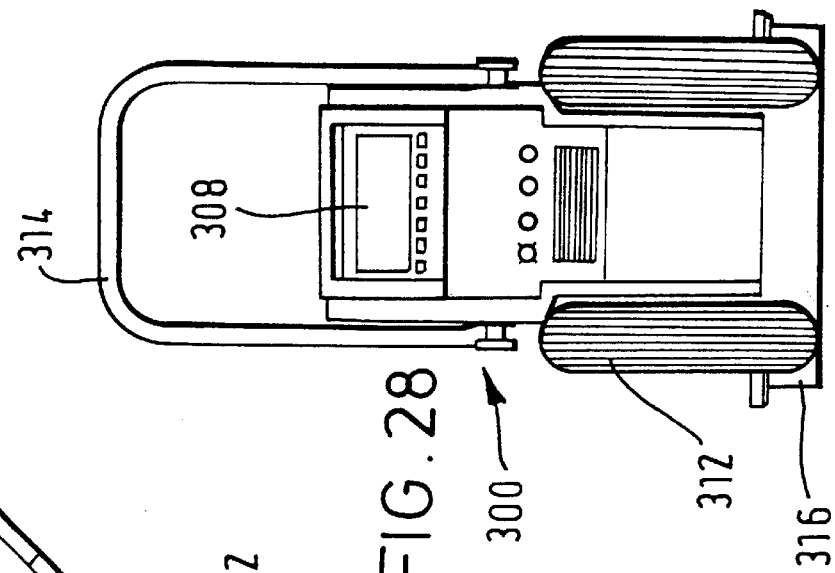

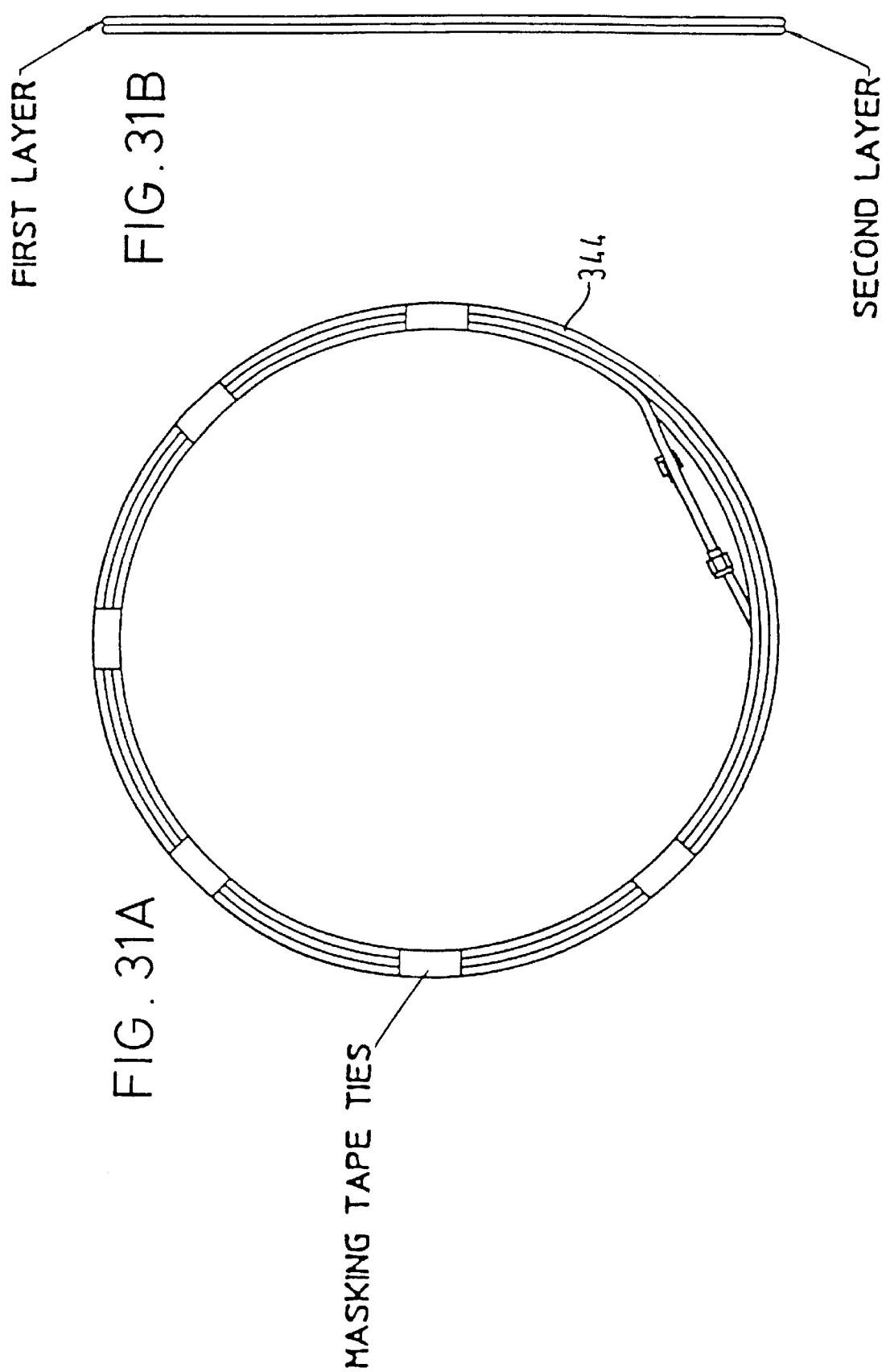

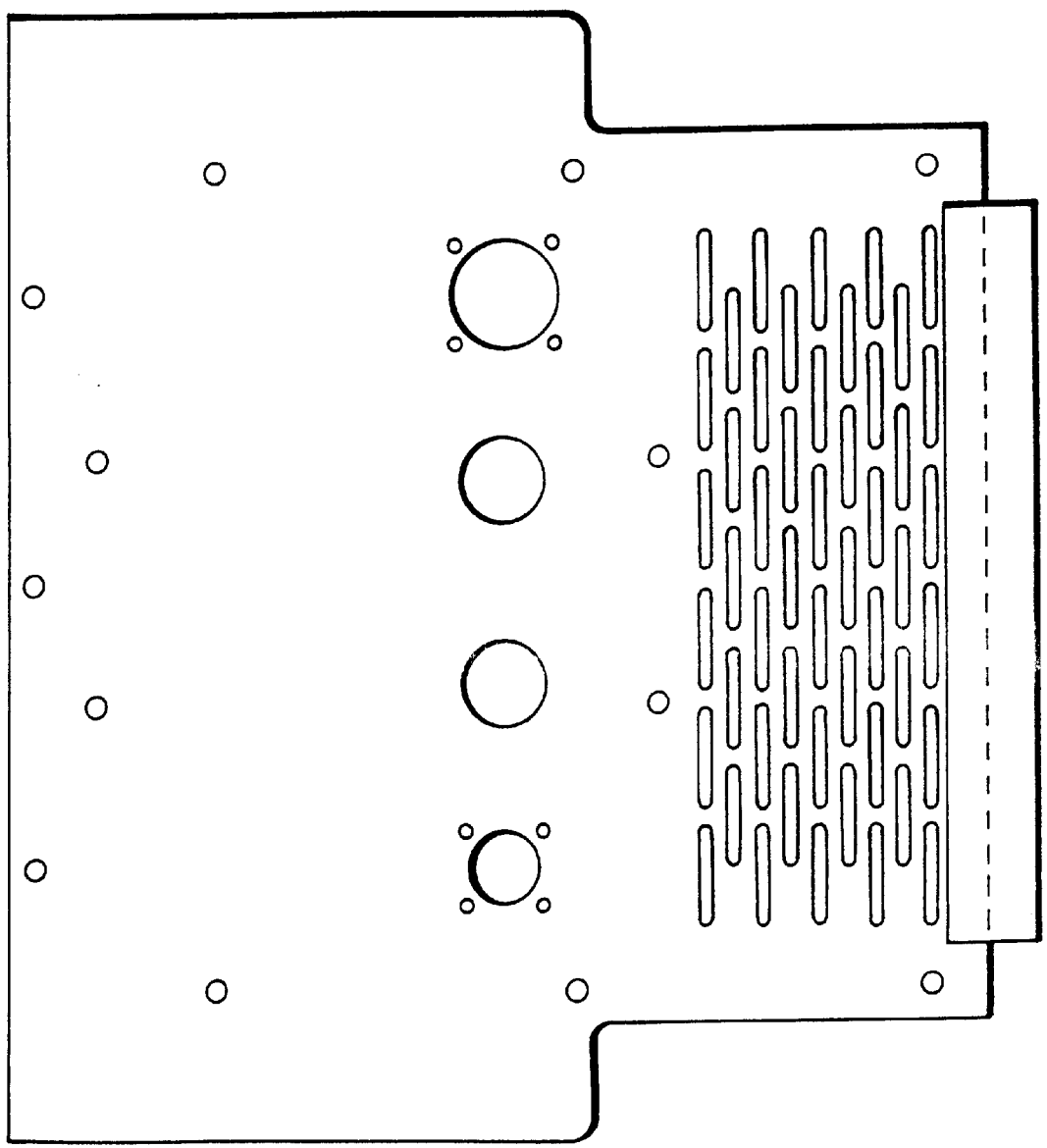

VIEW ON ARROW B

SECTION ON A-A

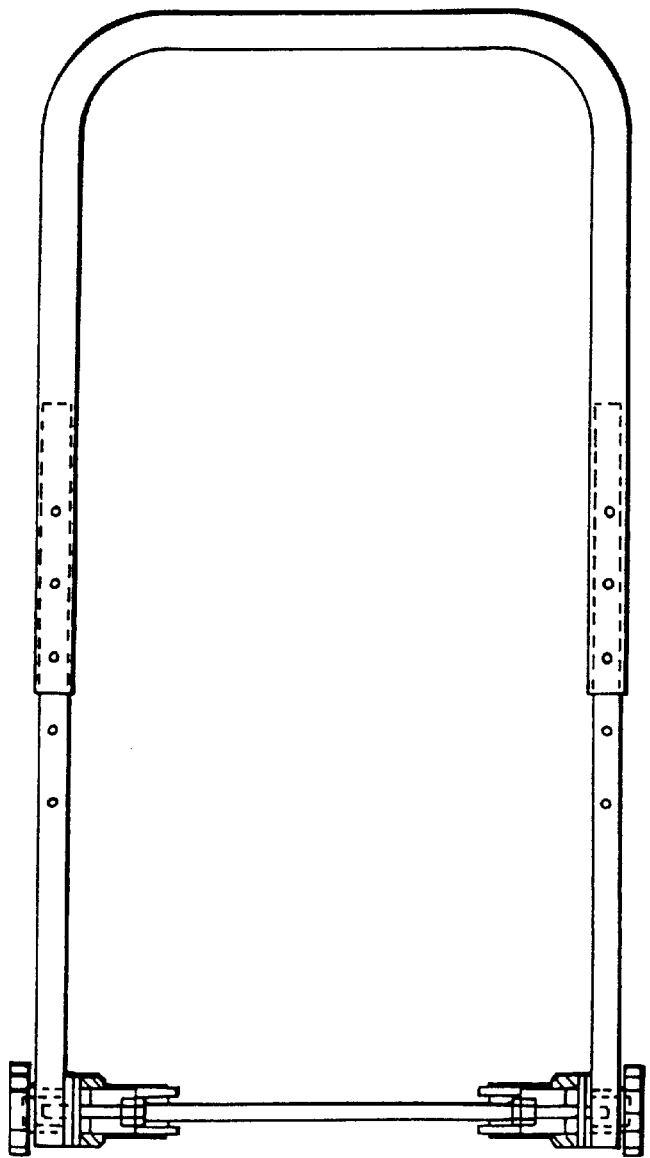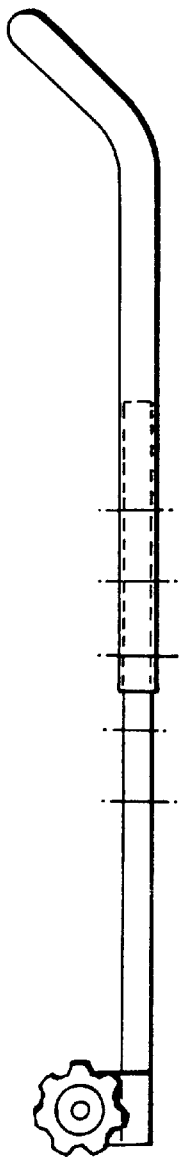

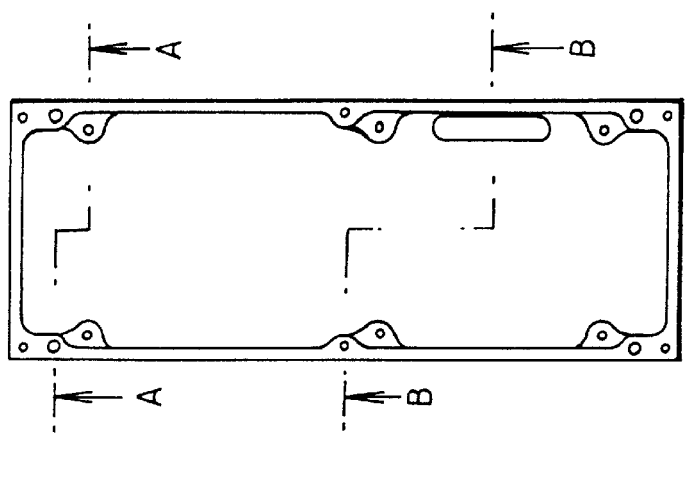
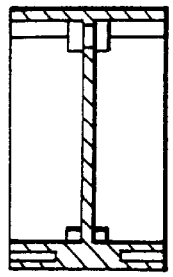
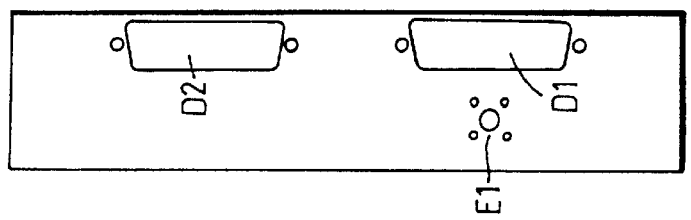
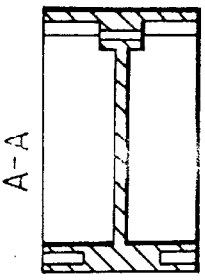
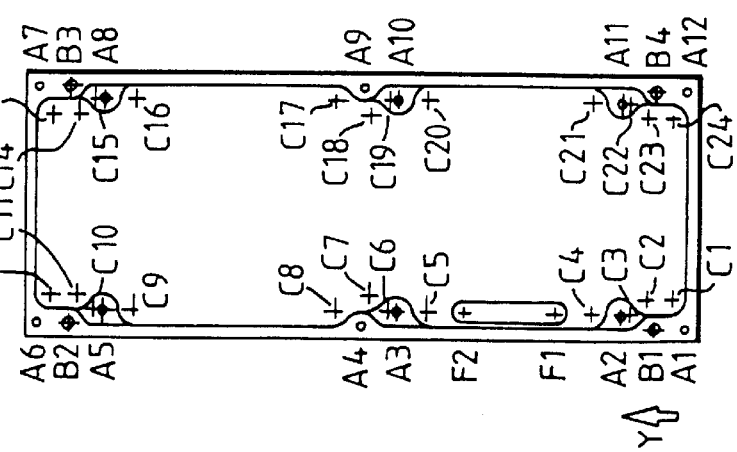

B-B

A-A

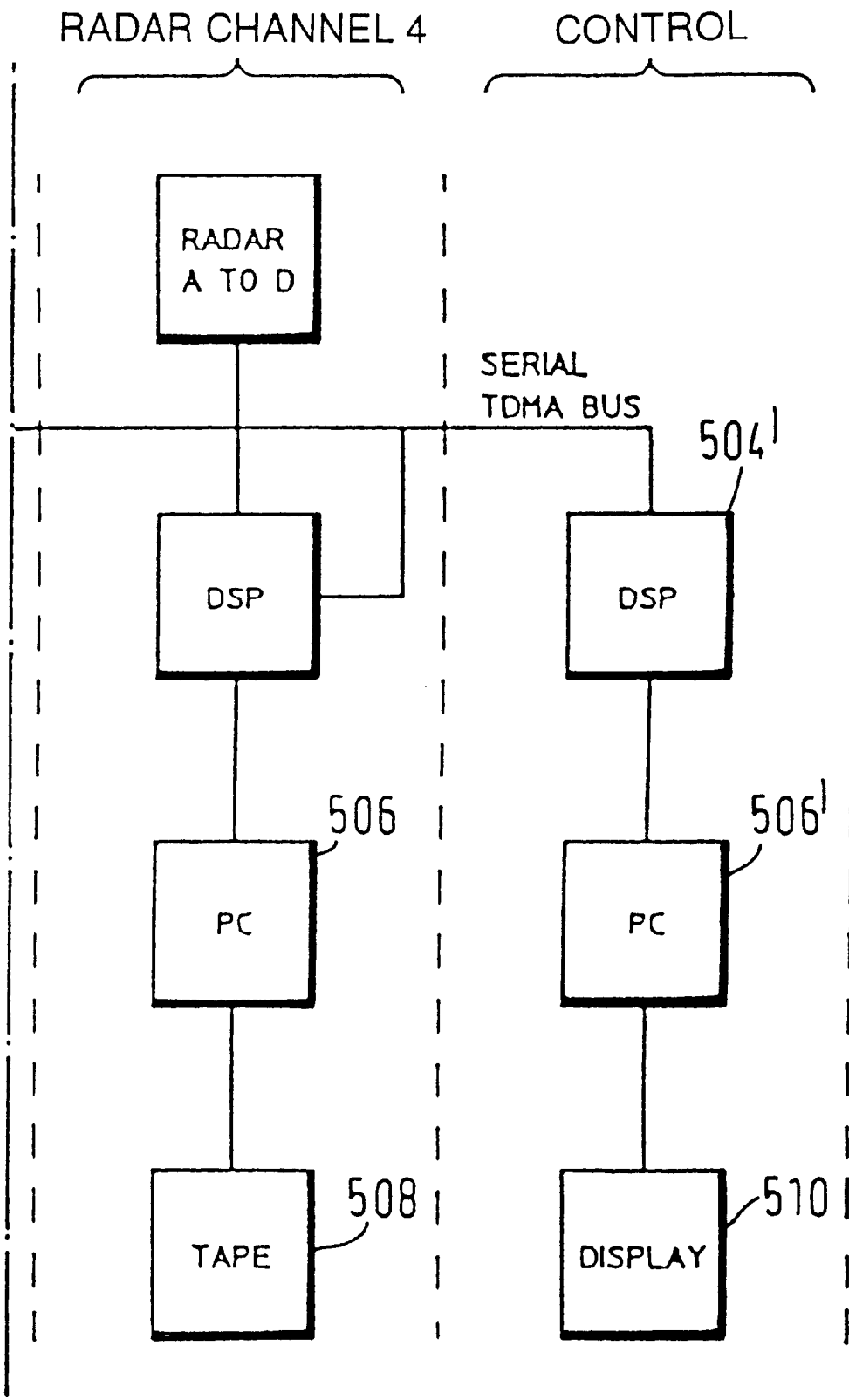

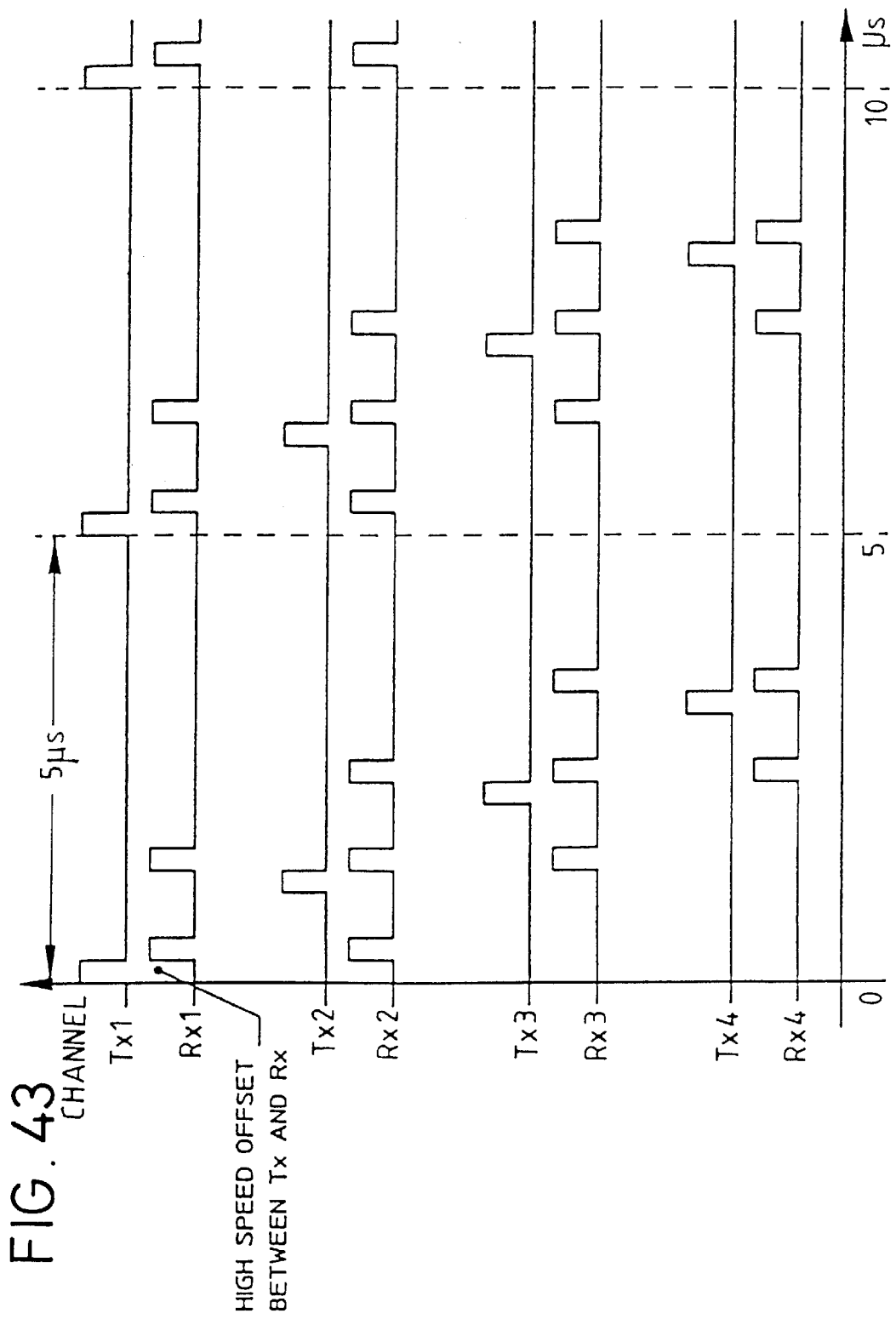

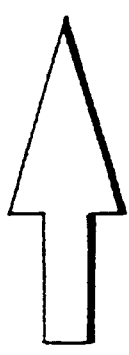
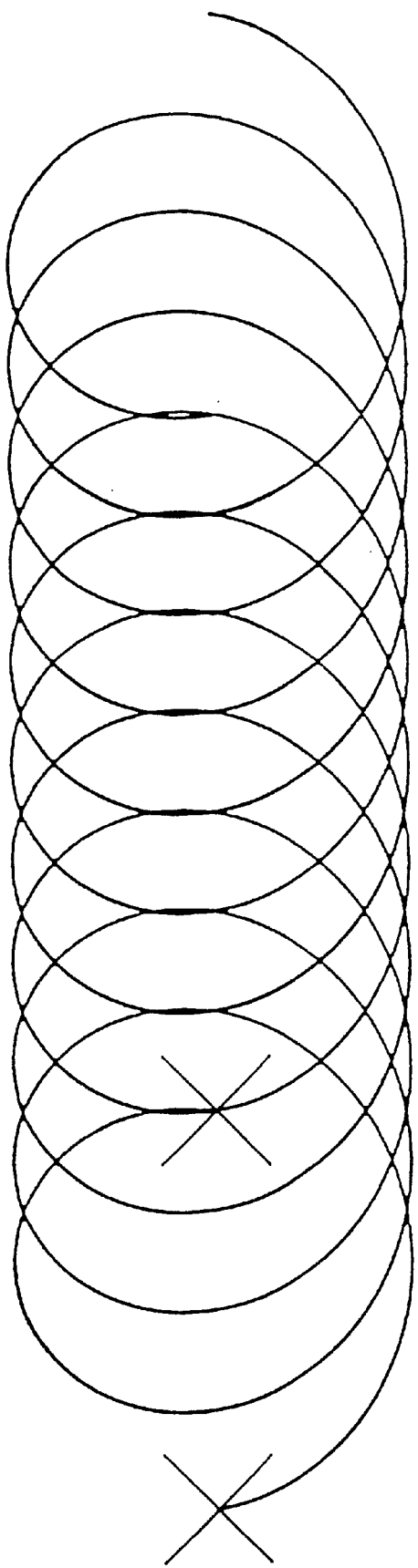
FIG. 44

OPEN PIPE ENVIRONMENT

DENSE PIPE ENVIRONMENT

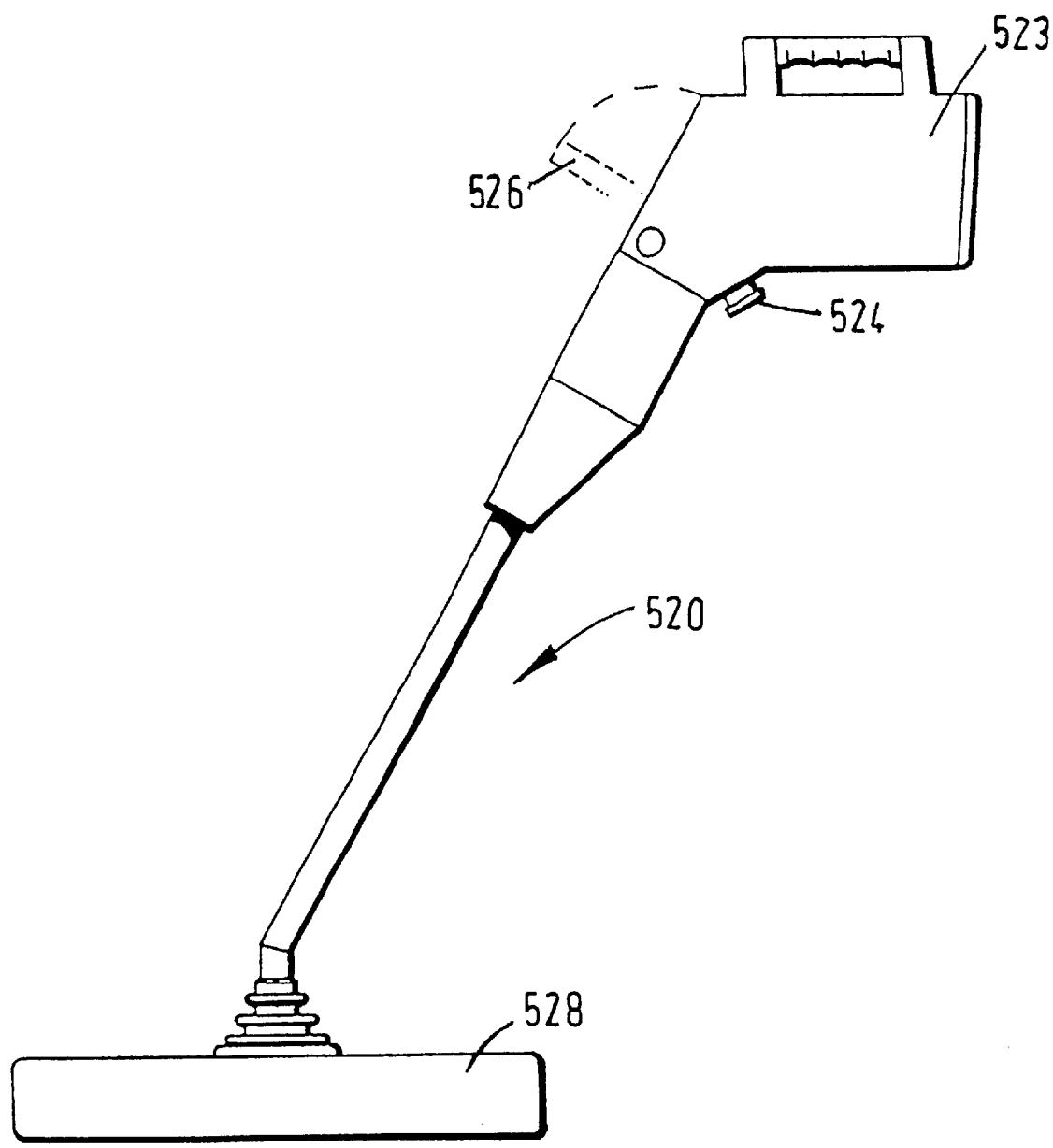

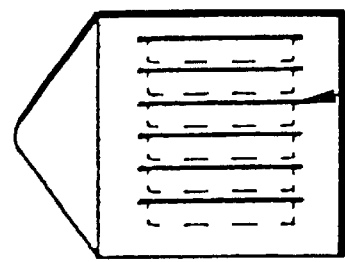
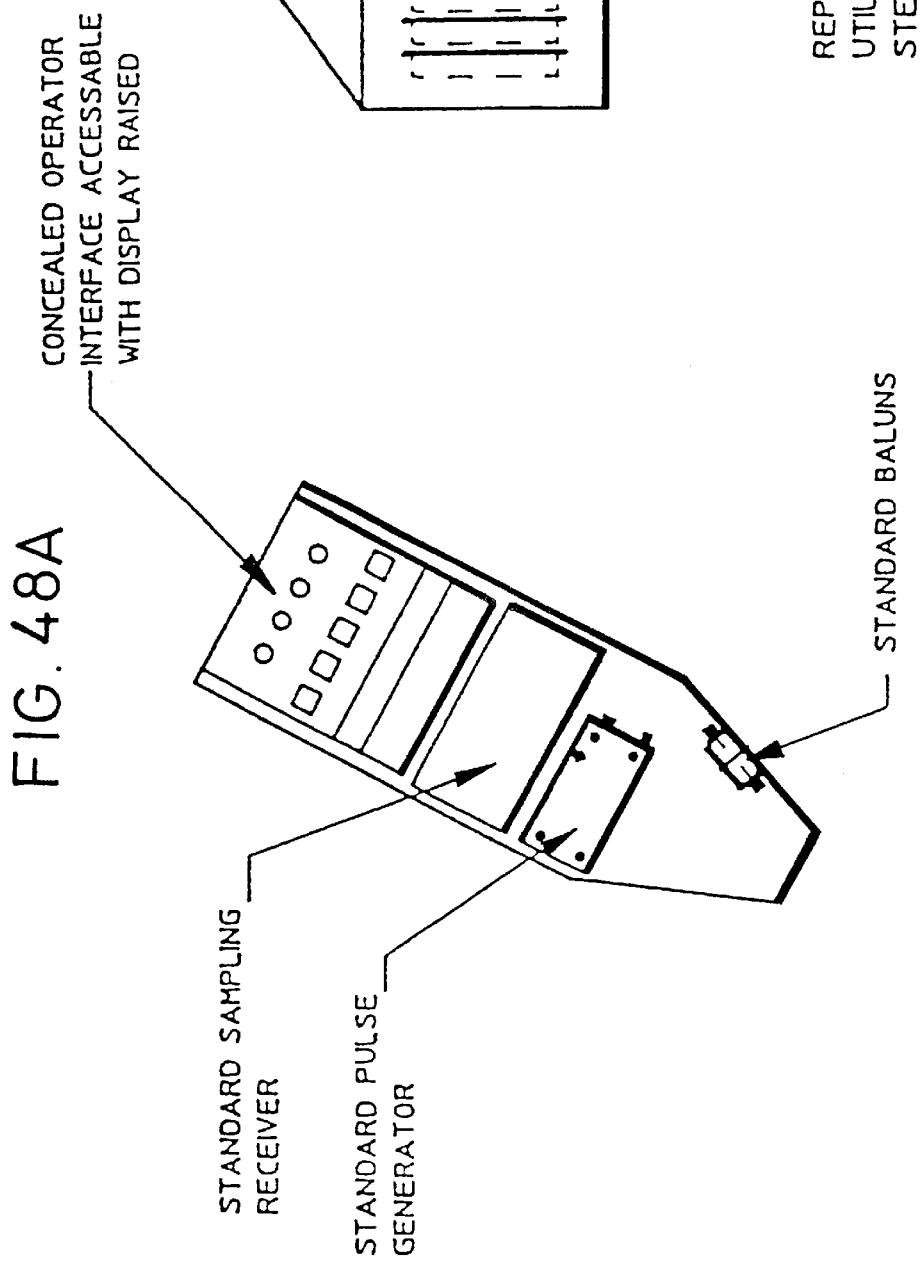

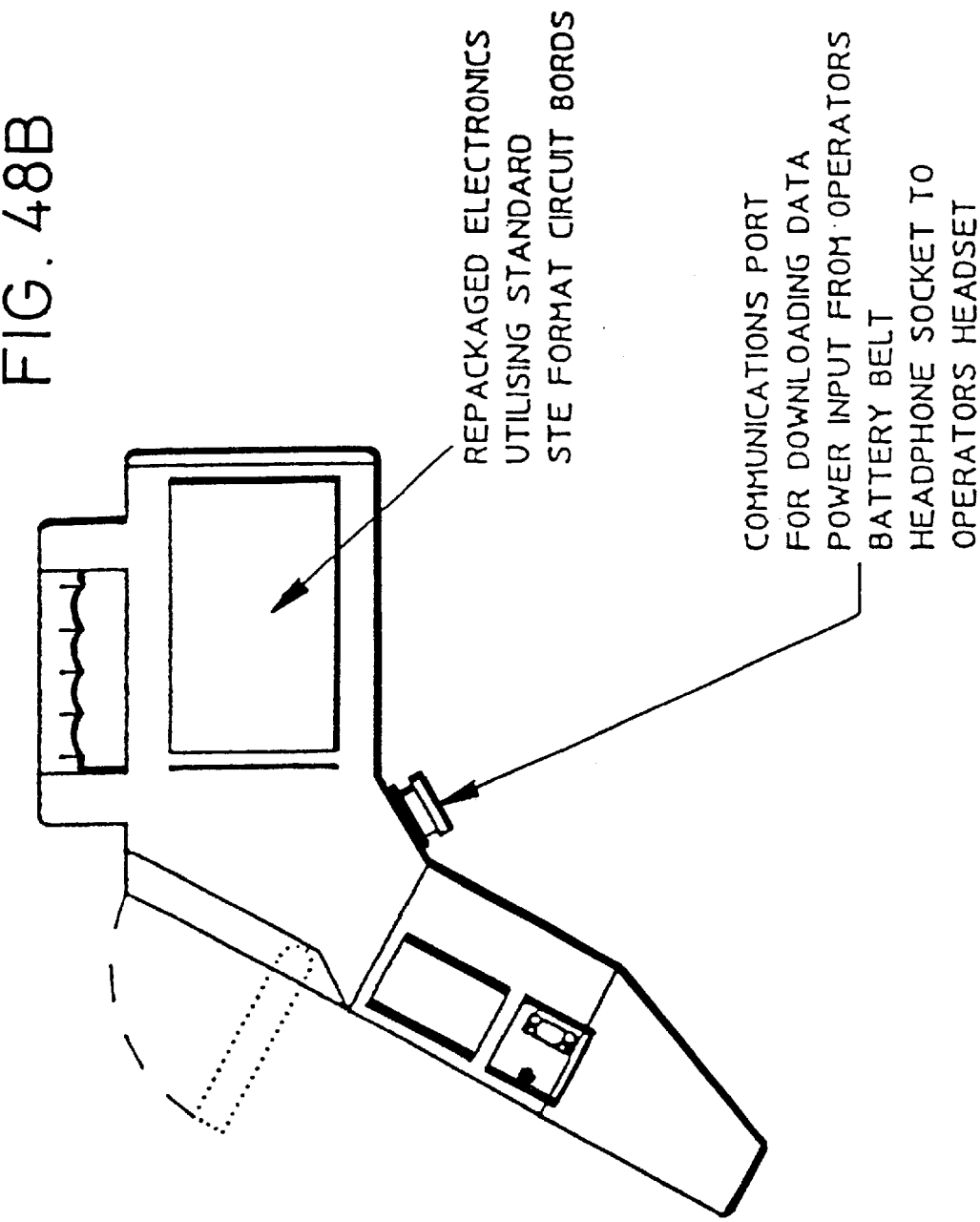

FIG. 49

| FIG. 49 (I) | FIG. 49 (III) |
|---|---|
| FIG. 49 (II) | FIG. 49 (IV) |

FIG. 49 (III)
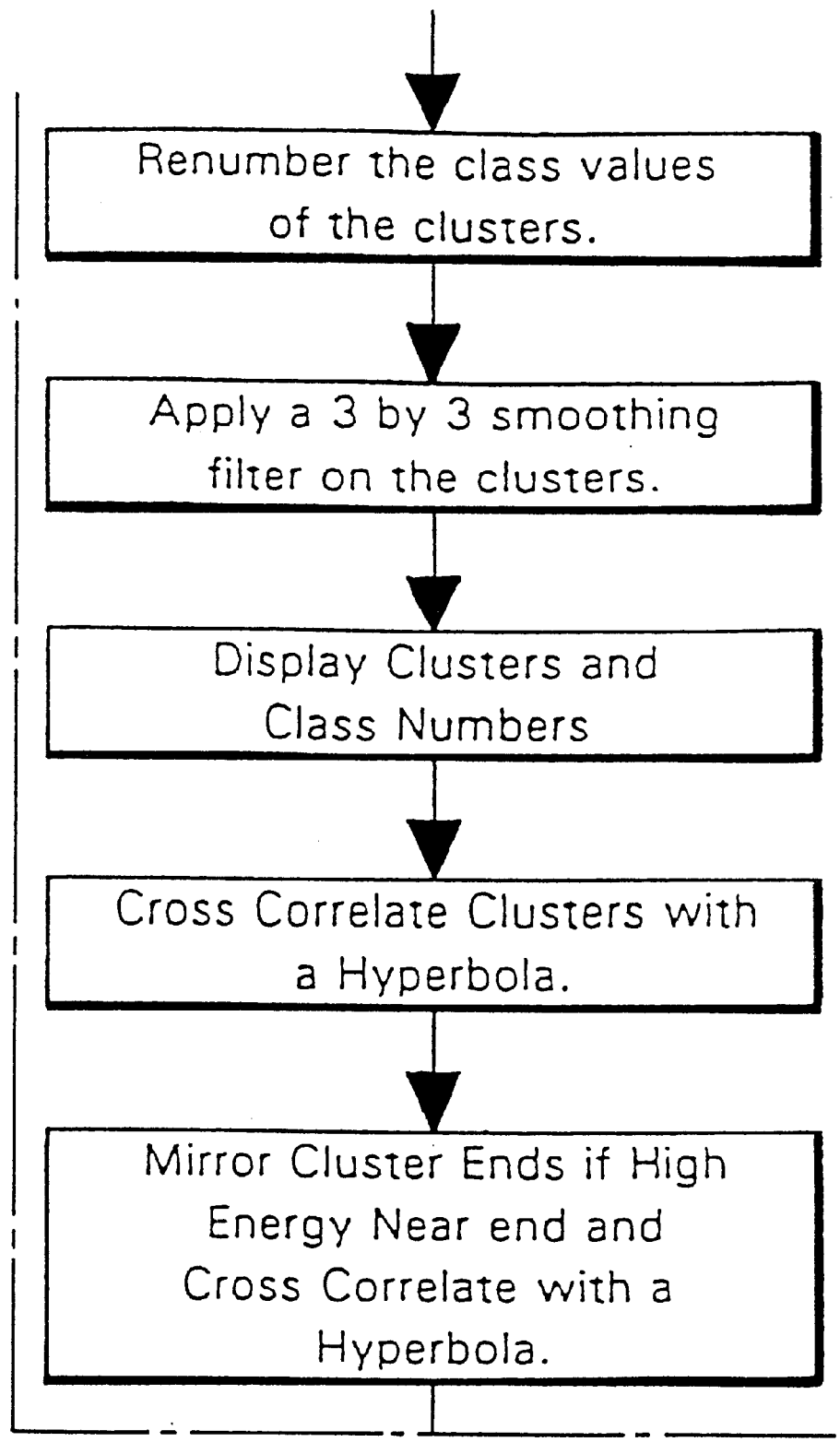

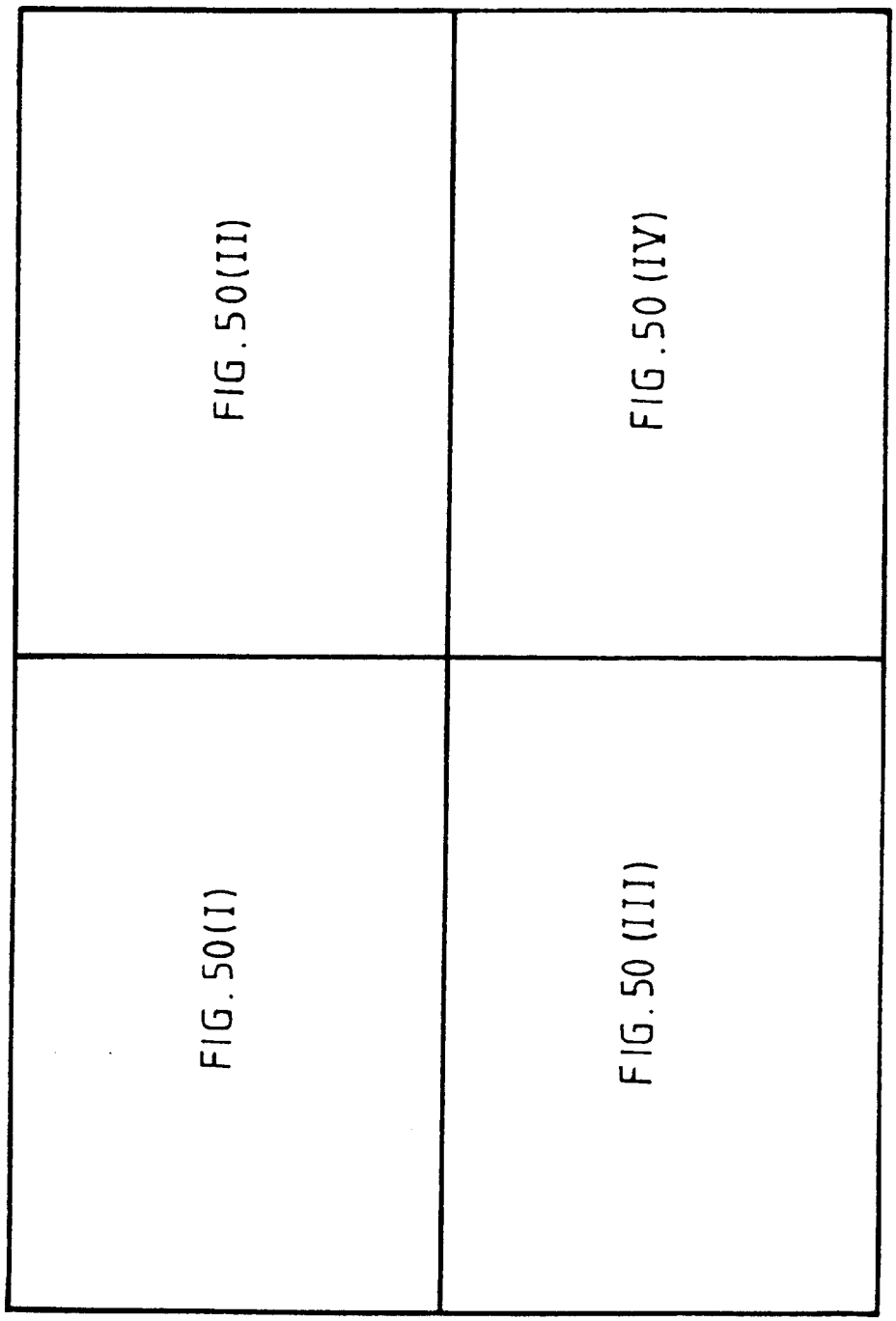

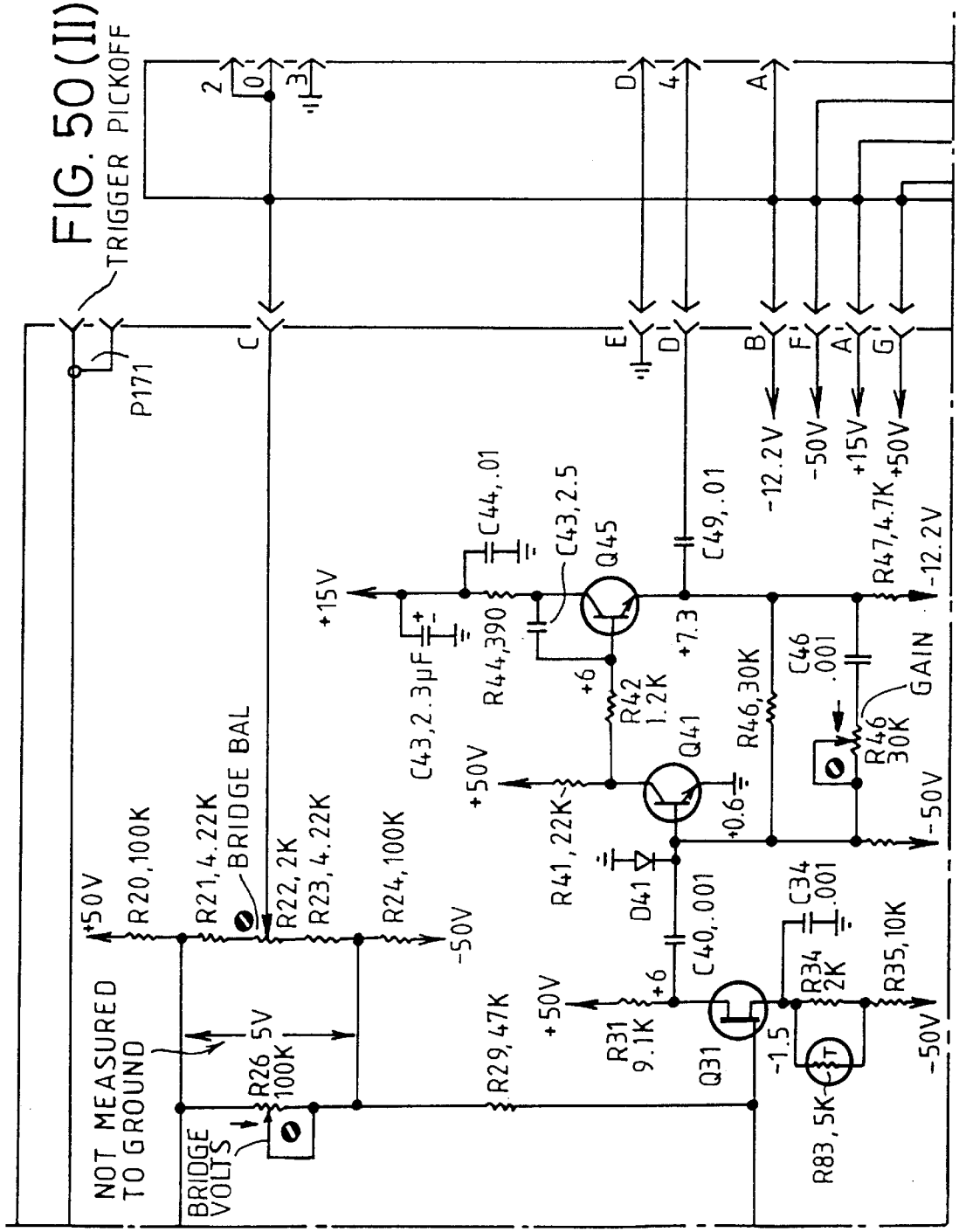
FIG. 50(II) TRIGGER PICKOFF

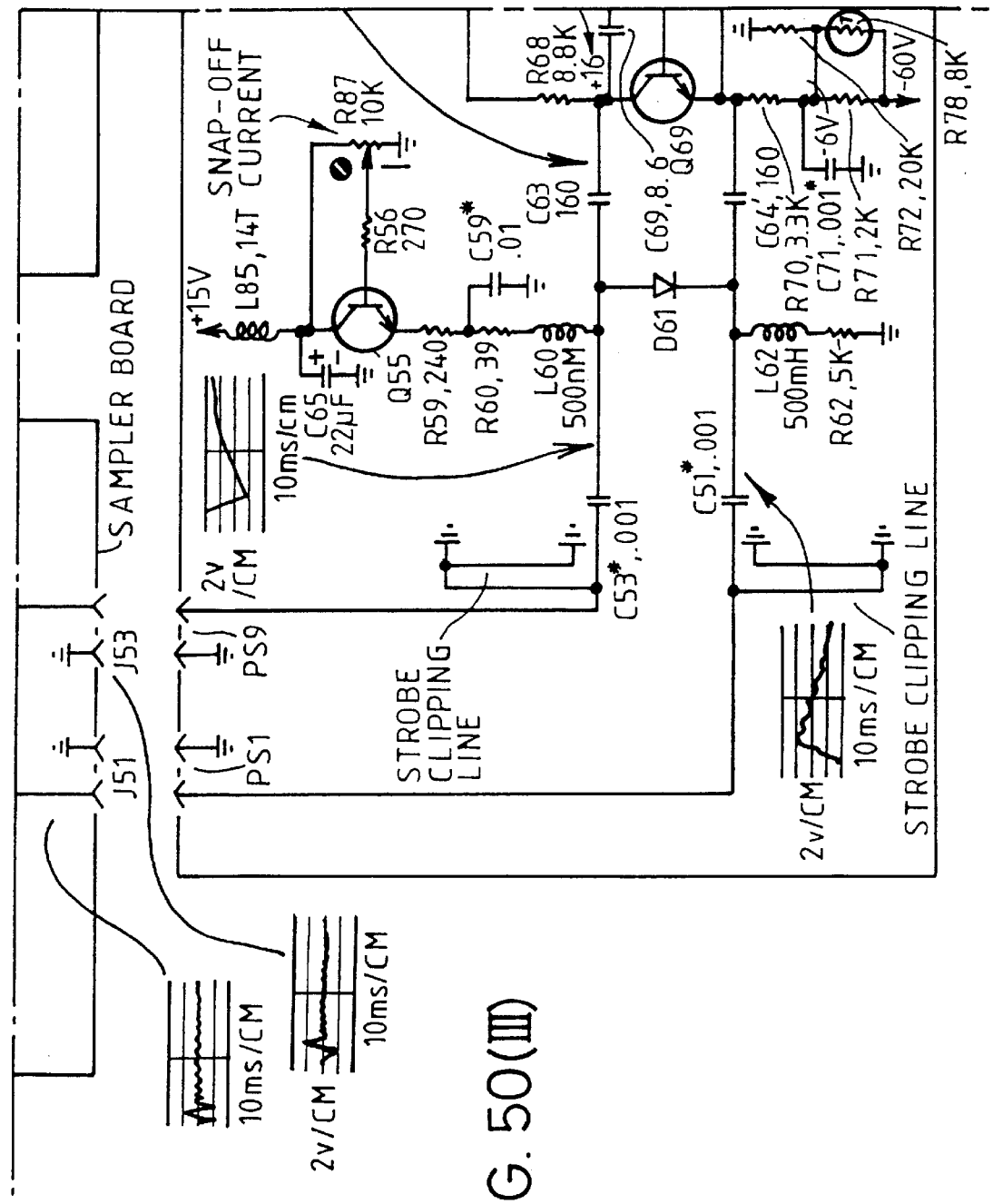
FIG. 50(III)

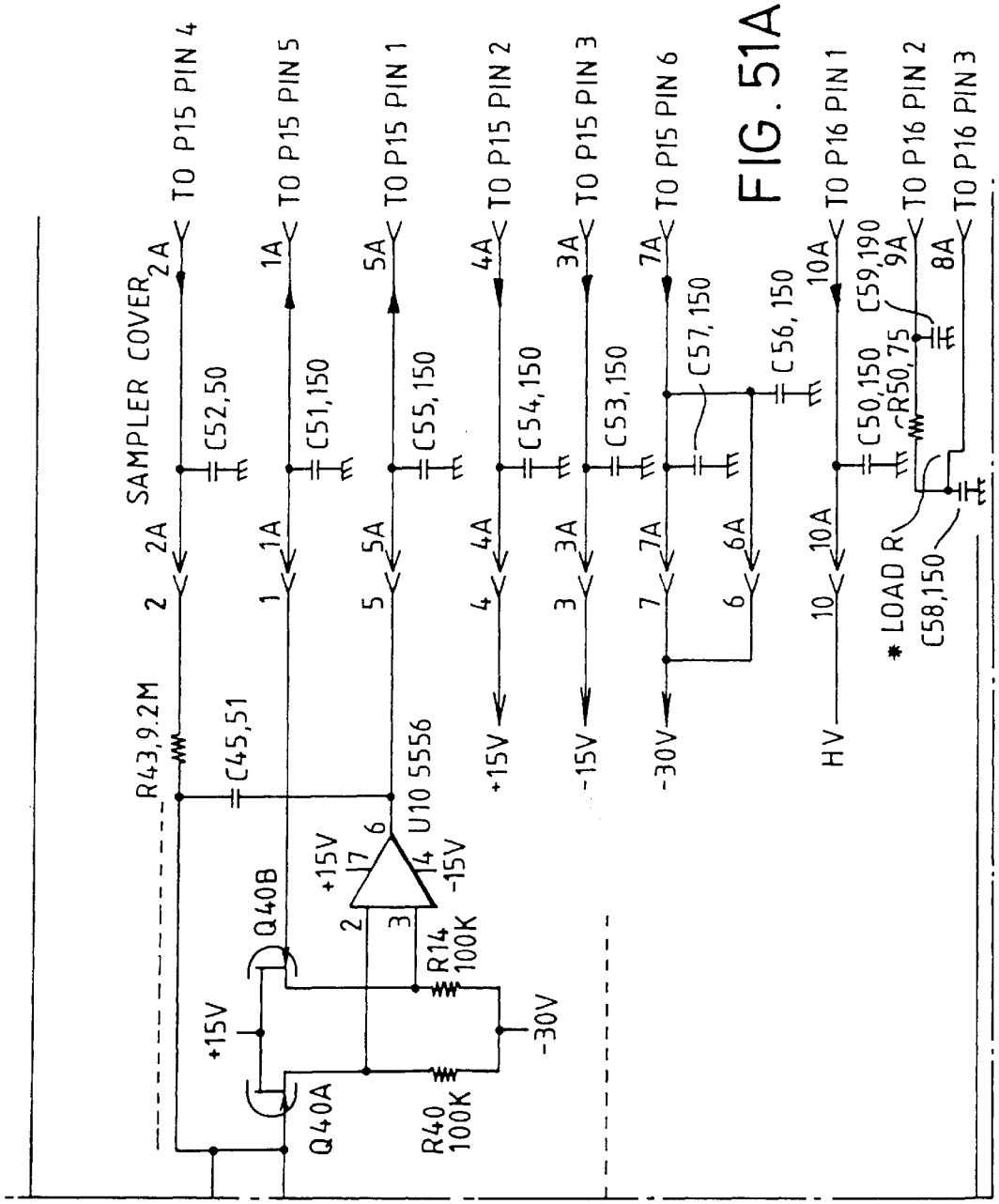
FIG. 51A (II)

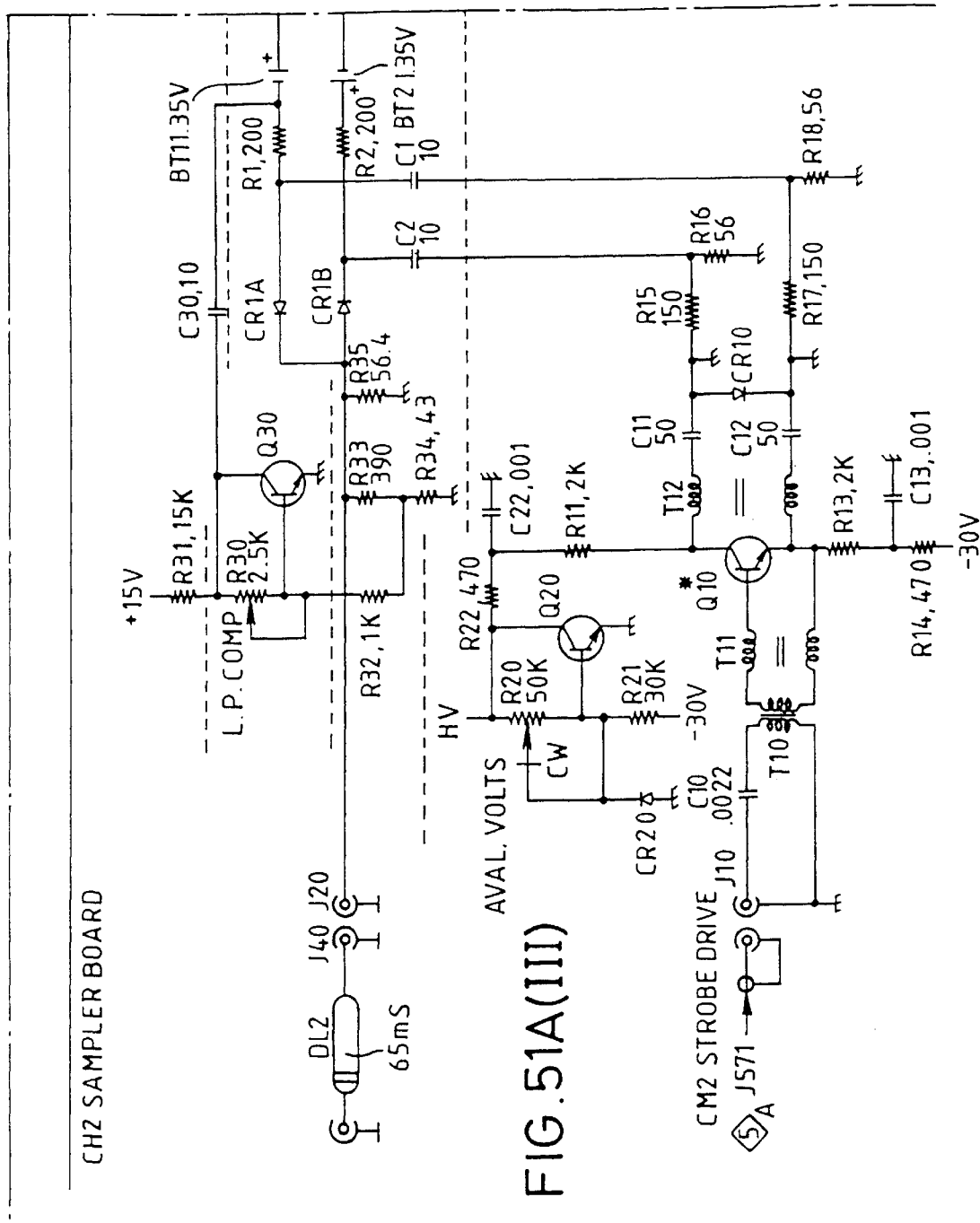
FIG. 51A(III)

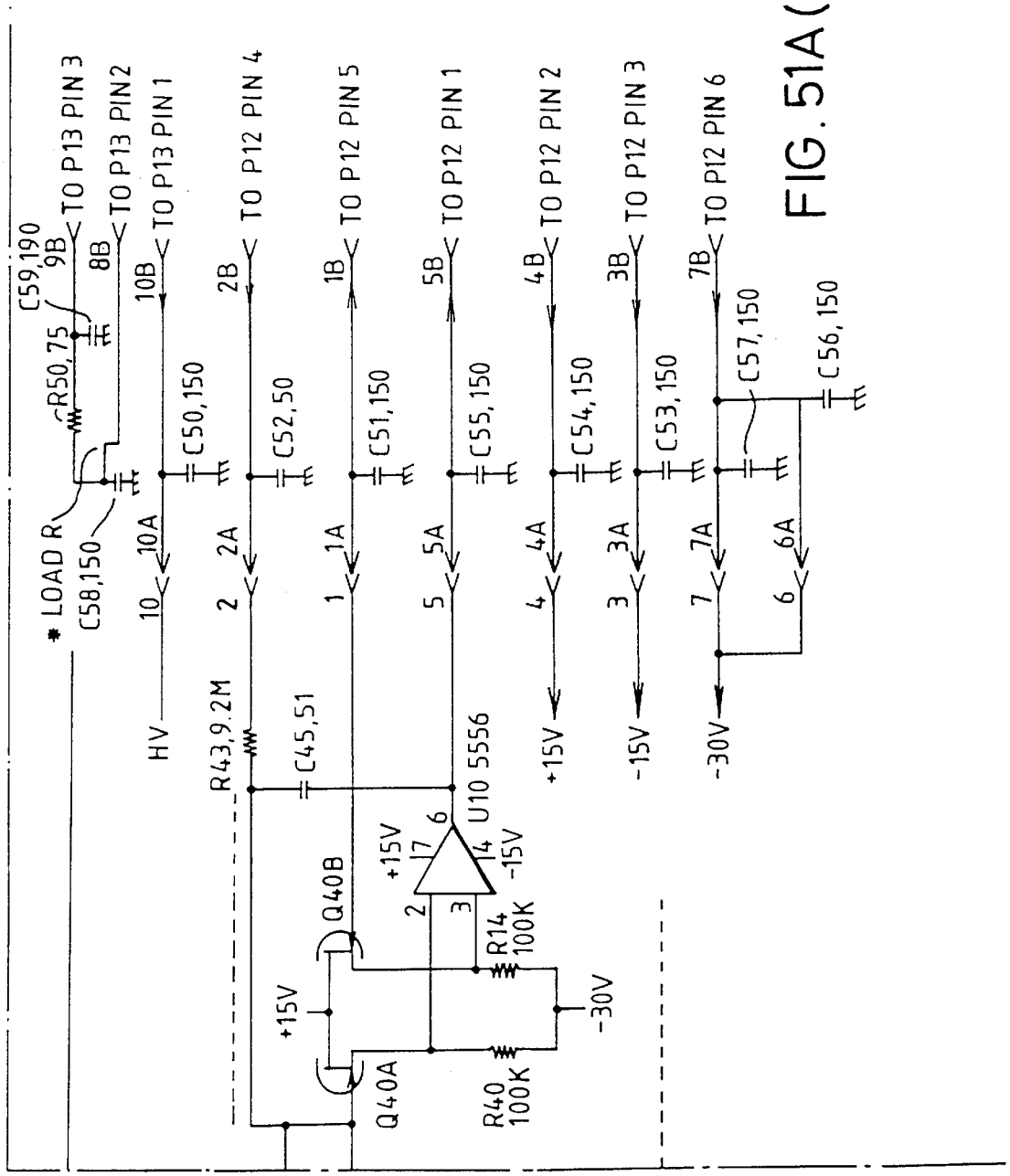
FIG. 51A(IV)

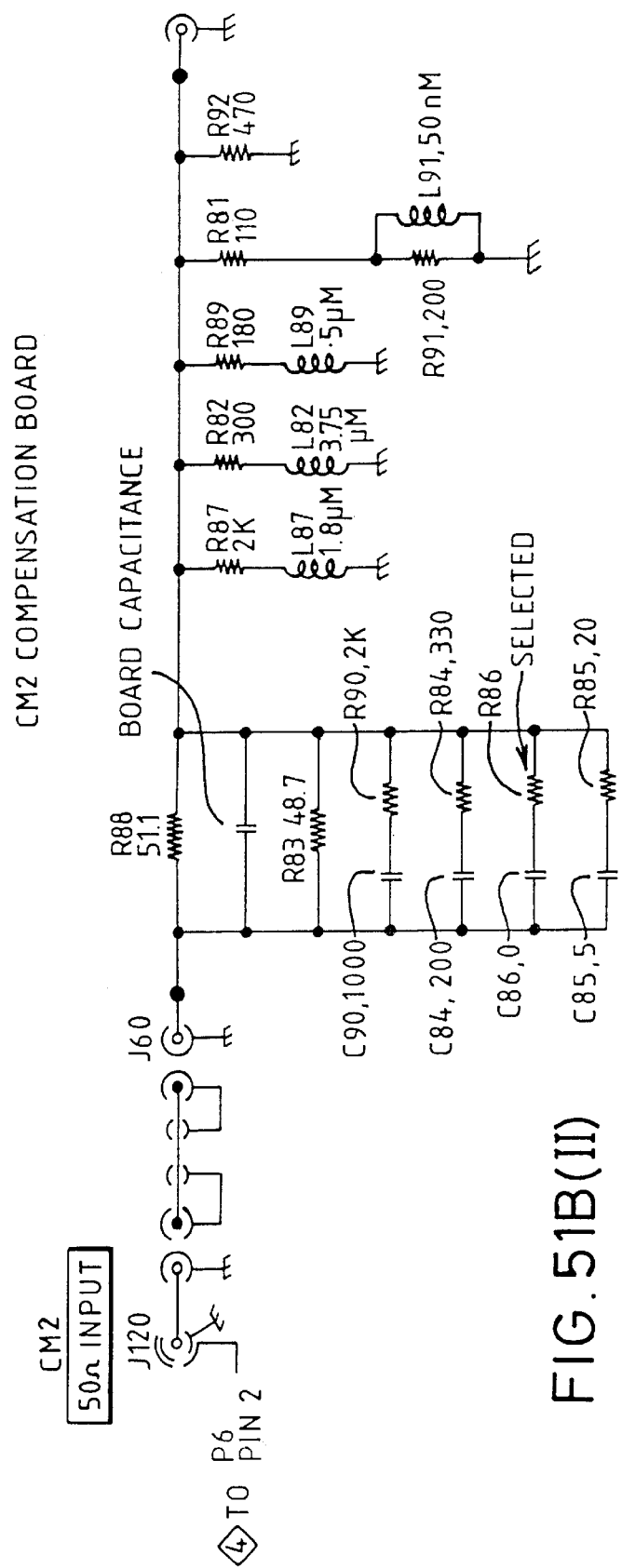
FIG. 51B(II)

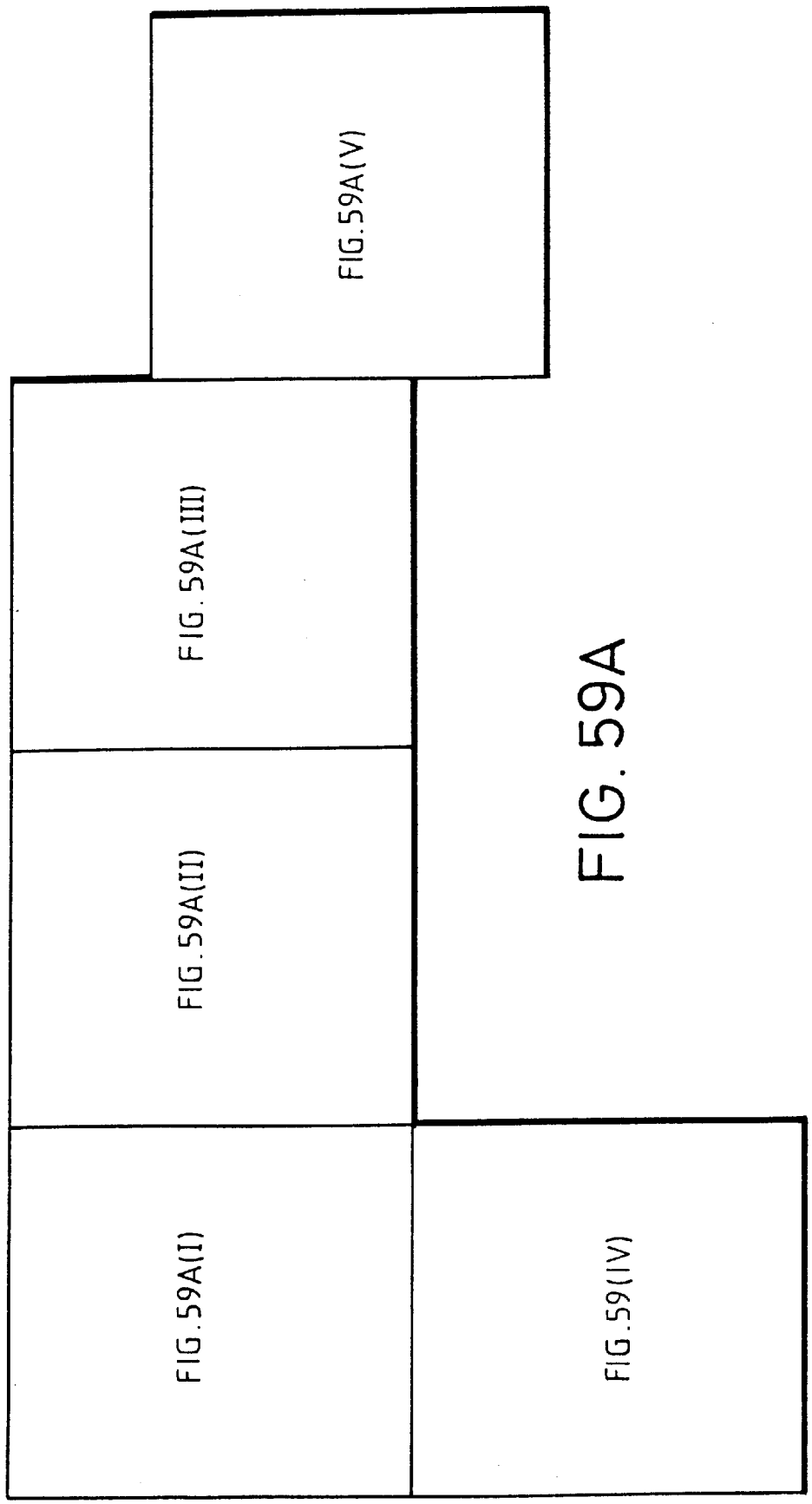

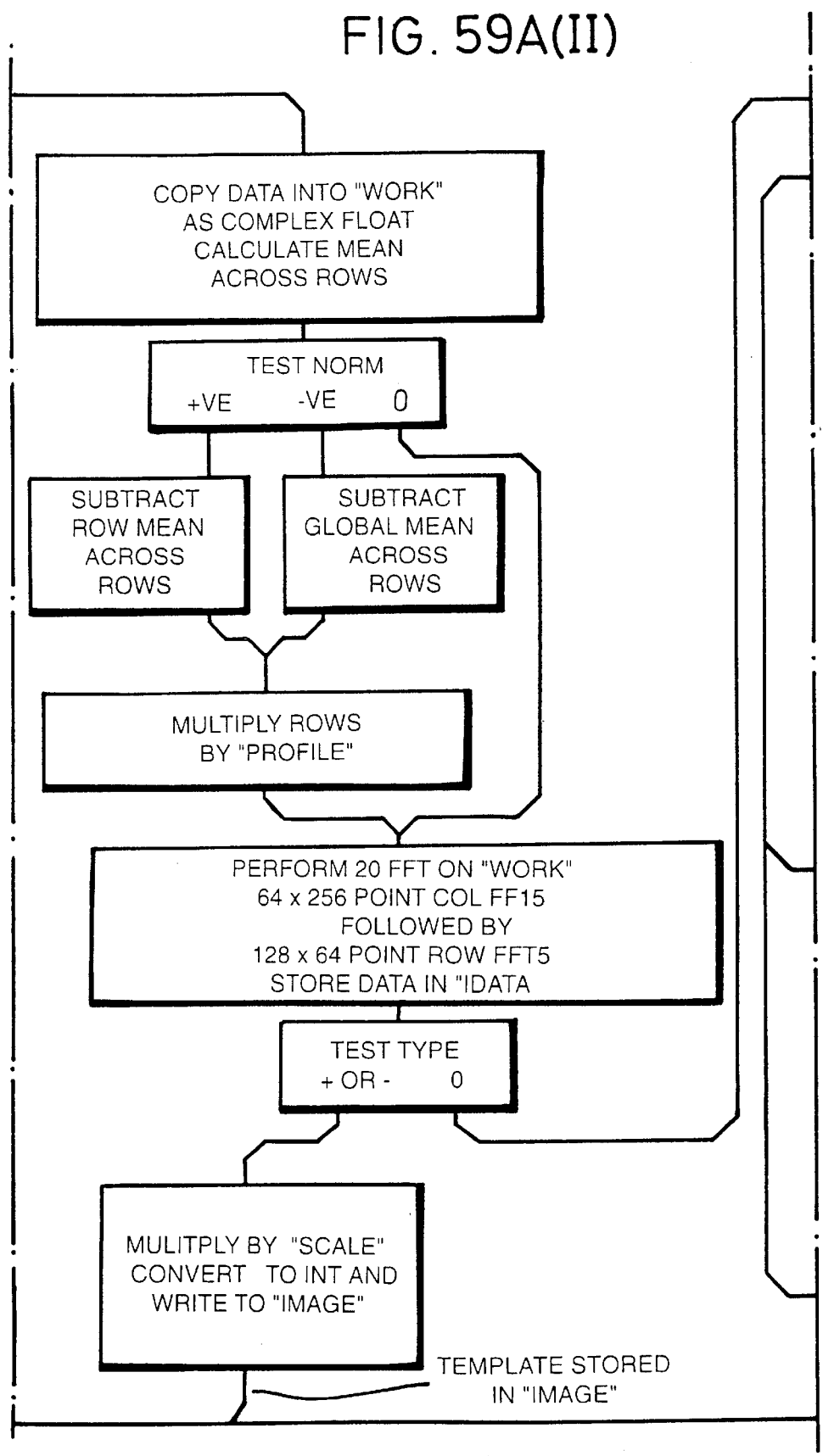
FIG. 59A(II)

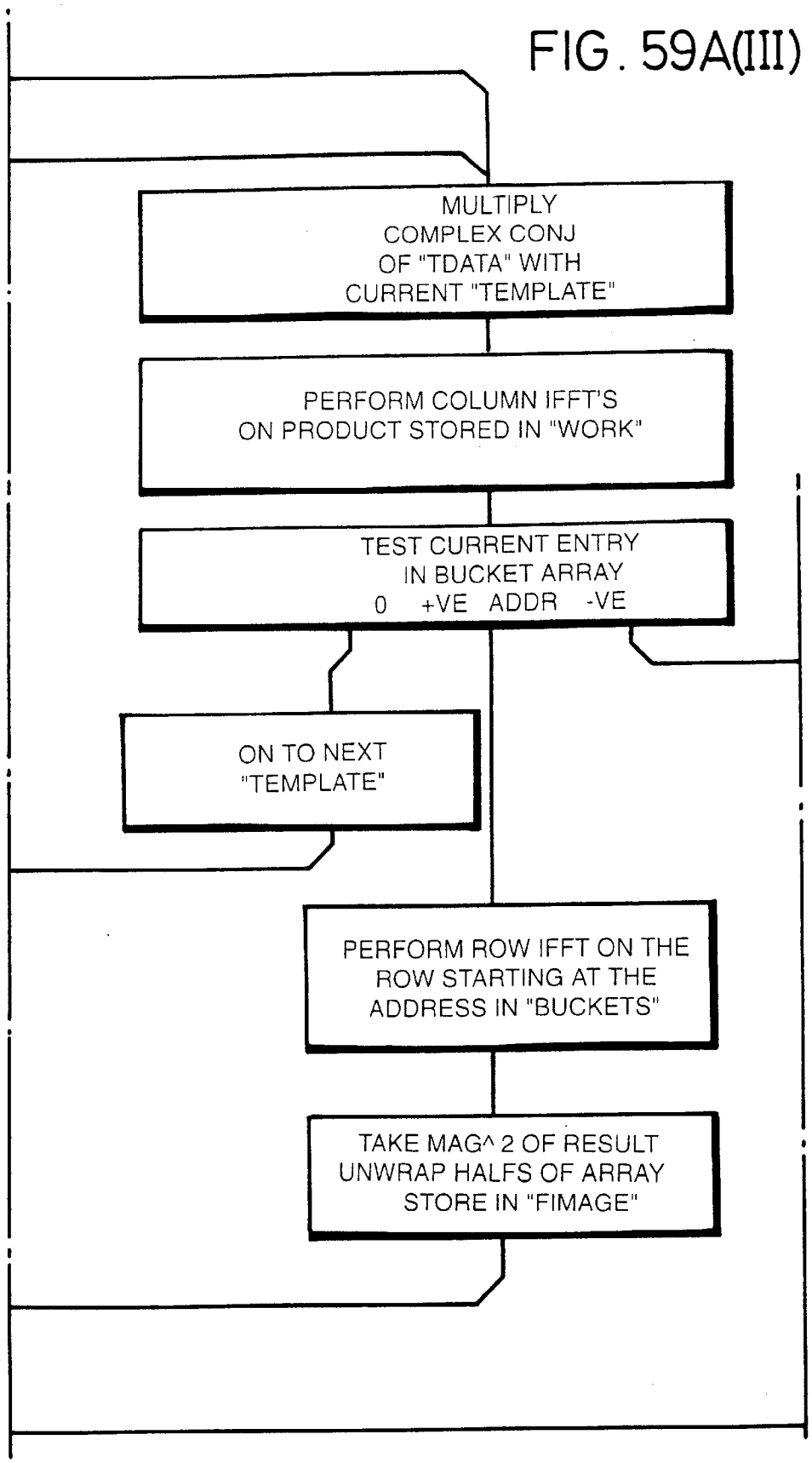
FIG. 59A(III)

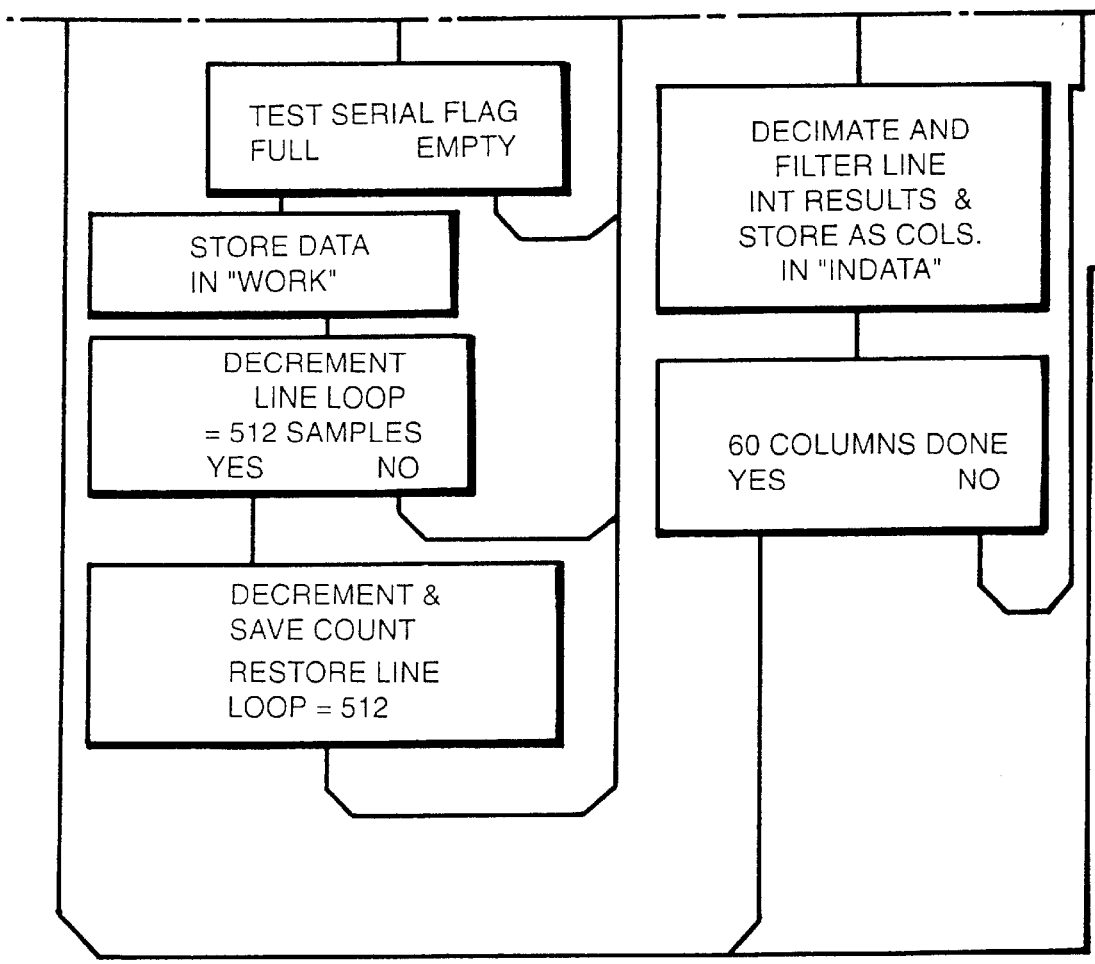
FIG. 59A(IV)

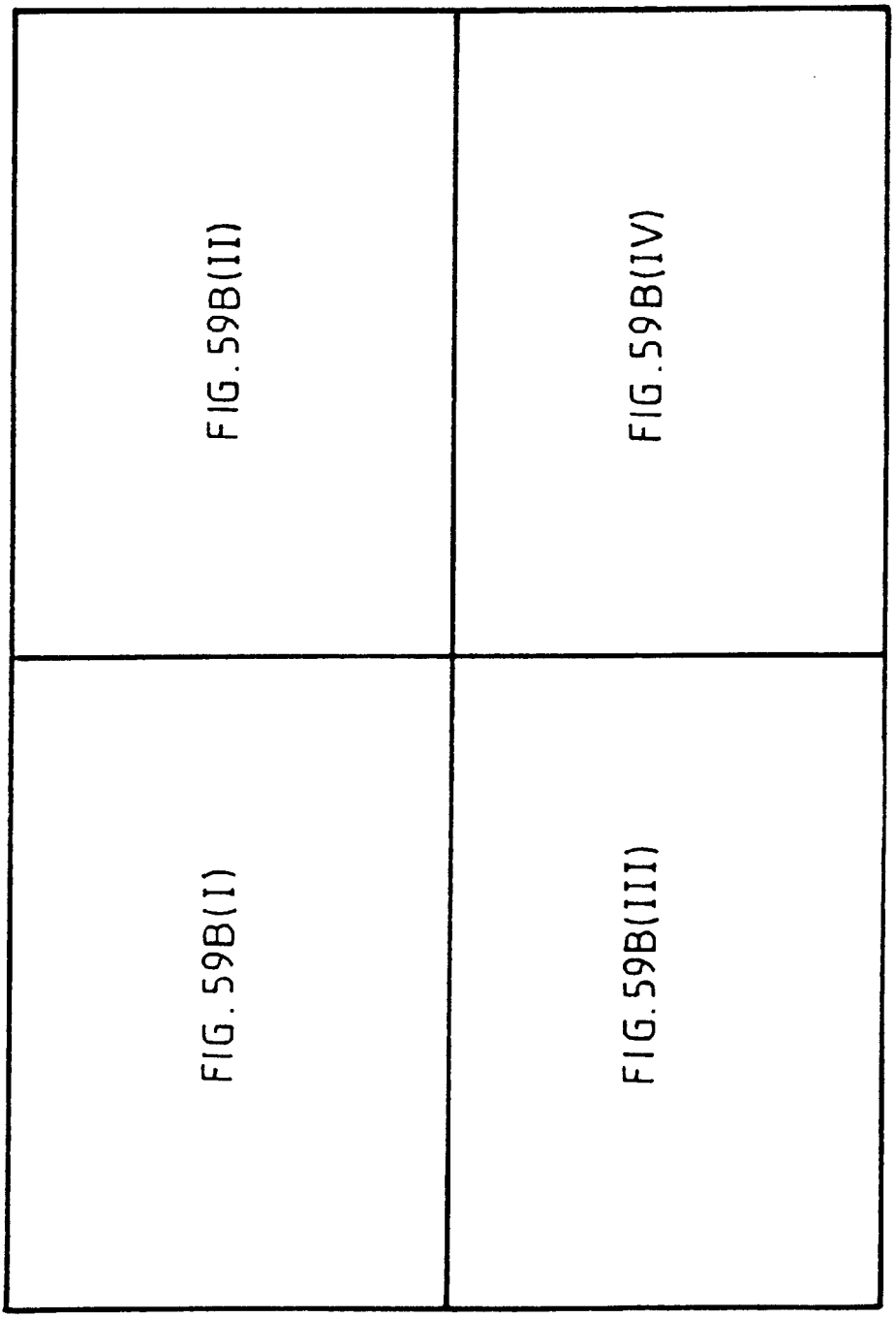

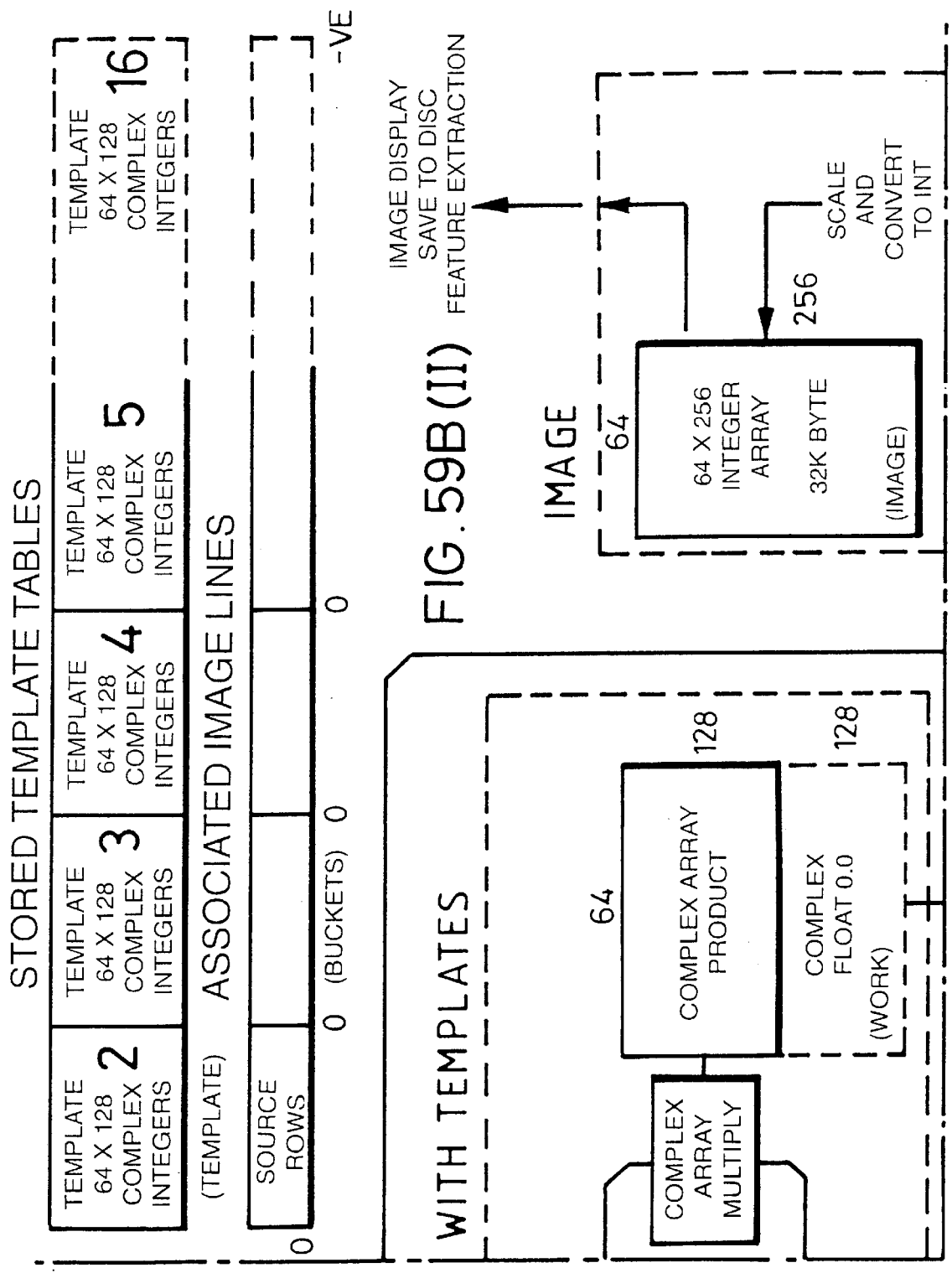
FIG. 59B(II)

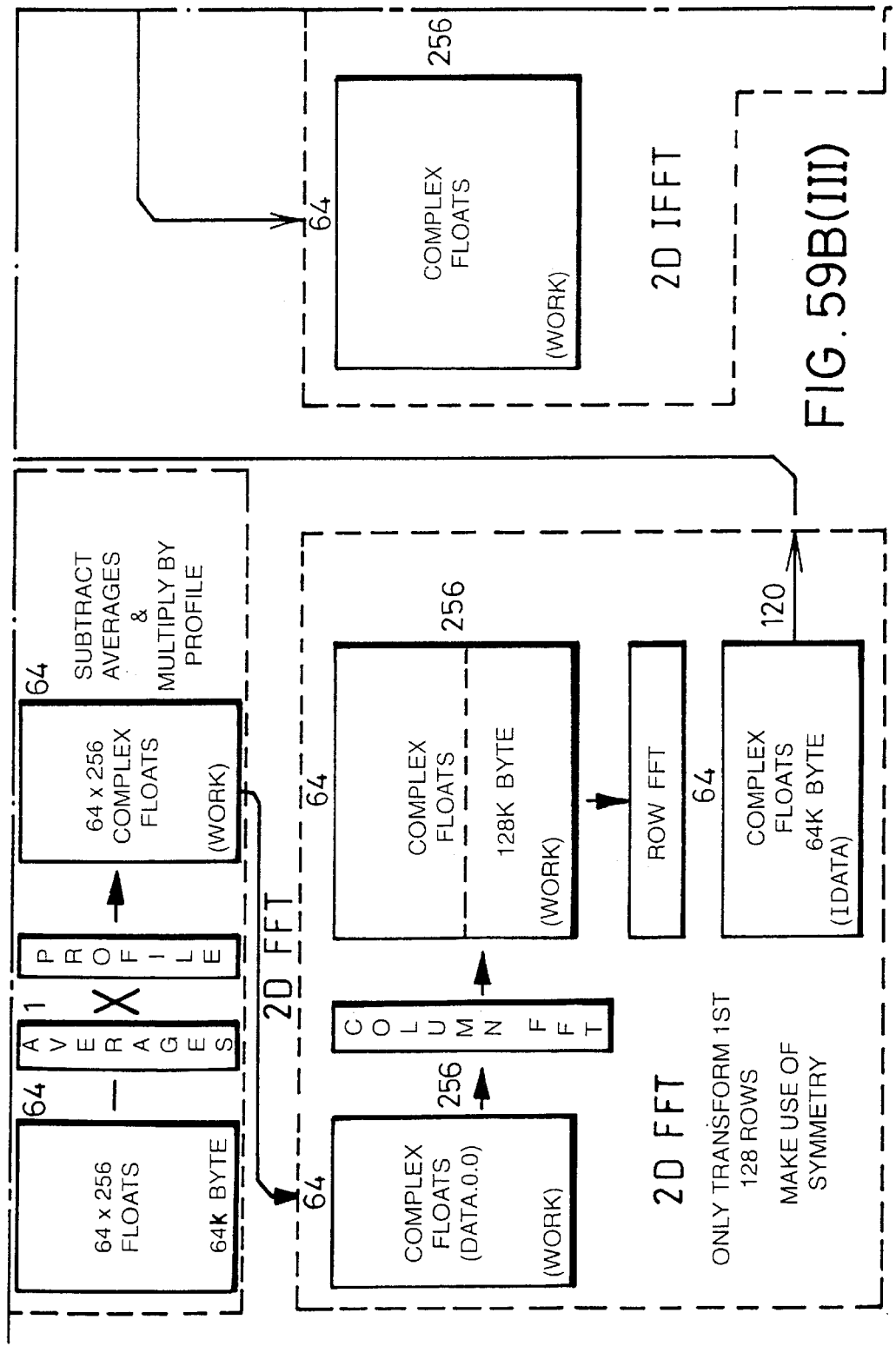
FIG. 59B(III)

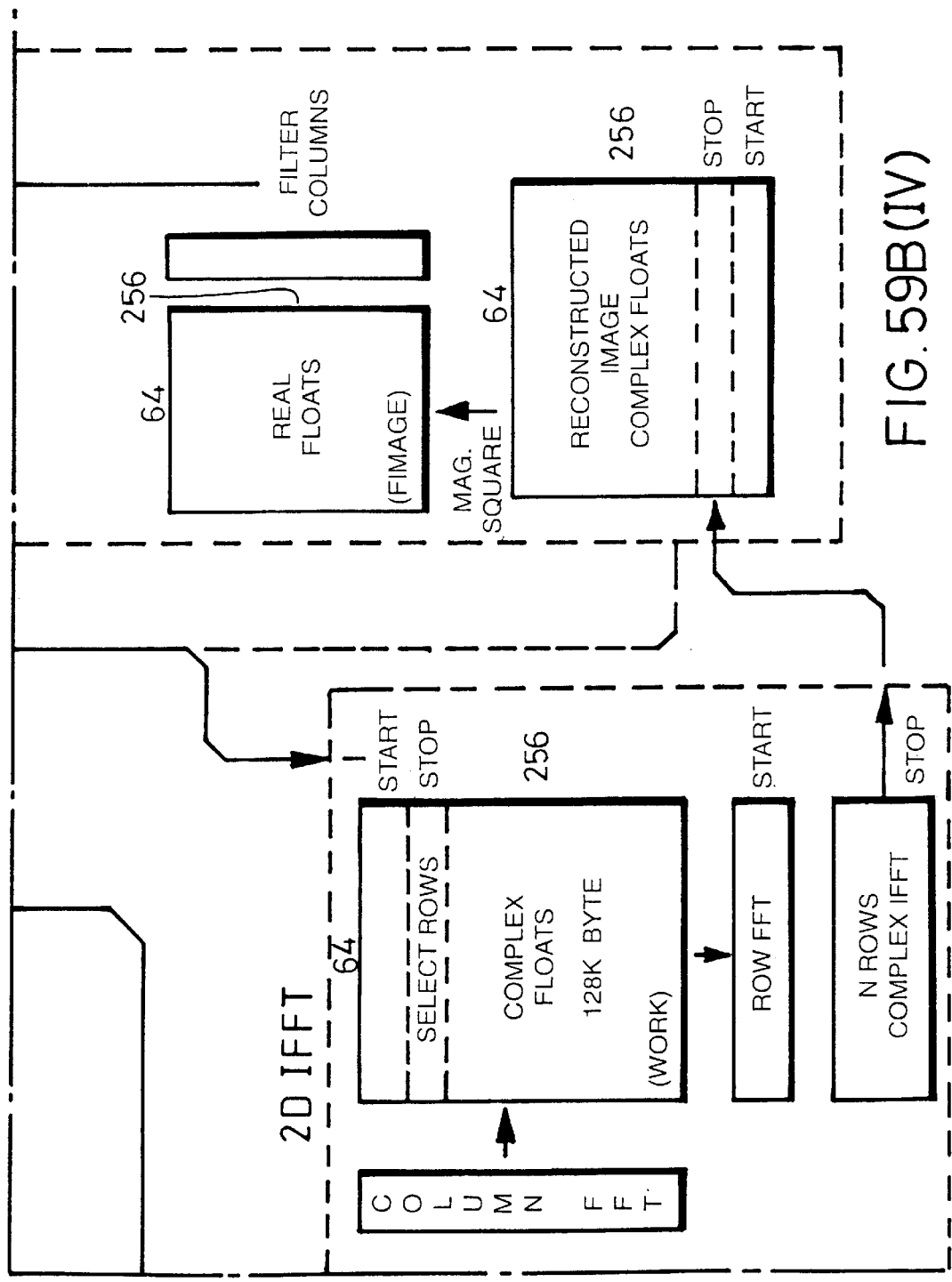
FIG.59B(IV)

FIG. 60A
| 0  |  | HELP     |
|----|----------------------|----------|
| 1  |  | CALIBRAT |
| 2  | 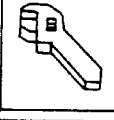 | TOOL     |
| 3  | 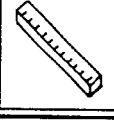 | SURVEY   |
| 4  | 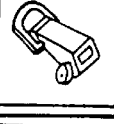 | SCAN     |
| 5  |  | REPLAY   |
| 6  | 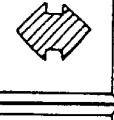 | DIRECTION|
| 7  | 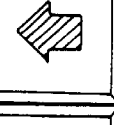 | LEFT     |
| 8  | 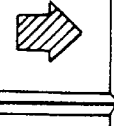 | RIGHT    |
| 9  | | UP       |
| 10 | | DOWN     |
| 11 | | RETURN   |
| 12 | | PLAY     |
| 13 | | STOP     |
| 14 | | START    |
| 15 | | PAUSE    |
| 16 | | REVIEW   |
| 17 | | INCREASE |
| 18 | | DECREASE |
| 19 | | YES      |

FIG. 60B

| 20 | ✗ | NO |
|---|---|---|
| 21 | ? | QUERY |
| 22 | A | LETTERA |
| 23 | B | LETTERB |
| 24 | C | LETTERC |
| 25 | M/ft | METRIC |
| 26 | 🔧 | SETUP |
| 27 | NEXT | NEXT |
| 28 | EXIT | EXIT |
| 29 | | BLANK |

| 30 | RADAR | RAW (NOT USED) |
|---|---|---|
| 31 | DETECT | PROC (NOT USED) |
| 32 | MAP | MAP |
| 33 | 💾 | SAVE (NOT USED) |
| 34 | 1 | ONE |
| 35 | 2 | TWO |
| 36 | 3 | THREE |
| 37 | 4 | FOUR |
| 38 | 5 | FIVE |
| 39 | 6 | SIX |

FIG. 60C
| | | |
|---|---|---|
| 40 | 7 | SEVEN |
| 41 |  | WAVES |
| 42 | 0 | ZERO |
| 43 | 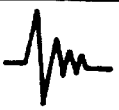 | PROFILE |
| 44 |  | CORTHUP |
| 45 |  | CORTHDWN |
| 46 |  | CORLNTH |
| 47 |  | ENGYUP |
| 48 |  | ENGYDWN |
| 49 |  | DEFAULT |
| | | |
|---|---|---|
| 50 |  | MORE |
| 51 |  | PROCOPT |
| 52 |  | COMMS |
| 53 |  | WAVESAVE |
| 54 |  | REPORT |
| 55 | D | LETTERD |
| 56 | | |
| 57 | | |
| 58 | | |
| 59 | | |

UNDERGROUND PIPE LOCATING SYSTEM

BACKGROUND OF THE INVENTION

The present invention relates to a system of locating and identifying underground pipes, such as those which carry gas, water and waste to/from homes and building so that, among other things, these pipes can be avoided by excavating equipment or the like. More particularly, the system of the present invention enables the detection of such objects utilyzing, in combination with other novel elements of this invention, ground-probing RADAR.

This invention further relates to the RADAR detection of underground pipes, for example, and more particularly relates to a system which focuses a characteristic hyperbolic RADAR response received from an underground object, such as a pipe or other object, utilizing synthetic aperture type technologies, and further processes same to accurately determine said object's underground position.

Accurate RADAR-based underground object detection has always been an elusive goal because of the variability of the ground as a conducting medium in three dimensions, i.e., inherent variations in ground layers, density, obstructions, dielectric constant, etc. Water content, in particular, acutely varies the ground's dielectric constant which correspondingly attenuates RADAR signals making consistent detection of targets underground difficult at best. Electromagnetic signals transmitted into the ground and reflected from an object buried therein tend to suffer high signal attenuation resulting in low signal-to-clutter and signal-to-noise ratio. Efforts to improve detection ability have found that while a single frequency of operation may be desirable in a particular type soil, the same frequency may be undesirable in another, frequently misinterpreting said objects as ground clutter by conventional underground radar systems.

In an effort to overcome inadequacies of conventional underground RADAR detection, U.S. Pat. No. 3,831,173 discloses a ground radar system which utilizes a transient signal comprising a wide variety of radiated frequencies, Due to the use of the transient signal, effective reflections are received from a wide variety of underground objects such as pipes, utility lines, culverts, ledges, etc., to depths around 10 feet. The '173 system, however, while appropriate for detecting small conducting objects, is basically unable to accurately detect non-conducting objects with cross-sections of less than one or two feet.

U.S. Pat. No. 3,967,282 discloses a detector for detecting both metallic and non-metallic objects, based on differences in the dielectric constants of the object and its surrounding medium, in order to give a location of the object. The '282 invention, however, is burdened with difficulty in processing the received data such that accurate object detection and positioning is not achieved.

U.S. Pat. No. 4,706,031 discloses a method and apparatus for identifying a target object located in the ground, in the air or under water. The basis within the disclosure for detection and target identification resides in the apparatus use of the phase deviation between the transmitted and received (echo) radio-wave signals. A signal containing a mixture of various frequencies is transmitted and the return signal or signals are analyzed. A detected difference in phase deviation between the particular frequencies received is used to identify the material properties of the object from which the energy is reflected. The '031 apparatus, however, is still plagued with problems when it comes to detecting small non-conducting objects.

U.S. Pat. No. 4,951,055 discloses a ground probing RADAR which includes means for displaying echo images of a buried material. The displayed images are capable of providing a depth direction of the buried material and a movement direction of a moving vehicle carrying the RADAR. The RADAR includes first means for forming a hyperbolic echo image of the material, and causing a hyperbolic echo image to be displayed on the display means, second means for forming a false echo image and causing the false echo image to be displayed on the display means, third means for inputting data to the second means to cause a displayed position of the false echo image to be shifted so that a vertex position of the false echo image and expansion opening thereof coincide with those of the echo image of the buried material, and fourth means for calculating a propagation velocity of the electromagnetic waves in the ground on the data indicative of the vertex position and opening expansion of the false echo image when the two displayed echo images coincide with each other. A position of the buried material is detected on the basis of the propagation velocity value calculated by the fourth means.

That is, when electromagnetic waves are emitted from a plurality of points on the ground surface above a buried material, an echo image formed on the basis of data of propagation times of reflected waves at their respective points describes a hyperbola as a result of expansion of the transmitted electromagnetic waves. An operation is carried out to overlap, on the echo image, a false echo image lying in the same coordinate system and consisting of a similar hyperbolic image. If the two echo images are overlapped, a vertex position and an expansion of the opening of the echo image can be determined from the data of the false echo image. Thus, the propagation velocity of electromagnetic waves are calculated from the data that represents the vertex position and the expansion of the opening. The position of the material under the ground is then calculated in relation to the data of propagation time in any position.

OBJECTS AND SUMMARY OF THE INVENTION

It is therefore an object of the present invention to provide a RADAR-based Ground Probing RADAR system which overcomes the shortcomings of the prior art.

It is another object of the present invention to provide a ground-probing RADAR system which takes in significant amounts of measurement data during operation, the compilation of which provides for a significant increase in signal-to-noise levels relative prior art underground object-detection systems.

It is another object of the present invention to provide a ground-probing RADAR system which displays a productivity that is significantly enhanced relative prior art systems.

It is yet another object of the invention to provide a ground-probing RADAR system based on reception of data from only one pass over the underground to be mapped with enhanced detection performance relative prior art ground RADAR systems.

It is yet another object of the invention to provide a ground-probing RADAR system with a digital signal processing sub-system which provides a unique method of processing returned RADAR signals with application to geophysical data collection and/or processing.

With these objects in mind, a ground-probing RADAR system is disclosed which provides for detection of the presence of all types of underground objects, e.g., buried pipes and cables, at an underground depth of at least 1.5 meters, and an ability to accurately recognize and identify the location and shape of said objects in three dimensions. The mapping system is radar-based, that is, it transmits an electromagnetic pulse and records a response from buried objects. Objects are accurately detected by the system's unique way of "looking" for a change in dielectric constant within returned (reflected) RADAR signals, enabling accurate detection both metallic and non-metallic targets, such as plastic and concrete pipes, as well as differences in detective material in the ground with three-dimensional distance.

A radar response (reflection) from a point object located underground, such as a pipe, embodies a hyperbola or hyperbolic mapping. The system herein detects such point objects by RADAR scanning over the object, receiving the signal reflected therefrom, and generating an image containing a hyperbolic representation of the object from the reflected signal. A dedicated digital signal processor subsystem within the system processes the raw data present in the received, reflected signal to generate a final image of the object to the user. The image is projected or displayed on a specialized display graphical form to indicate the object's position and estimated depth to a user. The dedicated digital signal processor sub-system accomplishes two primary tasks. The first is migrating or focusing the hyperbolic image from the received signal data to a single point for each radar scan. This "migrating" process is accomplished by the implementation of the digital signal processor sub-system of "clustering" and synthetic aperture radar (SAR) techniques. The second task takes the "migrated" data (i.e., that data consisting of the focused or clustered points) from multiple memory-stored scans and groups the same to extract linear features. The preferred embodiment of the invention may implement a simple SAR or a modified SAR technique (referred to interchangeably herein as super-SAR) which takes into account the relative dielectric constant of the soil (ground). Accordingly, the ground-probing RADAR system accurately computes the target depth.

In a first preferred embodiment, a single-channel ground-probing radar system (referred to interchangeably hereinafter as "the Pipehawk system") is disclosed which operates in accordance with the precepts of this invention. The electronics which enable the unique processing and mapping ability of the present invention, e.g., the Pipehawk system, comprise the following structure. A microprocessor, central to the system's processing (preferably an Intel 80486 or like device) is electrically connected to a user interface (to be discussed in greater detail below). The microprocessor is electrically connected to a display system including display, softkeys and softkey controller to a location system including a wheel sensor, voltage monitoring means and a dedicated microprocessor or microcontroller; a memory storage device such as a hard disk for storing required data; and a digital signal (DSP) processor, preferably an AT&T DSP326, for performing the unique processing particular to this system. The DSP processor is electrically connected to the RADAR transmitter and receiver sub-system.

The Pipehawk system is capable of accurately pinpointing underground objects, e.g., piping, whether plastic or metal, to provide an operator with an immediate display of its location. The Pipehawk RADAR transmitting/receiver sub-system includes a single channel RADAR antenna system comprising a dipole element and dipole element positioning apparatus which coordinates incoming data with data from positioning sensors located in the wheel or wheels. Examples of such element and positioning apparatus are described in commonly owned Great Britain Patent Specification Application Numbers 8629412 and 8629415, respectively, incorporated herein by reference.

Operation is accomplished with a user walking the Pipehawk system over the underground to be mapped, at a moderate pace, while a radar scan with the single channel dipole element system is performed repetitively. With each radar scan, the cross-section of the ground corresponding to the center line of the system structure is searched. By carrying out a series of such scans and performing various digital signal processing (DSP) schemes and analysis techniques implemented in the digital signal processor, the Pipehawk system provides a picture of the underground environment. Special features inherent in the system's design allow for adjustments for the different soil compositions, filter facilitating accurate detection.

A second preferred embodiment of the ground-probing RADAR system of this invention includes structure and/or programmed instructions which enable the system to operate in super-sensitive applications. To complement such processing ability, the system (referred to as Pipehawk II) also includes a double channel RADAR antenna sub-system comprising two dipole elements and positioning apparatus. The Pipehawk II system, as well as the Pipehawk system, may embody various structure for various applications, in accordance with those skilled in the art of mechanically engineering and coordinate manufacture of such systems, and in accordance with the several exemplary structural descriptions which will follow.

BRIEF DESCRIPTION OF THE DRAWINGS

FIGS. 2A, 2B, 2C and 2D are pictorial representations of several of the graphical icons utilized by the system of this invention, as associated with the graphical displays discussed herein with reference to FIG. 2;

FIGS. 4B and 4C are graphical representations which together show correlation by the system of FIG. I of stored hyperbolae and raw data, and the resulting outputs;

FIG. 10 is a plot of depth buckets reflecting varying depth of the same target;

FIG. 11 is a plot of target data reflecting variance of hyperbolic representation with the varying depth of the target;

FIGS. 13, 14, 15 and 16 are sequential pictorial flow representations of one form of two dimensional processing of hyperbolic response data performed by this invention;

FIGS. 17, 18, 19 and 20 are sequential pictorial flow representations of multiple target detection processing performed by this invention;

FIG. 21 is a sequential, pictorial flow representation of the resulting fill scan of the stacking of each data layer generated in processing;

FIG. 22 is a sequential, pictorial flow representation of processing results associated with target location for each ground level processed, and amplitude detection implemented in accordance with the processing steps defined herein;

FIGS. 26, 27 and 28 are, respectively, a bottom plan view, a side view and a top plan view of a physical implementation of the first embodiment or Pipehawk system of this invention;

FIGS. 31A and 31B are schematic representations of delay coils for use within the antenna module of this invention;

FIGS. 36A, 36B, 37A, 37B, 37C, 38A, 38B, 38C and 38D are schematic representations of various hardware elements which may be used herein;

FIG. 39A is a top plan view of the handle gripped by the user of the system of the present invention;

FIG. 39B is a left side elevational view of the handle of FIG. 39A.

FIGS. 40A, 40B, 40C, 40D, 40E and 40F are schematic representations of various hardware elements for use herein, in conjunction with Table A;

FIG. 43 is a timing diagram of the multi-channel architecture of the architecture of FIG. 42;

FIG. 44 is a pictorial representation of an antenna measurement path generated by the Pipehawk II;

FIGS. 47A and 47B are pictorial representations which show front and side perspective views, respectively, of a hand held dual-channel RADAR system (Pipehawk II) of this invention;

FIGS. 48A, 48B and 48C are detailed views of specific portions of the embodiment of FIG. 47;

DETAILED DESCRIPTION OF THE PREFERRED EMBODIMENTS

The ground-probing RADAR system of present invention may embody various physical forms and/or structures. Several embodiments of ground-probing RADAR systems, designed in accordance with the invention, will be discussed in the following description. It must be noted, however, that while the embodiments disclosed are preferred implementations of the inventive concepts comprising the invention, said embodiments are disclosed for exemplary purposes only and are not meant to limit the scope or spirit of the invention in any way.

Figure 1:
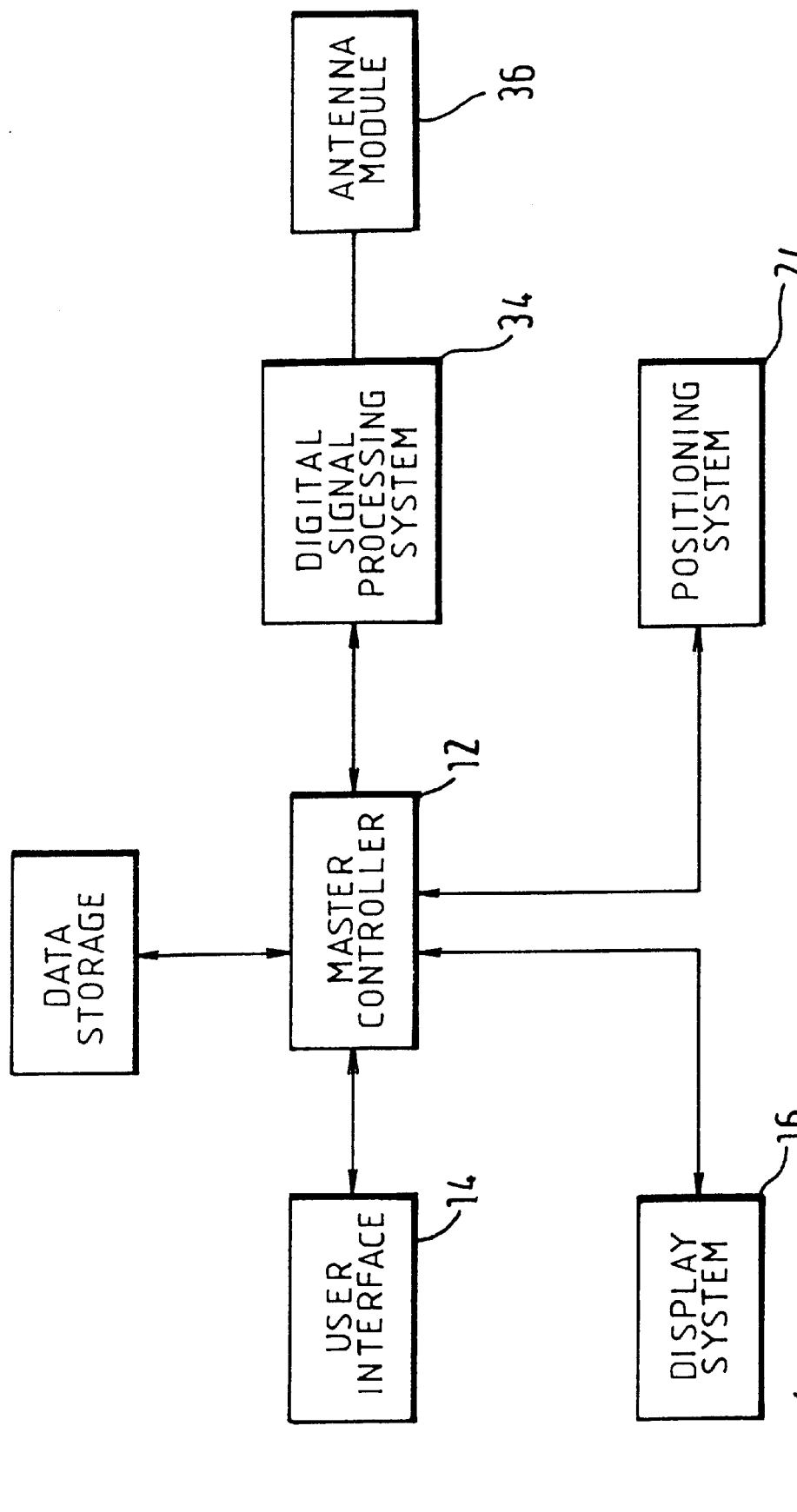
FIG. 1 is a functional system block diagram representing one embodiment of the ground-probing RADAR system of this invention.

A system level block diagram of a first embodiment of the invention, hereinafter referred to interchangeably as the RADAR or Pipehawk system 10, is depicted in FIG. 1. Central to the Pipehawk system's unique processing is a master controller 12, preferably an Intel 80486 or like microprocessor device. The master controller 12 is electrically connected to a user interface 14 (to be discussed in greater detail below); a display system 16 including display 18 with softkeys 20 and a softkey controller 22; a positioning system 24 including a position controller 26, position sensor 28, and voltage monitoring means 30; data storage 32, preferably a hard disk, for storing required system data and parameters; and a digital signal processing (DSP) system 34, preferably an AT&T DSP326. The DSP system 34 is electrically connected to an antenna module 36 which includes RADAR signal generation 40, transmission 46 and reception apparatus 50.

It is a unique Hough transform, implemented by the Pipehawk system's hardware which enables its RADAR, via its digital signal processing system, to "look" for shapes within a set of data points. The RADAR looks for any existing objects in a scan, by correlating linear features within the raw data and grouping said features together. Once the features are grouped together, a line is drawn through the points by the system's dedicated graphics, i.e., a white line drawn vertically downwards the screen. When such a line is found, it is possible that a pipe exists at the location. An advantage of Hough transform is that it is typically unaffected by point gaps.

The Pipehawk system 10 operates on the basic principle that the velocity of a transmitted and received signal is a function of the dielectric constant of the soil in which it travels. That is:

$$v = c/(\epsilon_r)^{-0.5},$$

where v is the signal velocity, c is the speed of light and $\epsilon_r$ is the dielectric constant of the soil. If the dielectric constant of the soil is known, the velocity of the signal as well as the target depth can be determined.

The master controller 12 implements system integration and operation in accordance with a set of instructions, either ROM-resident software or defined by hard-wired logic circuits. In its preferred form, the operation of the master controller is wholly maintained by the system-based software, hereinafter referred to interchangeably as the system software. One preferred embodiment of the set of instructions, i.e., the system software. Through the system software, the master controller controls user input from the user interface 14 and data transfer to/from the display system 16, that is, the softkey controller which controls softkey-based (20) data display, as well as memory storage and/or transfer of processed data and user-defined system parameters. Control over all subsystems is provided thereby, including the position controller 26 to control any data and/or data flow from the RADAR system's 10 positioning system 24, e.g., a wheel sensor system, and the digital signal processing system 34, which includes not only a digital signal processor (DSP) 88 which controls processing, but system throughput of all DSP data.

As mentioned above, the system software is preferably implemented on an Intel 80846 microprocessor. The code defining the system software operation may be written in any programming language known to those skilled in the art which is able to effectively carry out the functions described hereinbelow. The detailed description of the system operation is conveniently described with reference to the following system software explanation. Accordingly, a preferred system operation and system software operation will now be described with reference to FIG. 2.

Figure 2:
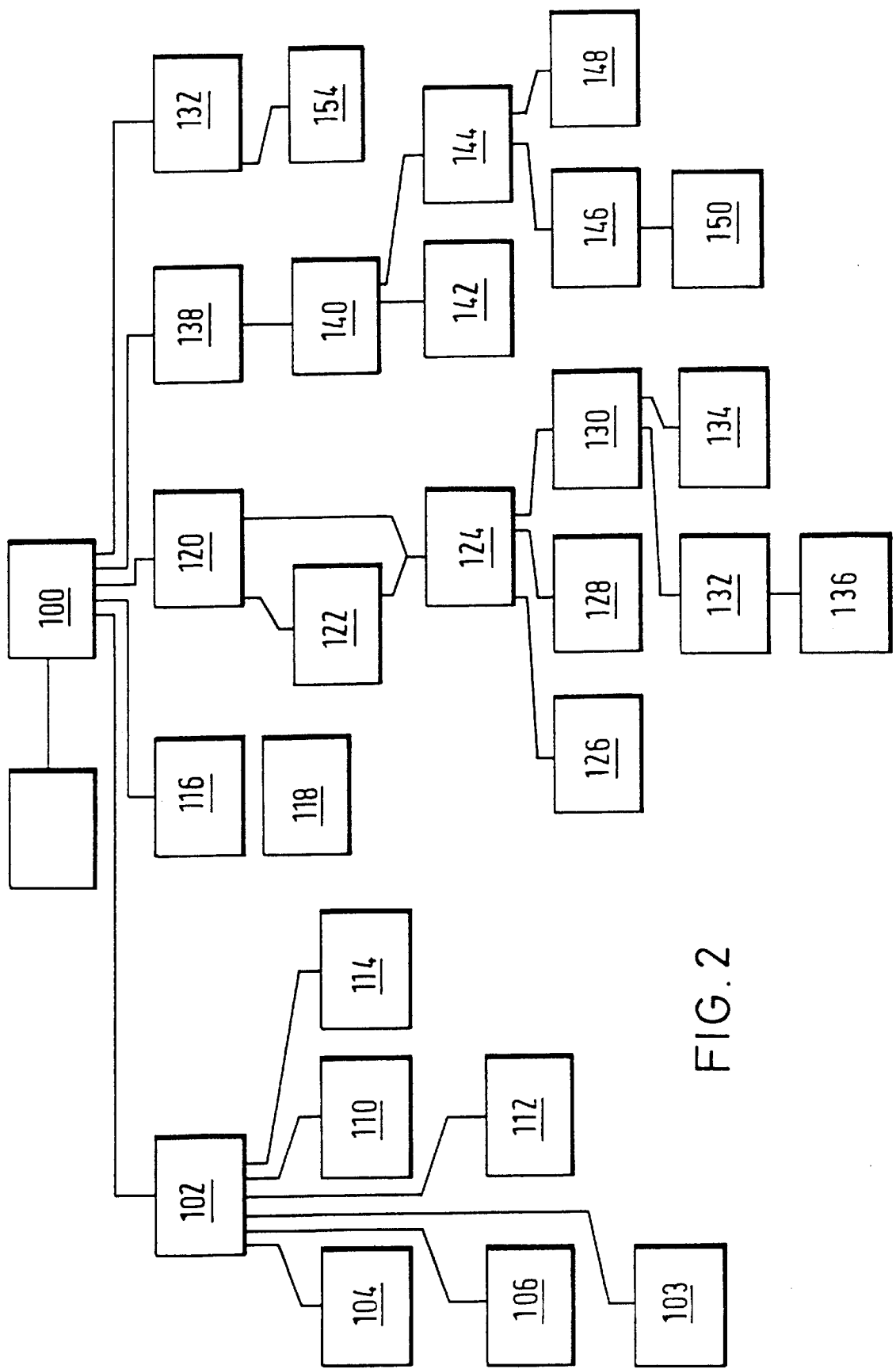
FIG. 2 is a system flow diagram of the different levels of graphical display screens which are brought up on the system's display during system operation, in accordance with operator softkey input, in a preferred embodiment of the processing control of the embodiment of FIG. 1.
Figure 2A:
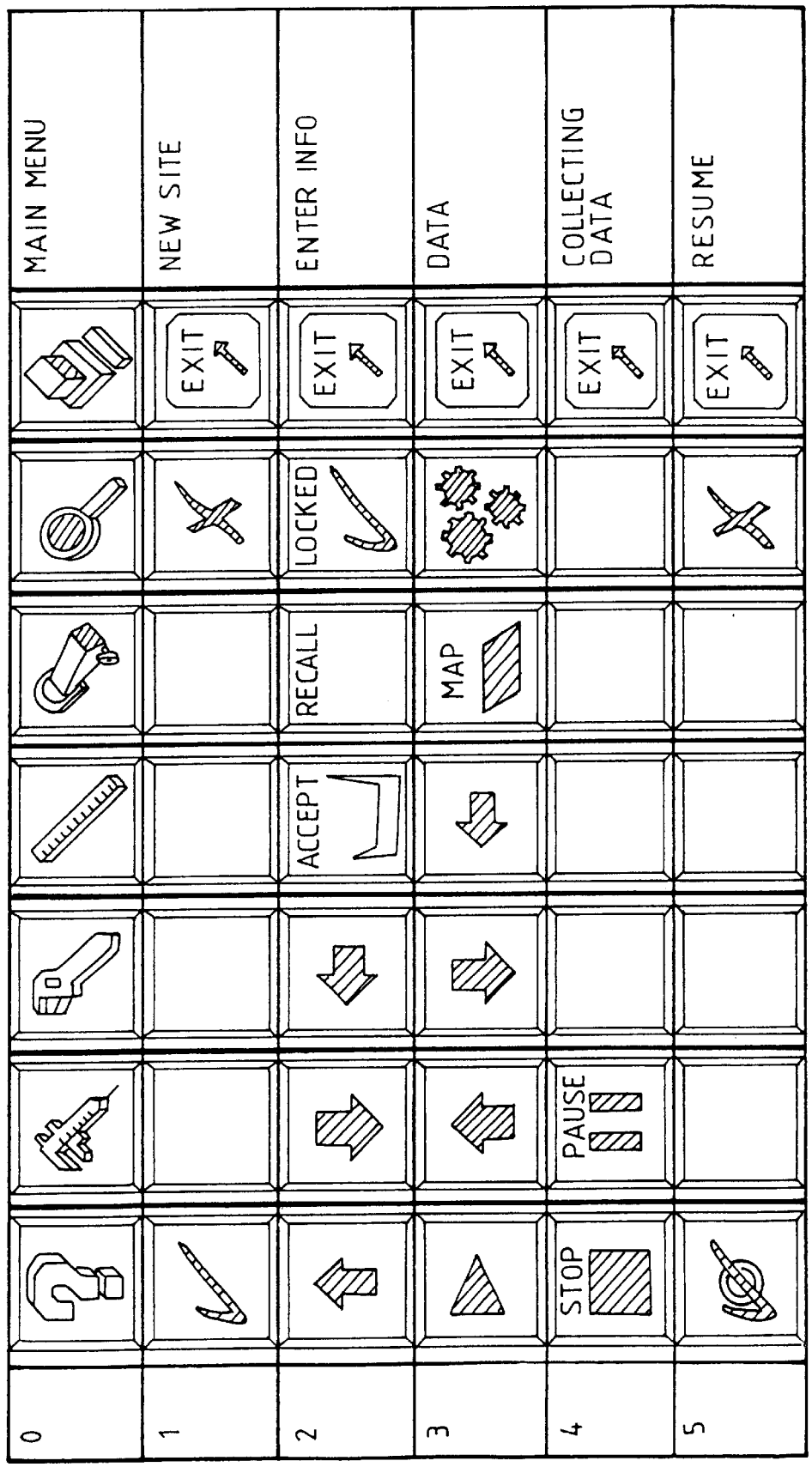

FIG. 2 shows the various graphic displays which can be brought up to the display screen upon sequencing-through the softkeys located at the bottom horizontal of the display 20. Just above the softkeys is located a horizontal portion of the screen which is dedicated to displaying icons associated with the softkey, and the processing initiated by a press of the softkey. At system start-up (boot-up), the coded instructions of the system software generate and send main menu graphics display data to the display screen. The main menu graphics (i.e., software control) present a user with choices representative of the five different types of data processing available in this embodiment. By pressing the softkey proximate the graphic representation (or icon) of the particular processing type, the coded instructions change the processing type and the dedicated softkeys, and refresh the screen with new graphics representative of that level's available processing (the horizontal marked "MAIN MENU" of FIGS. 2A, 2B, 2C and 2D). New icons are put up on the screen to represent the softkey applications. In other words, the same keys now, if pressed, initiate routines for particularized data review.

By pressing the third softkey of the MAIN MENU display 100, represented by the "adjustable wrench" icon as shown in FIG. 2, the software control takes the user down through the coded instructions one level to the tools graphical display, identified as block 102 in FIG. 2. If the softkey which is directly in the middle at the main menu level is pressed, representing the "ruler" icon as shown in FIG. 2, the instructions would sequence through to present a survey display graphics, represented by block 116 of FIG. 2. Pressing the softkey key which is third from the right, proximate the "scan" icon, causes a graphics display 120 representing scan or data collection processing. The softkey which is second from the right, proximate a replay icon, will cause a "sites" graphical display associated with the system's data review processing to become active. By pressing the softkey located second from the left, proximate the "pipe wrench" icon, processing becomes enabled which is utilized to calibrate or adjust system operation.

As mentioned, pressing the key proximate the Tools icon at the main menu level 100 of FIG. 2 offers the user a number of new choices, in a form of reprogrammed softkeys and their associated icons. A scale graphical display 104 presents the user with a level of softkey options directed to scaling all processed data on the screen for the users convenience. A physical characteristic graphical display 106 allows user access (via softkeys and their associated icons) to such characteristics as battery level, temperatures at different points within the system, sensor status, internal status and fan status. A waveform monitoring graphical display 108 represents that processing which will allow the user to monitor and/or control the shape of the raw or averaged signal waveform. An adjust sampling window graphical display 110 allows a user to choose (through softkeys and associated icons) the size of the system's sampling window to fine tune specific mapping situations. Also, a storage status graphical display allows a user access to memory storage information which could affect processing.

As mentioned, pressing the key proximate the survey icon brings up the survey graphical display 116 of FIG. 2. The survey display presents the user with survey and information data options in the form of softkeys, as well access to a second survey menu display 118. Together, these displays enable the system 10 to operate as a surveyor's measurement wheel, measuring in metric or imperial units.

As mentioned, pressing the softkey proximate the scan icon brings up a scan display 120 of FIG. 2. The scan display graphics and associated functioning allow the system to be used as a RADAR and to collect data. The scan display 120 requires user input, via the reprogrammed softkeys, regarding status of the site being (or to be) mapped. In particular, scan display 120 allows the user to access a data collection graphical display 124 either indirectly through an enter information graphical display 122, or directly from the scan graphical display. At the collect data graphical display 124, the user is again offered next level options in a form of softkeys whose function is represented by collecting, processing and mapping icons. Pressing each icon's associated softkey brings up collecting data graphical display 126, a map mode graphical display 128 and a process option graphical display 130, respectively. The process options graphical display 130 offers a user a choice of data processing, as well as the access to two more or lower level graphical displays. The first is another process options graphical display 134 and the second is a window start graphical display 132. From the window start graphical display 132 and associated icons, the user may again move to a new system level in a form of a new window finish graphical display 136.

As mentioned, pressing the softkey proximate the "sites" icon puts up the sites graphical display 138 of FIG. 2. The graphical display menu asks the operator if he/she wishes to open a new file for a new site survey, or continue adding scan data to the last file. The "list of sites" graphical display allows the user to access stored site information, as well as another level of processing in the form of a display data graphical display 140. Display data graphical display 140 gives the user options about displaying its stored data, as well as the option to move a next level down to either a map mode graphical display 142 or a process options graphical display 144. The process options graphical display 144 offers a user the option of particularized processing as well as two other graphical displays, window start graphical display 146 and process options graphical display 148. Window start allows a user to drop to window finish or exit graphical display 150.

As mentioned, by choosing the pipe wrench icon, the graphical display providing a basis for system calibration and associated processing comes up. It is in the confirm exit icon that a user is required to press a softkey to confirm his/her decision to discontinue processing such that system software control ( and therefore system control) is passed to an external controller. Several representations of softkey associated icons, as well as inference of the action which is taken by the system in response to such a keypress is shown in the key charters listed in numerical order. It must be noted however, that the prior description represents only one possible scheme for implementing system software control available in accordance with this invention, and should not be used in an attempt to limit its scope.

Figure 3:
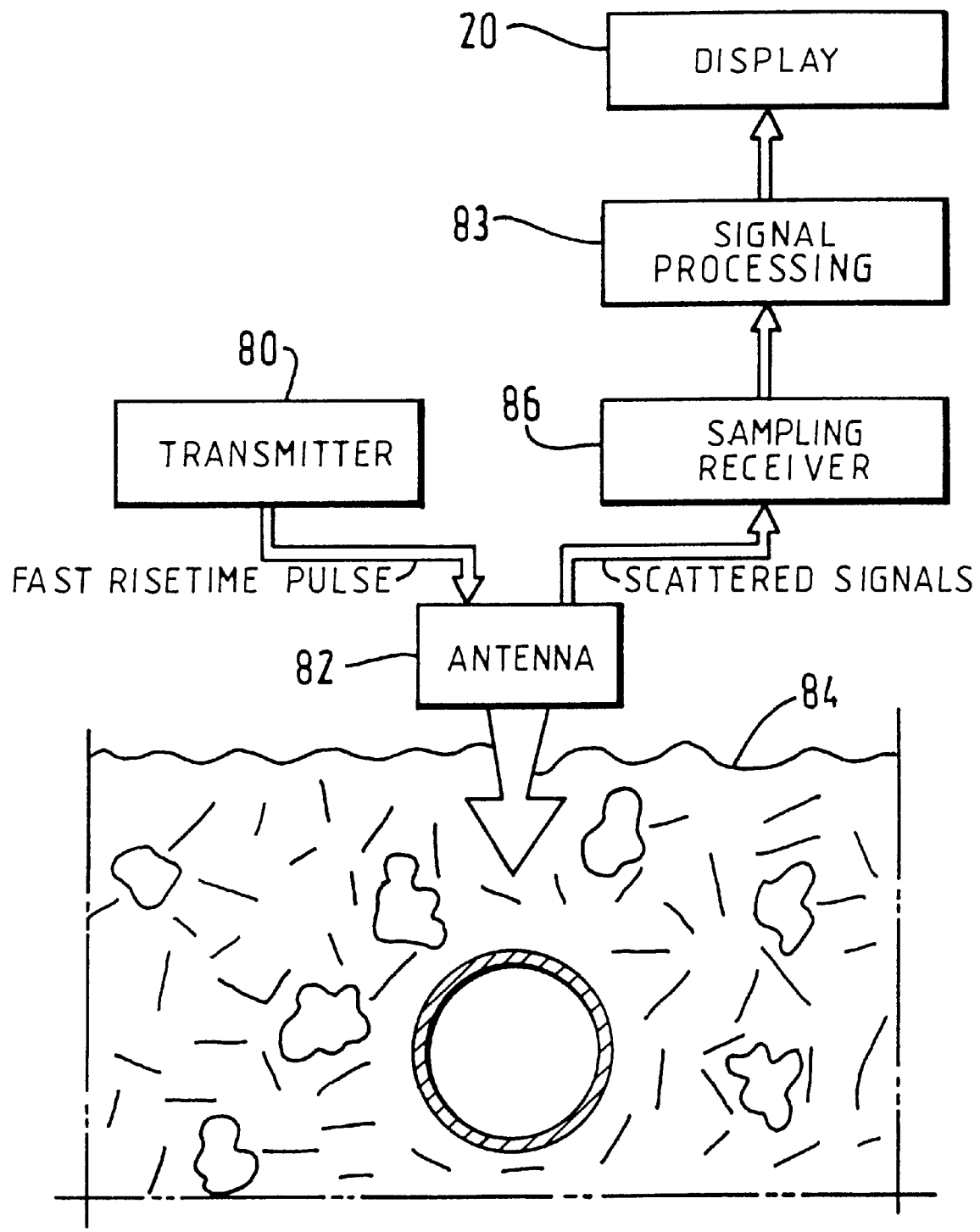
FIG. 3 is a diagram showing an underground pipe and several block diagrams depicting a particular type of RADAR processing performed by the embodiment of FIG. 1.

FIG. 3 is a general schematic block diagram which exemplifies the RADAR portion of the Pipehawk system 10, superimposed next to a representation of a section of a pipe buried in the ground. The invention, e.g., the Pipehawk system, operates by introducing a fast risetime electromagnetic pulse signal into the ground, and detecting and processing information contained in the signal returned therefrom. The presence of metal generates a major change in electrical properties, but system 10 is sensitive to other changes such as the presence of plastic, water or air. Scattering of the radiated pulse signal is produced by changes in the ground conditions returns; a small fraction of the radiated electromagnetic pulse signal is received at the antenna module. In FIG. 3, a pulse generator acting as a transmitter 80 feeds an electromagnetic pulse signal to antenna 82 to be radiated into ground 84. The signal portion returned, i.e., the reflected or scattered radiated signal energy, is received by antenna 82 and passed electrically into a sampling receiver 86. In the sampling receiver, the signal is "massaged" and digitized for processing, then passed into DSP 88 of digital signal processing system 34. The processed data generated therein is passed to display 20 of display system 14. While FIG. 3 shows only several basic elements of one embodiment of this invention, an actual Pipehawk system is fully integrated and autonomous. System operation is triggered from a signal generated in a wheel sensor to ensure that measurements are made in a regular and repeatable grid. All input or raw data is automatically stored in memory storage and processed by DSP 88.

Figure 8:
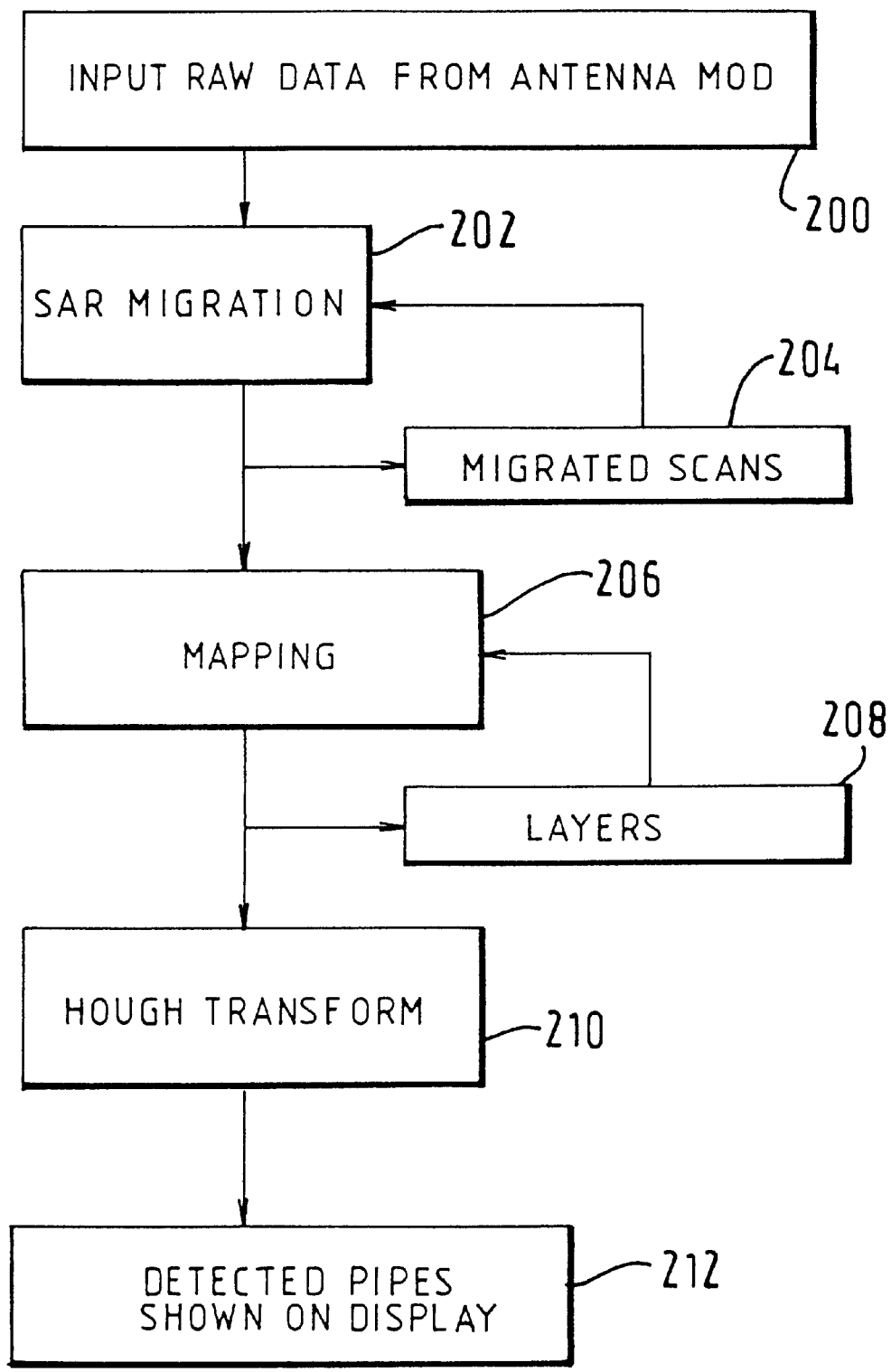
FIG. 8 is a block diagram representing digital signal processing which may be implemented by the invention.

Digital signal processing system 34 uses a collection of scans implemented by the antenna module 36 to determine if a an object, e.g., buried pipe, is located in a site (as well as its depth). FIG. 8 broadly depicts an object (pipe) detection process of this invention, beginning with a first step, represented by block 200, in which raw data from the ground-reflected signal is collected within in a DSP 88 of DSP system 34, said raw data transferred in from antenna module 36. Block 202 represents a second step by which SAR processing and/or a migration operation is performed on the data within the DSP board. Block 204 represents a step of repeated SAR and/or migration procedure performed on raw data. Block 206 represents a step of mapping the processed (migrated) data. Block 208 represents a result, i.e., layers, of repetitive scanning. Block 210 represents a step wherein the DSP board performs a Hough transform on the then-processed data. Finally, block 212 represents a delivery of the processed data in a recognizable form to the user, i.e., put up on display 20 within display system 16.

The characteristic hyperbolic response produced by underground objects detected in the reflected signal received at antenna 82 by the Pipehawk system 10 changes with depth, as well as changes of the dielectric constant of the soil with depth. The curvature of the hyperbola-like database are known to decrease with depth, however, said data are also found to decrease, independently of depth, with decreasing dielectric constant. Concomitantly, the shape of the hyperbola changes with depth and with changing dielectric constant. For that matter, the curvature of the hyperbolic representation of the object increases with increasing dielectric constant, as clearly described by FIG. 4. It has been found, however, in testing performed on a prototype Pipehawk system, that any variation in dielectric constant with depth that occurs during measurement is very small and gradual. Accordingly, variations in dielectric constant can be assumed to be zero, or mathematically modeled to be incorporated into the processing to compensate for any changes in dielectric constant that occur. The unique processing which takes advantage of this knowledge to determine the correct dielectric constant is referred to as super-SAR.

Figure 5:
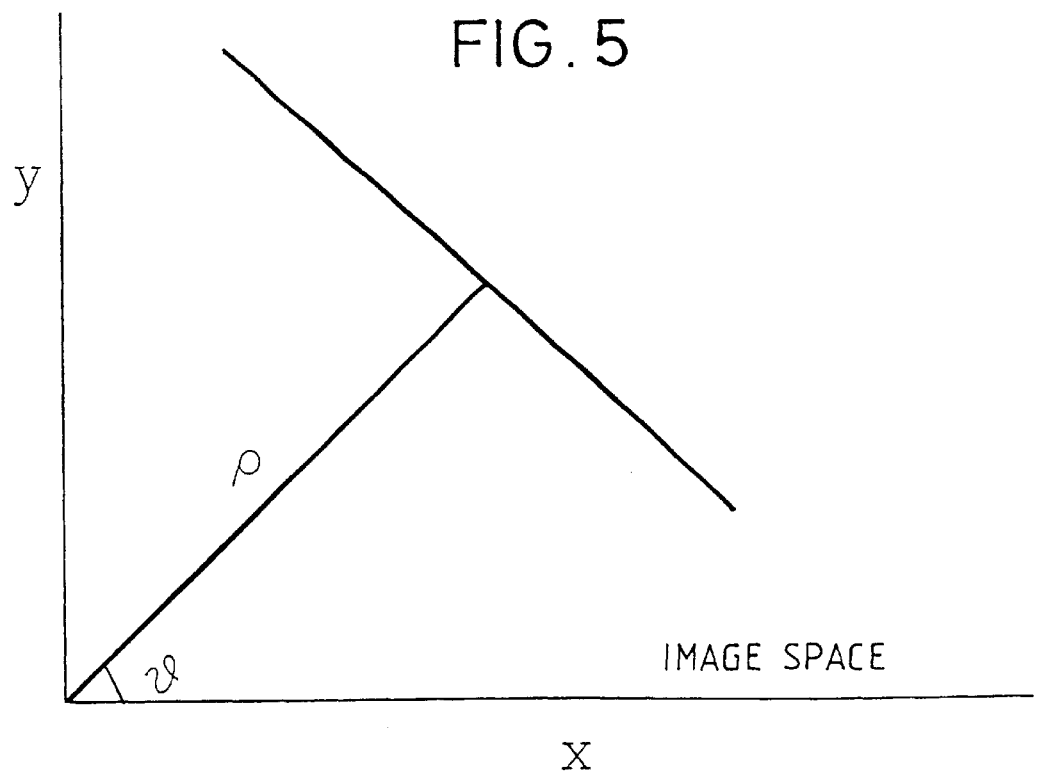
FIG. 5 is a graphical representation of a line in image space generated by the embodiment of FIG. 1.
Figure 6:
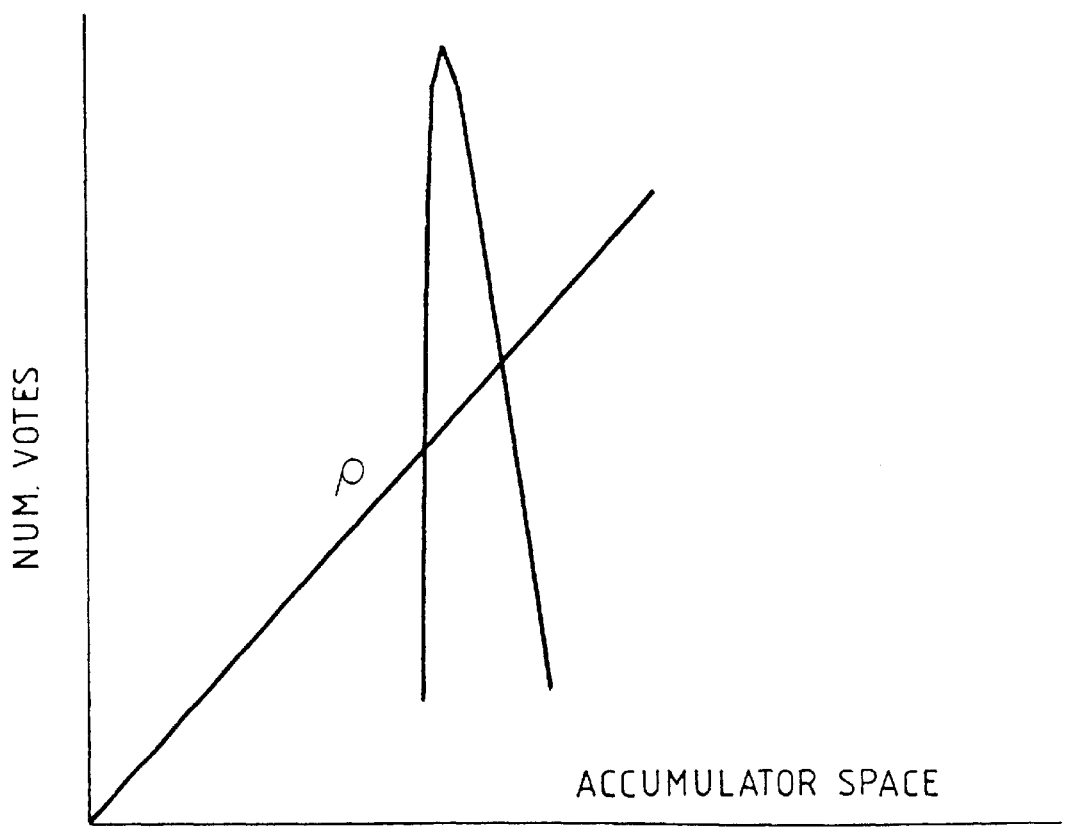
FIG. 6 is a graphical representation of a point in accumulator space generated by the embodiment of FIG. 1.

The digital signal processor system 34 is controlled to perform specific DSP tasks, such as the SAR and/or super-SAR processing described below, on raw data received from the antenna module 36. In particular, the DSP system 34 transforms the hyperbolic point-object data from its raw form to that which can be communicated via the display system 16, i.e., in accordance with the softkey processing. The DSP system 34 performs a number of digital signal processing and filtering techniques, including Hough transformations, which may be referred to herein as synthetic aperture RADAR (SAR) processing in one embodiment, and super-SAR processing in another embodiment. For example, a line in image space of FIG. 5 (hyperbolic data) may be transformed to a point in the parameter or accumulator space after processing (FIG. 6). As shown in the figures, $\rho = x\cos v + y\cos v$, where x, y represent a point on the line, and v varies form 0 to $\pi$.

The system has a set of expected responses from a buried object for different depths ("buckets") for different dielectric constants which are memory stored. When a scan is taken, the raw data are processed using the expected responses to find the closest dielectric constant matching that of the soil. A first pass is required to process the raw data using a wide range of dielectric constants to determine a narrower range for use in a second pass. In the second pass, using the narrower range, the processing selects the best matching dielectric.

Figure 4A:
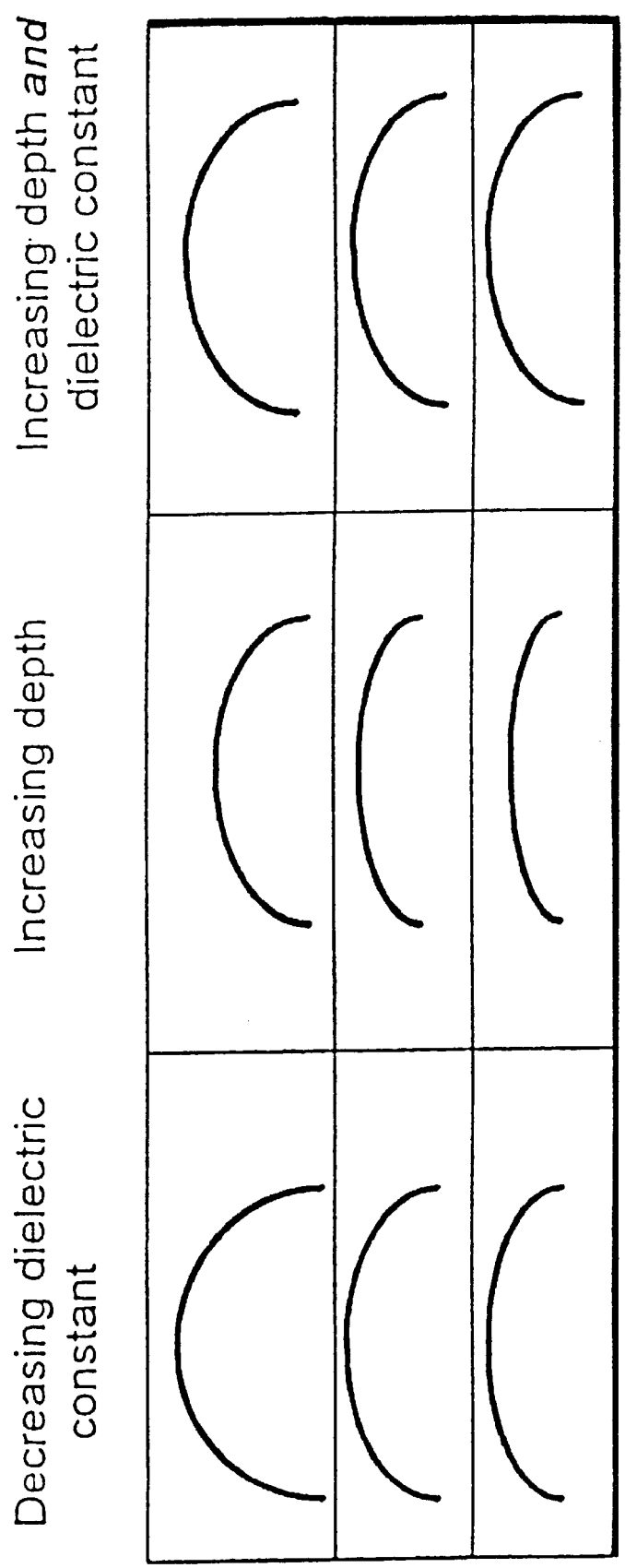
FIG. 4A shows varying curvatures or hyperbolic representations with increasing depth and dielectric constant of objects detected by the system embodiment of FIG. 1.
Figure 4B:
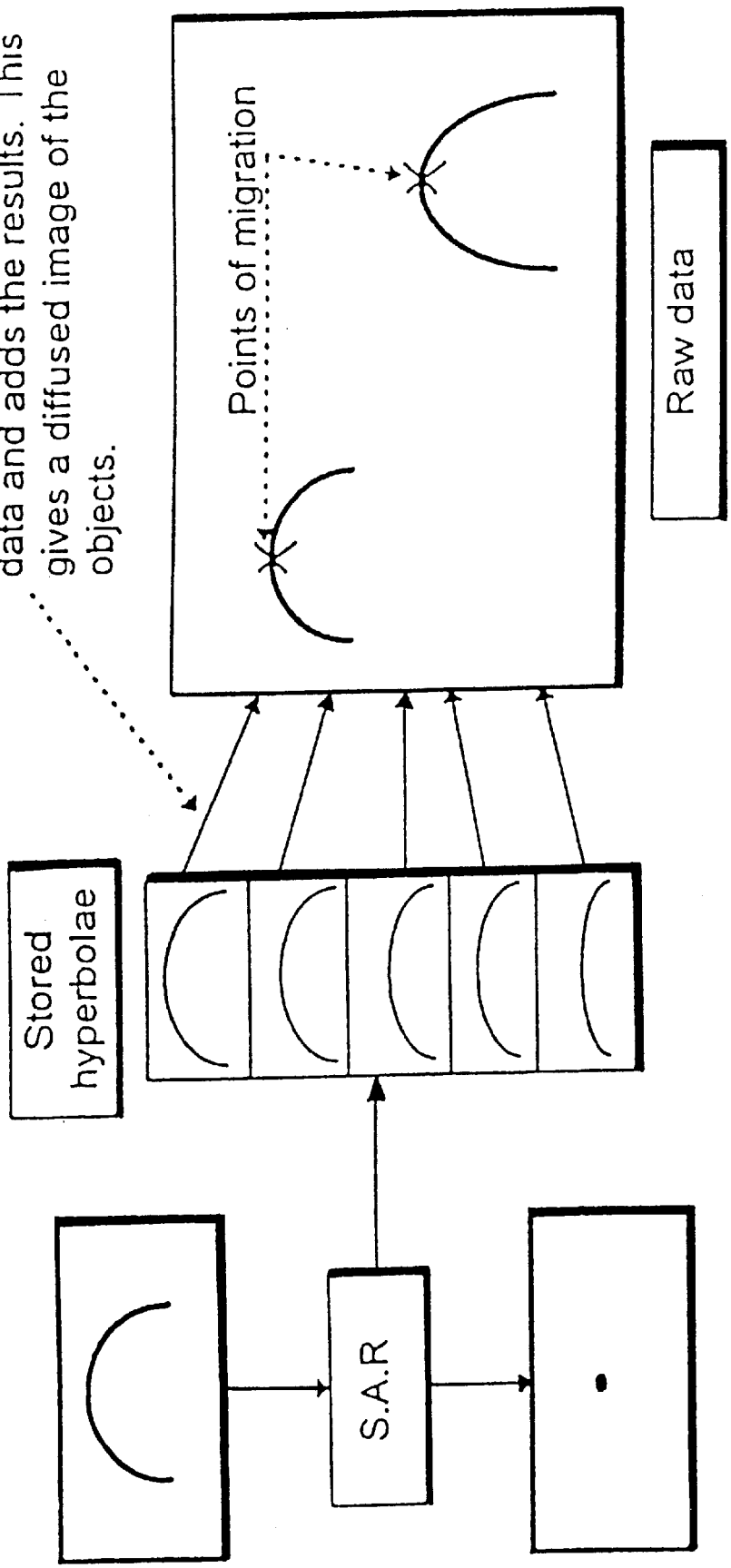
Figure 4D:
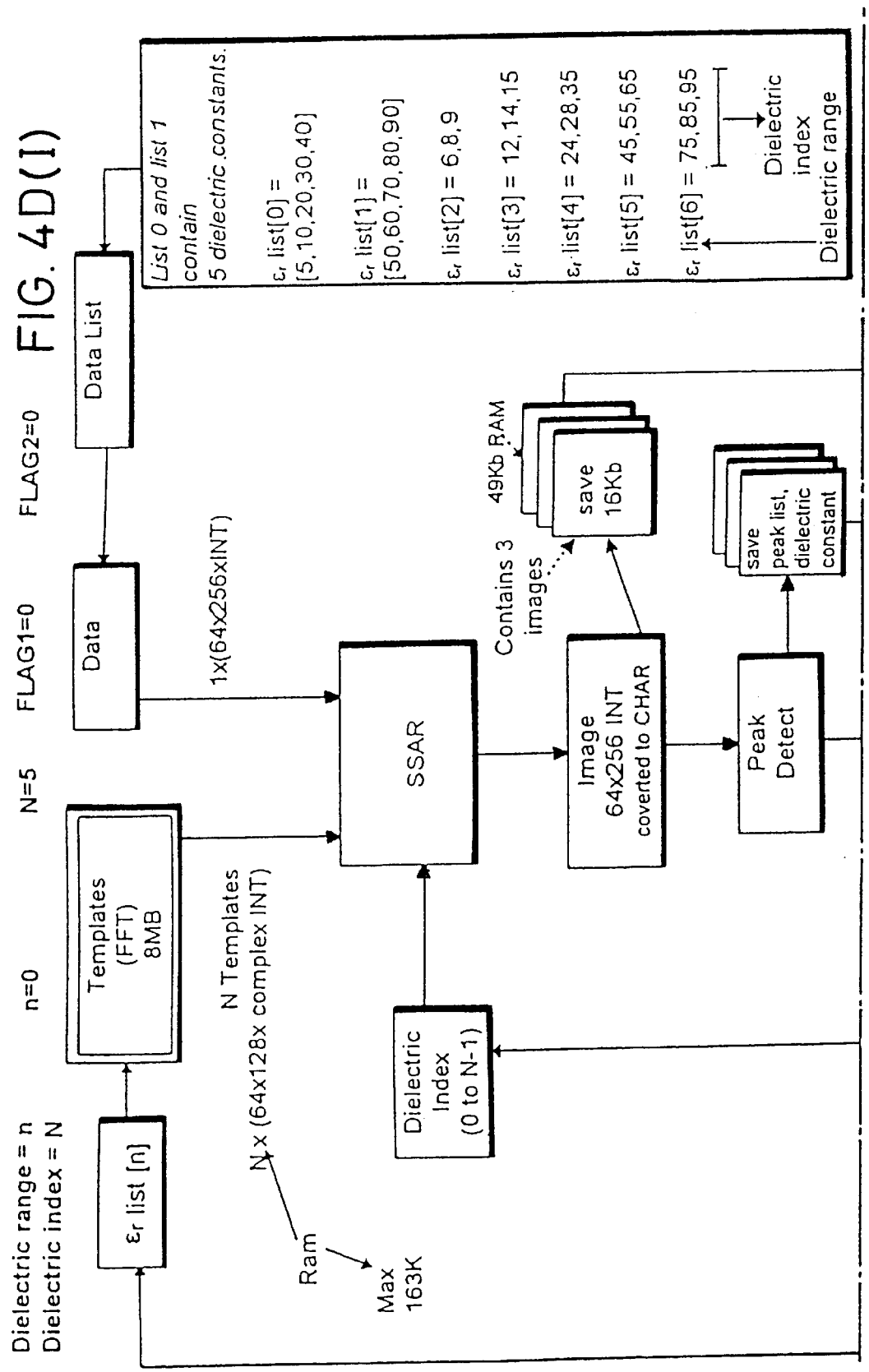
FIG. 4D is a flow diagram of the processing which allows the embodiment of FIG. 1 to identify dielectric range and index.
Figure 9A:
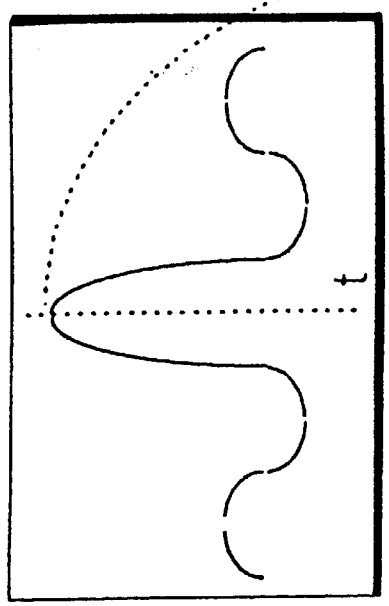
FIGS. 9A and 9B are pictorial representations of data processing which together convey how the synthetic aperture technique correlates a set of point-object generated hyperbolic data with raw data.
Figure 9B:
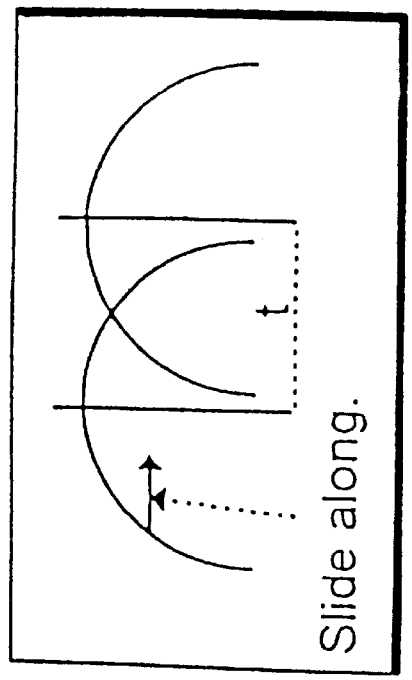

FIGS. 9A and 9B together simplistically represent of how the synthetic aperture RADAR (SAR) technique correlates a set of point-object generated hyperbolic data with raw data, the method of which was discussed with reference to FIG. 8. The SAR process essentially compares the hyperbolae. The correlation results is a measure of the similarity of the two hyperbolae. This essentially focuses the hyperbolae to a single point at which the target actually lies. Each correlation result is added by the signal processing for each focused point, resulting in a set of peaks with differing values. SAR techniques correlate all the stored hyperbolae with the raw data and adds the results, providing a diffused image of the object. Each correlation result is added for each focused point, resulting in a set of peaks for differing values. The set of points is used to show the data as a set of objects found by the scan (as shown in FIG. 4A. The method generates noise around the targets, however, and therefore provides a badly focused image. The noise is due to the inability to isolate and use the dielectric constant of the soil.

The SUPER SAR technique implemented herein improves badly focused images (containing a lot of noise) typical with conventional SAR processing. Isolating and using the dielectric constant of the soil virtually eliminates noise such that target depth is accurately determined. While developing the "new" SAR technique, or SUPER SAR, it was found that any variation in dielectric constant with depth that occurs within a scan is small and gradual such that a single dielectric constant is used throughout the whole process. The SUPER SAR processing consists of the following steps, where $\epsilon_n$ is the $n^{th}$ dielectric constant for the set of responses:

The raw data from the received portion of the radiated signal are first correlated for the dielectric constant, $\epsilon_1$, for a first bucket (bucket 1); second, bucket 1 is extracted and the result is memory-stored; third, the process is repeated for $\epsilon_1$ for each of seven (7) buckets; and fourth, the migrated image, the result from the extraction of the seven buckets, is memory-stored. The above four steps are then repeated for a wide range of dielectric constants, $\epsilon_N$. A range of dielectric constants in which the best correlation is achieved is then selected. The complete process is then repeated for a narrower range containing the previous best range. This is essentially a process of converging onto the closest matching dielectric constant within the set of stored dielectric constants. Next the optimum dielectric constant, $\epsilon_{opt}$, from that range is selected. The data are then processed for optimal $\epsilon_{opt}$. (FIG. 4C represents the method).

Figure 7:
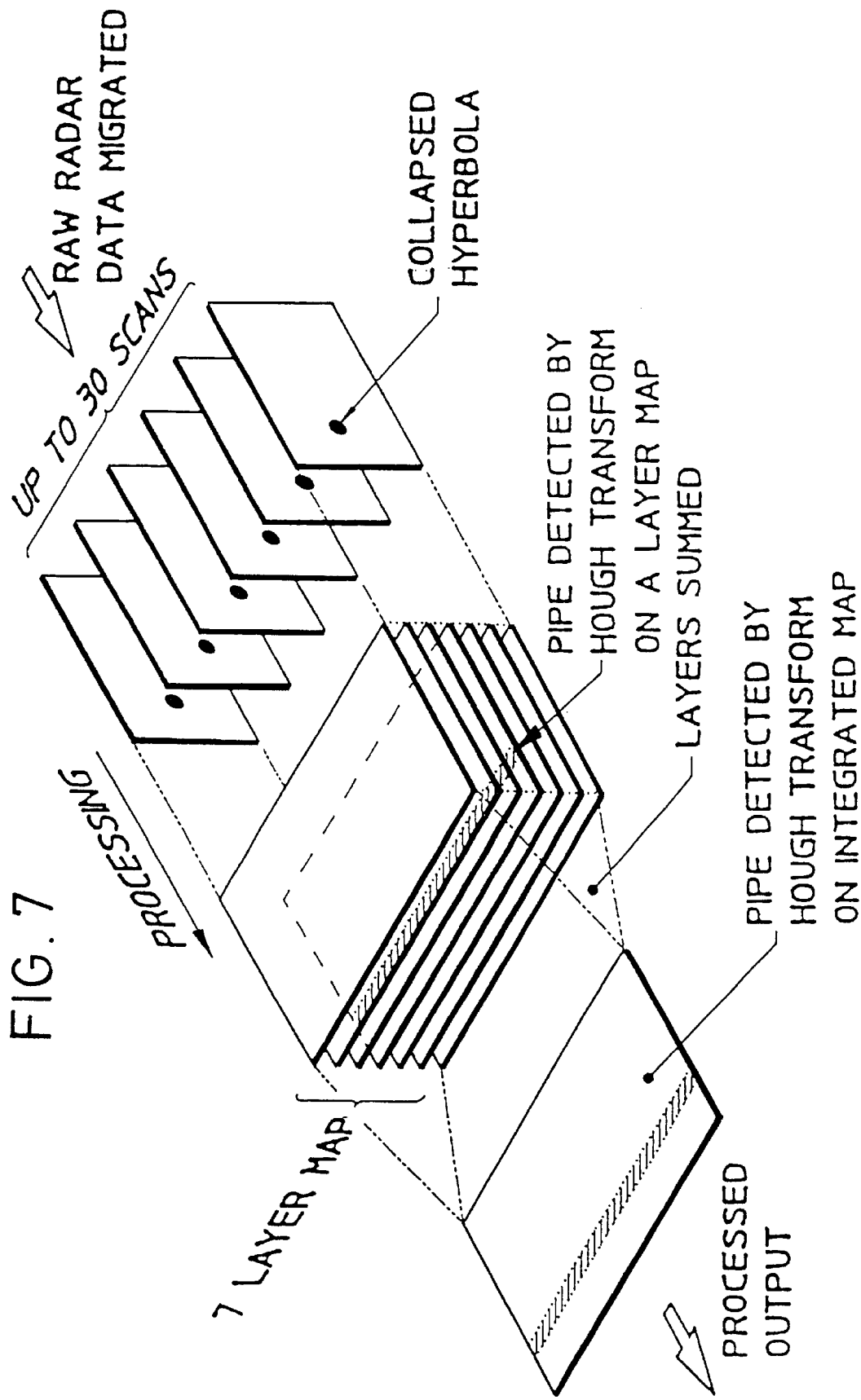
FIG. 7 is a pictorial representation of data processing performed on raw RADAR data of up to 30 scans, Hough transformation to a 7-layer mapping and summation and Hough transform to generate an integrated map or processed output by the unique digital signal processing of this invention.

Once all of the super-SAR processing is completed, the scans are sectioned horizontally to produce a map of the detected targets. The scans are split into seven (7) layers, where each layer displays the points located on each span for each target, as shown in FIG. 7. Once all the scans are split into layers, Hough processing may be performed on each layer to identify any set of points in the layer. If such a feature exists, a line is drawn through the set of points, possibly identifying a pipe.

Figure 12:
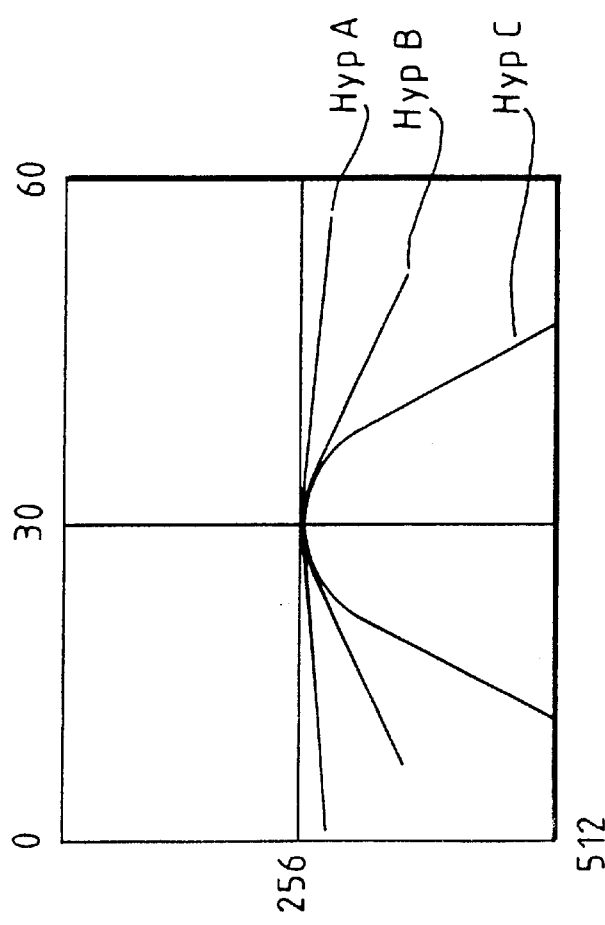
FIG. 12 is a plot of target data in which each of the three depth-varied hyperbolic responses, as shown in FIG. 11, of the varying target depth buckets of FIG. 10, when superimposed as a reference.

In theory, an unmigrated image consists of 512 possible hyperbola. However, the processing implemented herein can accomplish all hyperbola detection using only twenty memory-stored templates. To do so, one of the processing system's unique processing templates is used to generate a layer or "depth bucket" in the final image, as shown in FIGS. 10, 11 and 12. FIG. 10 shows the depth bucket, FIG. 11 shows the corresponding hyperbolas and FIG. 12 shows the reference. The mean of the hyperbolas used in the template is the mean of the hyperbolas caused by objects in the depth bucket. As can be anticipated from the latter three figures (where dz is 25 points), hyperbola B will correlate well with hyperbolas C and A and can therefore be used to focus targets A, B and C.

Figure 23:
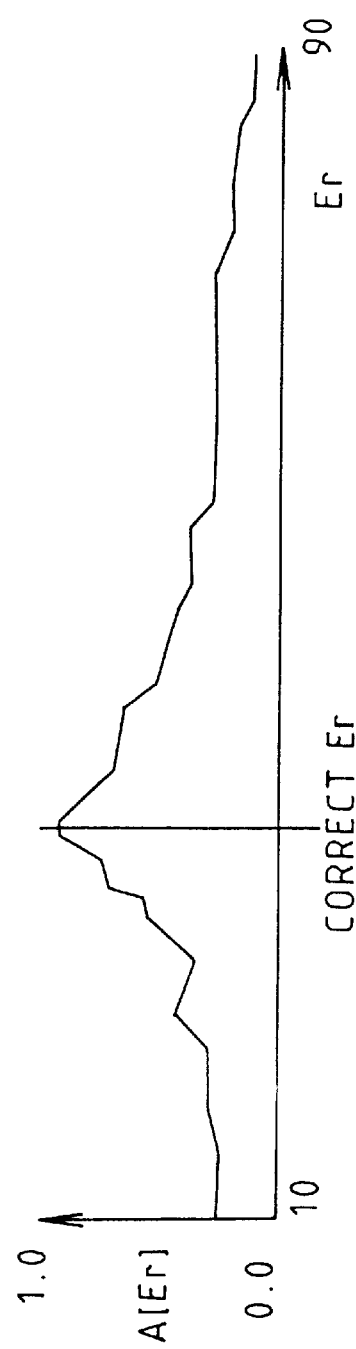
FIG. 23 is a plot of normalized amplitude against dielectric constant (ER) which exemplifies the system's ability to determine the correct dielectric constant in the ground being mapped by his invention.
Figure 13:
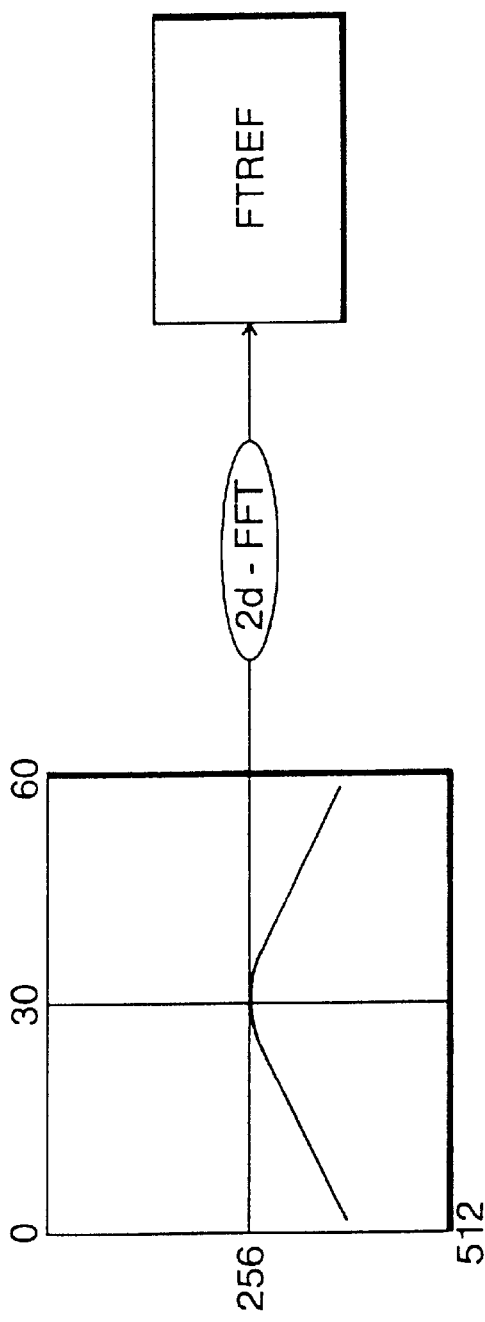
Figure 14:
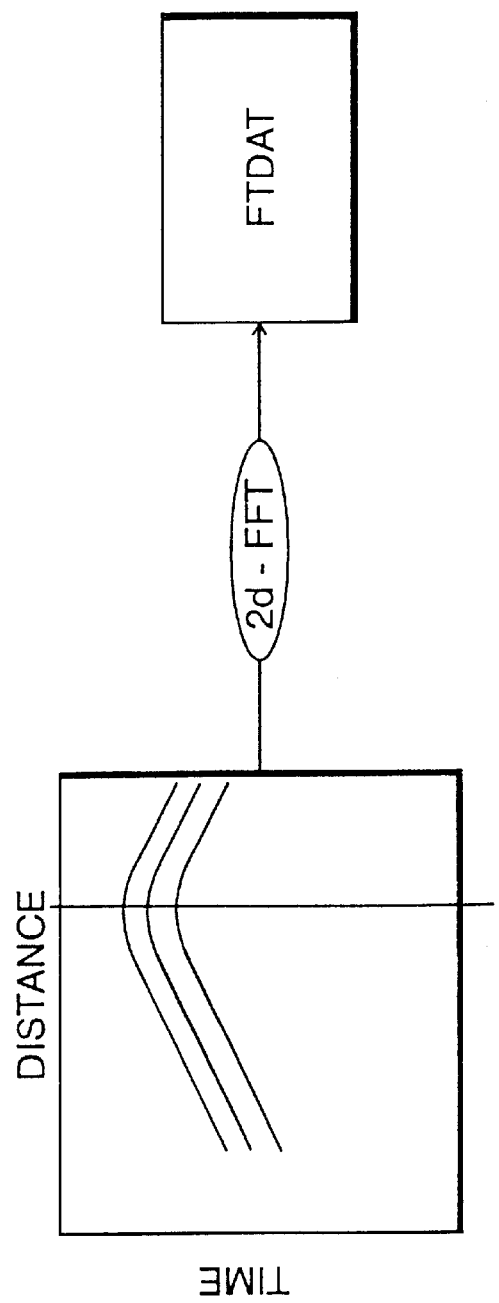
Figure 17:
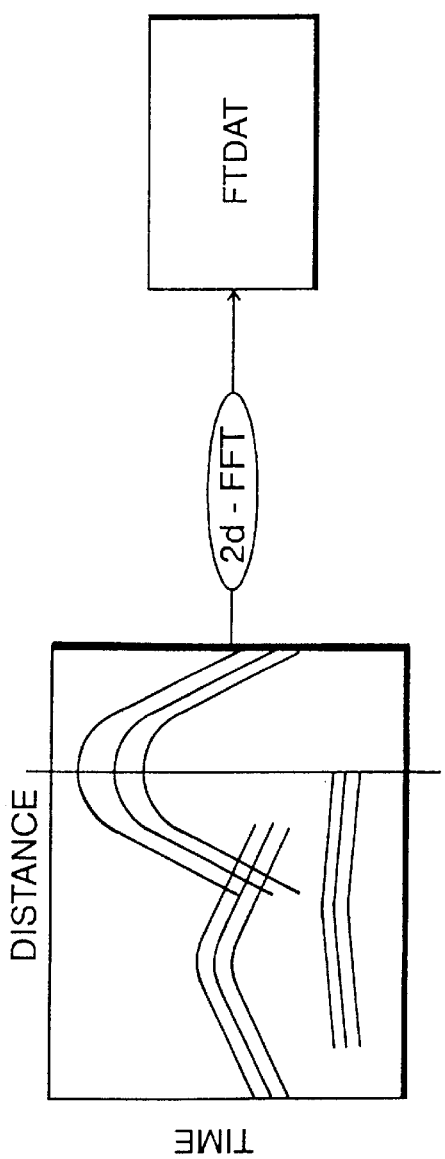
Figure 18:
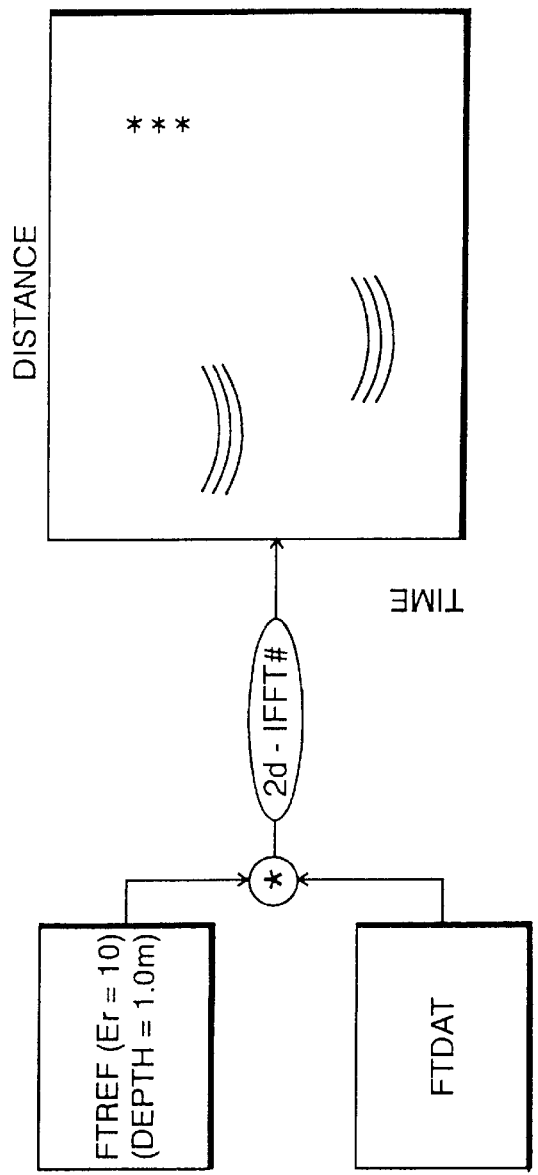
Figure 24:
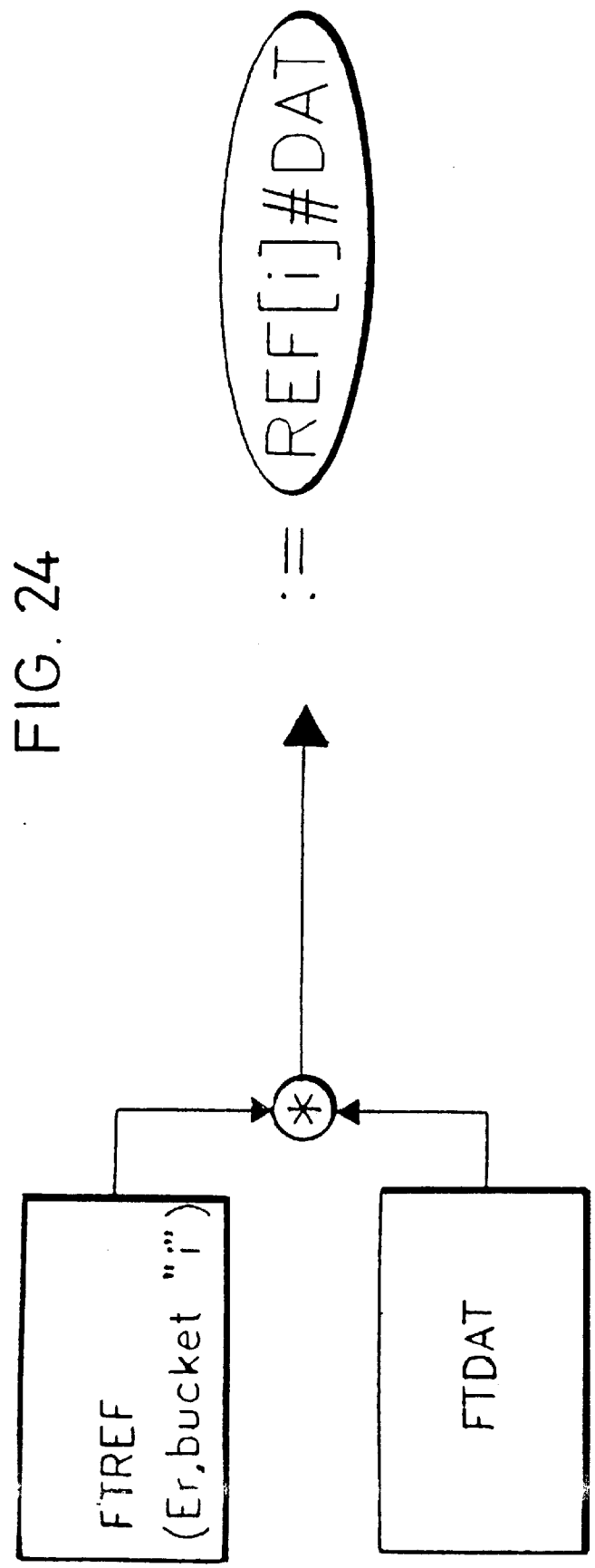
FIGS. 24 and 25 are sequential, pictorial flow representations which together represent a preferred method of cluster processing as depicted by the blocks of FIG. xxx.
Figure 25:
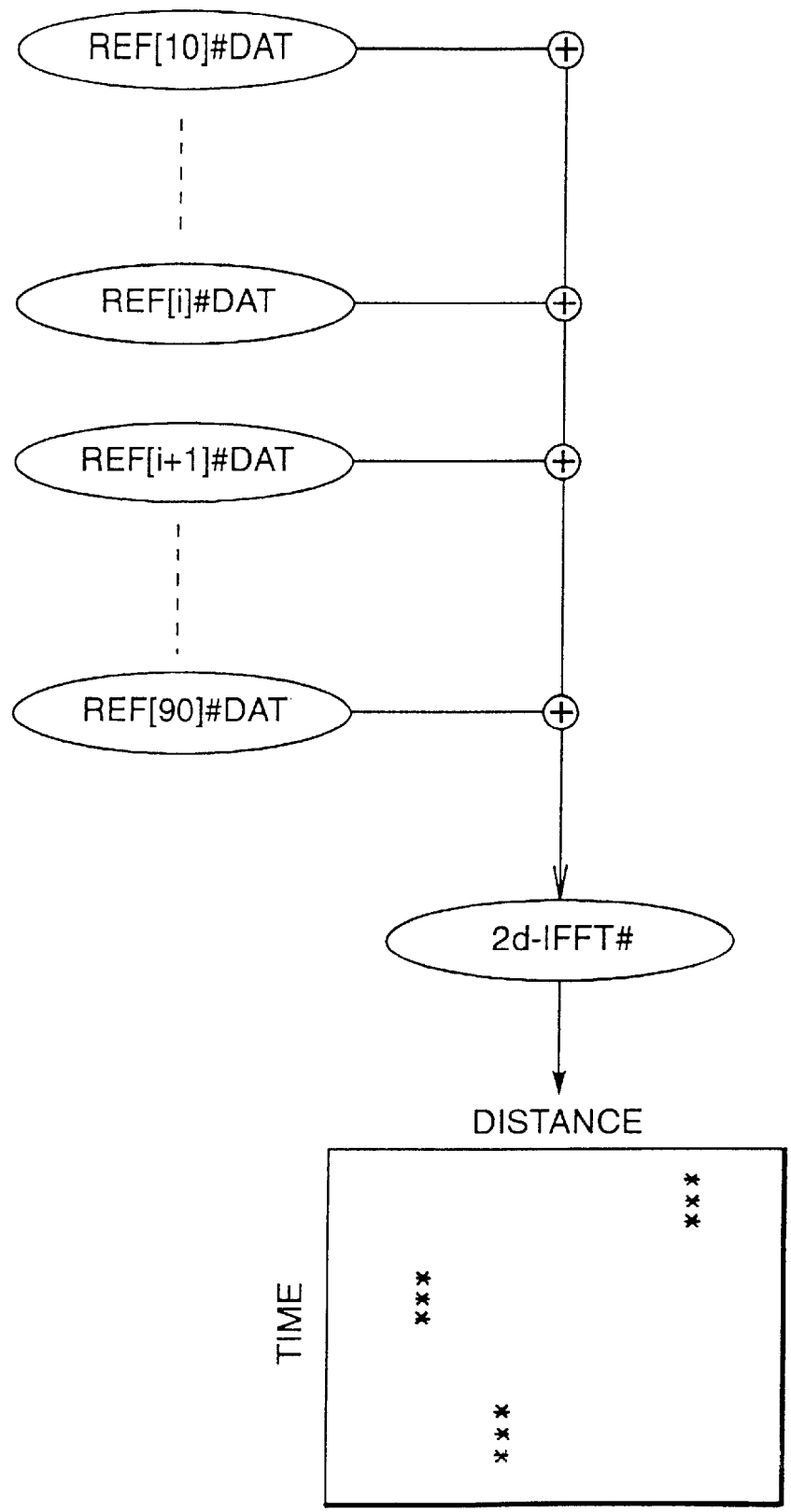

Two dimensional correlation is depicted by the sequence of FIGS. 13, 14, 15 and 16. Multiple target detection is depicted by the sequence shown in FIGS. 17, 18, 19 and 20. By stacking each layer, an image of the full scan is generated (FIG. 21). If the time record at each acquisition point is 512 samples, then, in principle, the migrated image can comprise 512 layers. If a target has been detected in layer "n", the data can be used to determine the correct dielectric constant of the burying matrix. The process consists of focusing layer n using a range of different dielectric constants, such as that described above. For each resulting layer, the target is located and its amplitude is measured, as depicted in FIG. 22. A plot of normalized amplitude against dielectric constant (ER) reveals the correct dielectric constant (FIG. 23). FIGS. 24 and 25 represent a preferred method of cluster processing as depicted by the blocks of FIG. 9.

Figure 26:
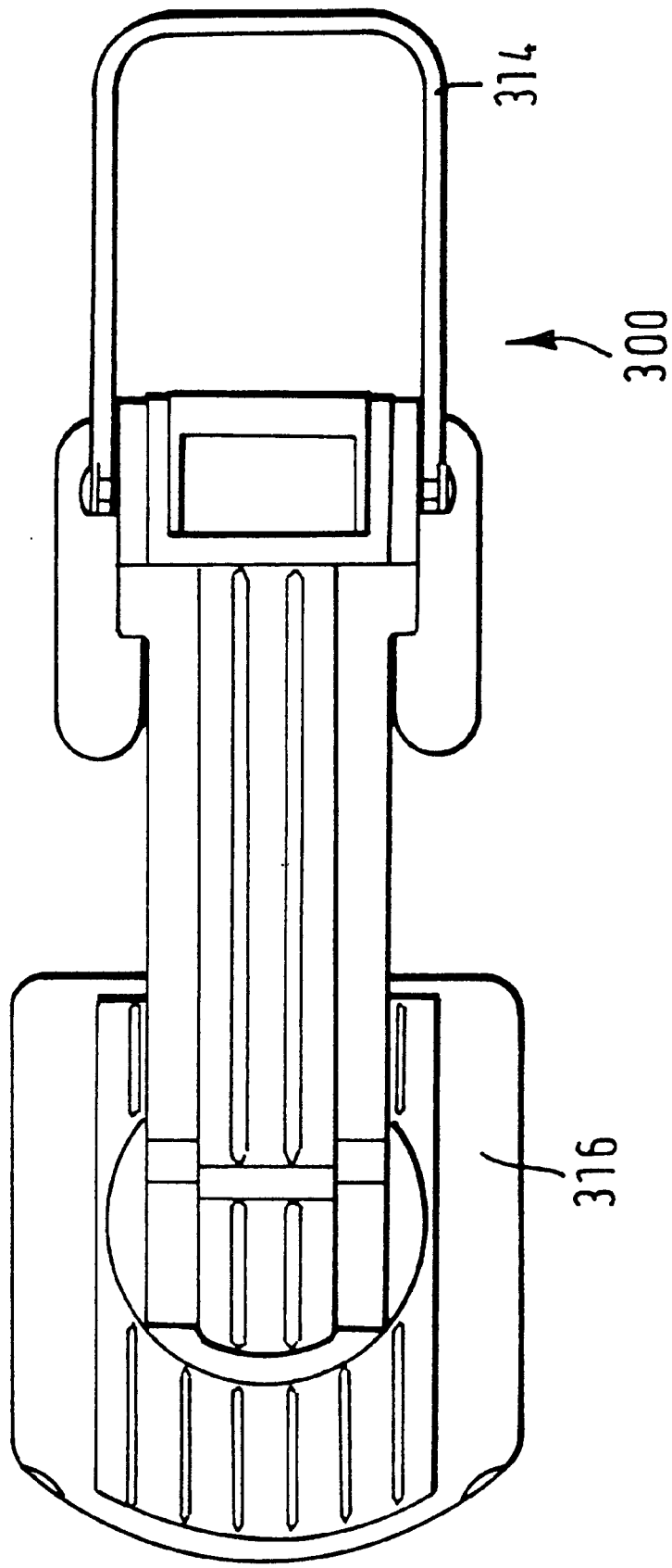

A physical implementation of the first preferred embodiment of the ground-probing RADAR system 300 (or Pipehawk), is depicted in FIGS. 26, 27, 28 and 29, which show, respectively, a bottom plan view, a side plan view and a top plan view of the invention. The structure of the Pipehawk system of FIGS. 26–28 is shown to embody a ruggedly constructed cart 302, a main body 304 of which includes a one-piece rotational housing 306, preferably brightly colored for high visibility in a street environment. The rotational housing 306 houses the system's electronics, an LCD display 308 (preferably transflective) and a control panel 310. Wheels 312, a handle 314 for pushing the Piephawk system and an antenna module 316 are also mounted on the rotational housing. The Pipehawk system is also envisioned to be embodied in a motorized and remote-controlled cart, which can be programmed to cover a specified area without need for human interaction.

The antenna module 316 is mounted to the housing 306 by a compliant hinge that allows, within limits, the variations in the inclination of the ground to be accommodated in both axes. This allows the system 300 to cope with various cambers and gradients encountered in the street environment. The housing 306 is mounted on wheels 312 fitted with tires, preferably pneumatic. Correctly inflated tires are counted on to limit magnitude of shock transmitted to the electronics housed within the housing as the system is pushed forward. The interval at which measurements are recorded by a wheel sensor is approximately 50 mm, but may be varied in accordance with varying application according to those skilled in the art.

Preferably, the handle 314 is tubular, and is attached to the housing 306 to allow folding during transport. A number of positions are provided, preferably, by a series of castellations in the housing. A back face of the housing may comprise sheet metal. A bottom section of the housing houses a battery, accessible to the user. Above the battery compartment is a vent for exhaust of cooling air. Between the vent and display are two push-button switches for powering the system. Two connectors are provided proximate to the switches to allow power hook-up to charge the battery and download/transmit data.

Figure 29:
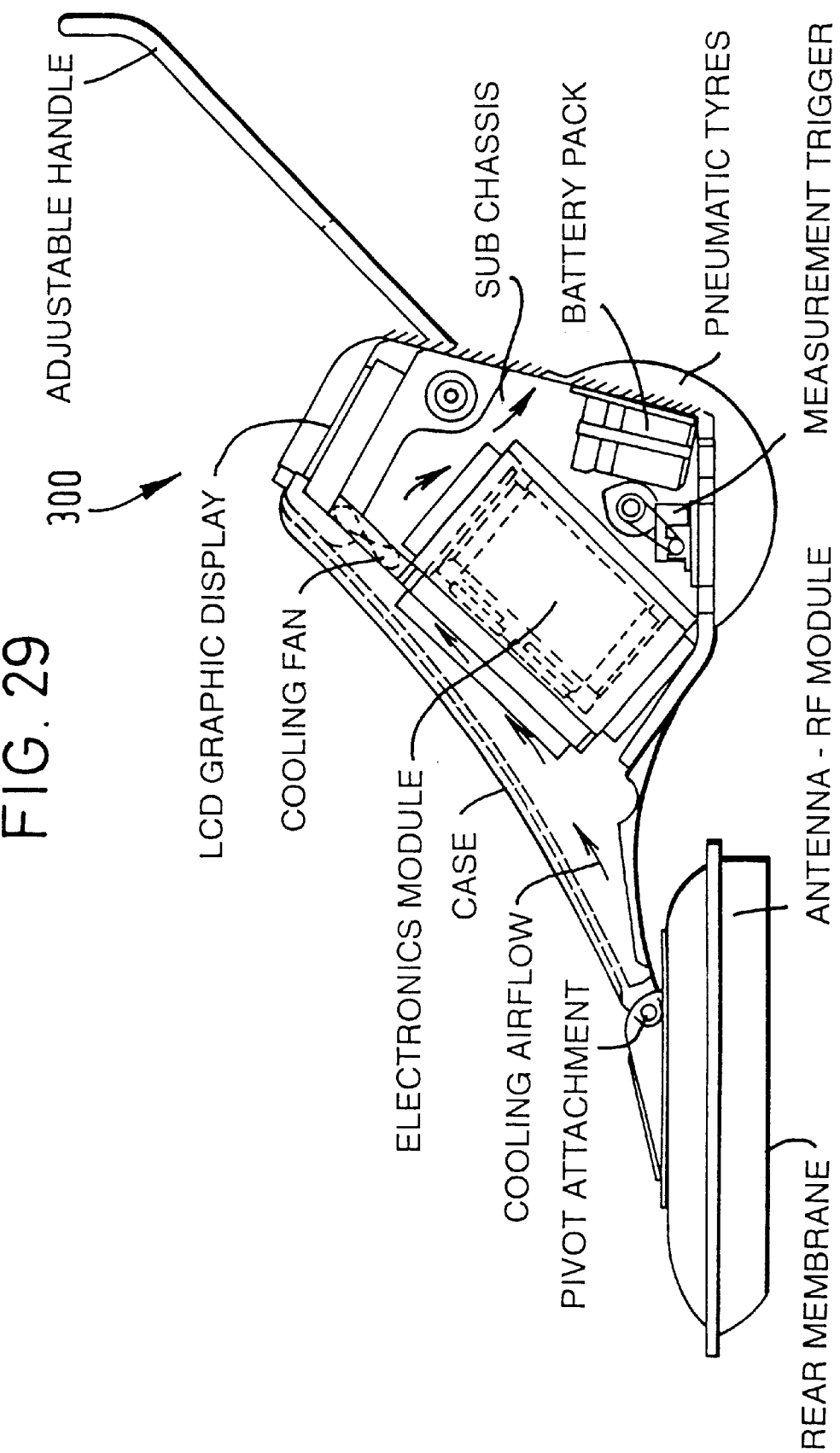
FIG. 29 is a more detailed view of the embodiment depicted in FIGS. 26, 27 and 28.

Extensive thermal management is built in to the embodiment of FIGS. 26, 27, 28 and 29. A prototype of the system has been tested operating in a range from around 0° C. to 40° C. Thermal control is achieved by providing two air circuits as shown in FIG. 29. Within the main electronics module, fans are provided that stir the internal air, but the module is completely sealed. Extensive thermal transfer fins are provided on both the internal and external face of the module in order to transfer heat to external air. An external air circuit is provided that draws in air from above the antennas, passes around the electronics module and back of the display before being exhausted through the back panel. While air flow is temperature controlled, there is no filtering performed on the external air.

For optimum operation, the radar's antenna must be in contact with the ground (to minimize reflections). To that end, the antenna module is fitted with a sacrificial wear membrane to prevent the bottom face of its antenna from being worn. The antenna module includes a receiver and transmitter. The sacrificial membrane is replaceable. The transmitter is controlled to operate only when the system is actually being pushed along in the measurement mode (to be discussed in greater detail below). To obtain effective data, the antenna should be resting on the ground so the energy is coupled directly into the subsurface environment as maximum efficiency.

Figure 30:
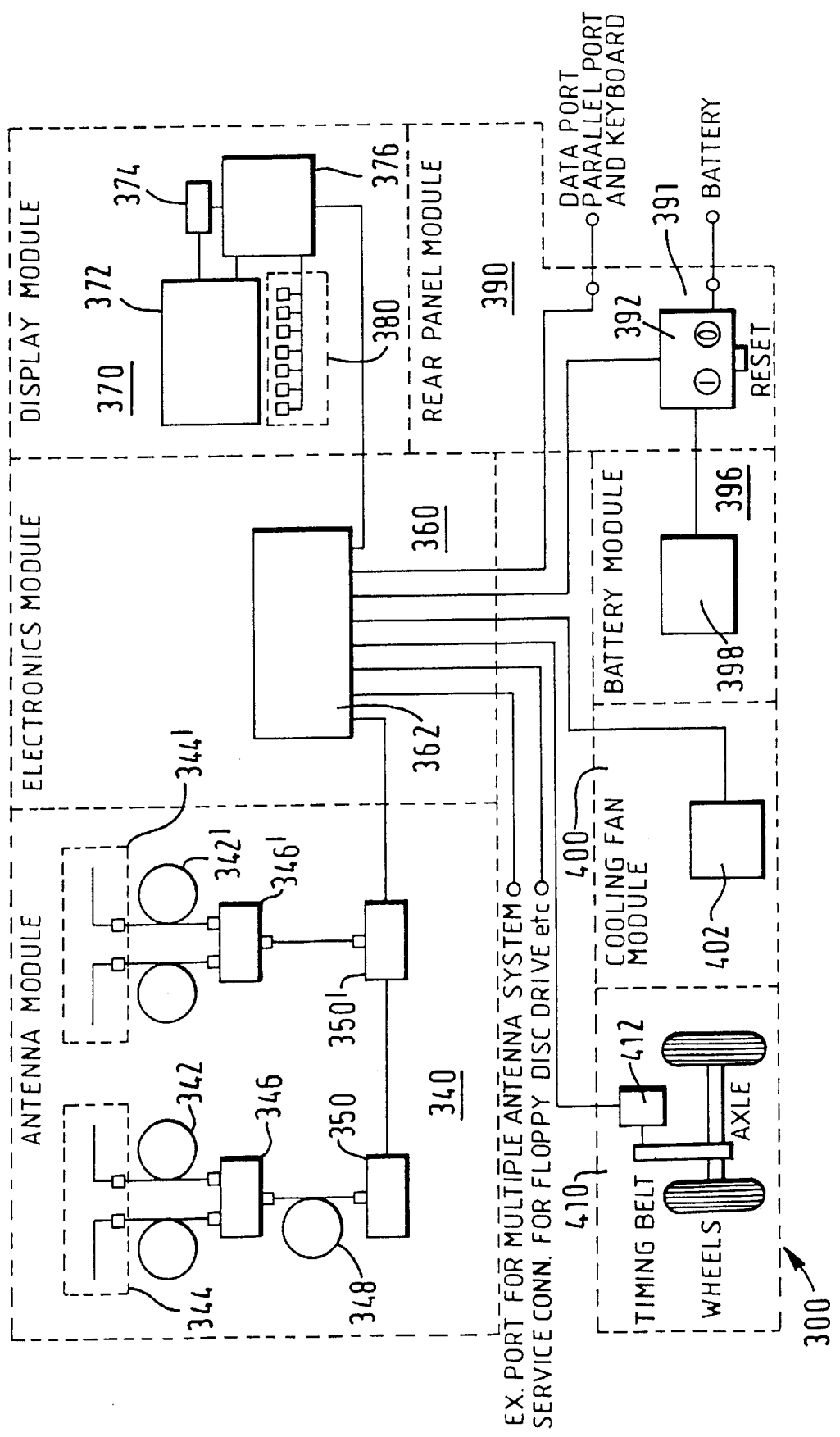
FIG. 30 is a general schematic diagram depicting the system level design of the embodiment shown in FIGS. 26, 27 and 28.

The housing is designed such that almost all the power of the radiated pulse signal is coupled directly to the ground, with only a small amount escaping into the surrounding air. The transmitter generates a fast risetime electromagnetic pulse signal with a time constant (r) of around one nanosecond ($1 \times 10^{-9}$ second). The peak amplitude of the pulse signal is around 50V, but less than the signals fill energy is radiated. The pulse signal is scattered by changes in the electrical properties of the ground. The scattering produced by changes in ground conditions, returns a small fraction of energy back to the radar. FIG. 30 is a general schematic diagram of the radar part of the embodiment shown in FIGS. 26, 27 and 28 with a pulse generator acting as a transmitter, feeding a signal to the antenna to be introduced into the ground. The reflected (returned) signal is received and passed to digital signal processing hardware for massaging into suitable position for display.

Any embodiment of this invention may also be fitted with a data connector on any accessible panel, e.g., a back panel, which enables connections to be made either to an external computer, such as that controlling a cad/cam system for outputting accurate diagrams of the mapped underground, or to a printer directly. For example, the Pipehawk is fitted with three separate connectors. The first is a multi-way bayonet type connector, which meets military standards. From the main connector, two short cables extend in a branch, where on terminates with a keyboard connector for service activities and the other terminates with a standard D-type parallel connector for printing applications. In addition, an embodiment is envisioned which includes a separate transmitter and antenna section for transmitting processed display data to a receiver connected to a computer or like device, or a display and operator at a remote location.

FIG. 30 is a schematic block diagram showing interconnection of the Pipehawk system 300 functional interconnection. FIG. 30 includes antenna module 340 electrically connected to electronics module 361. Electronics module 362 is also electrically connected to display module 370, rear panel module 390, battery module 398, reset panel 391, cooling fan module 400 and wheel sensor module 400.

Figure 32A:
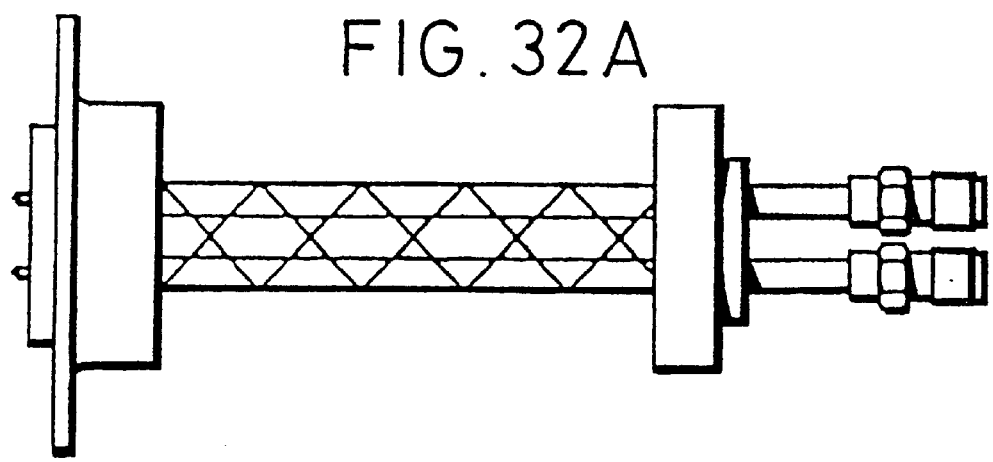
FIGS. 32A, 32B and 32C are schematic representations which together define one embodiment of an antenna feed element which can be used herein.
Figure 32C:
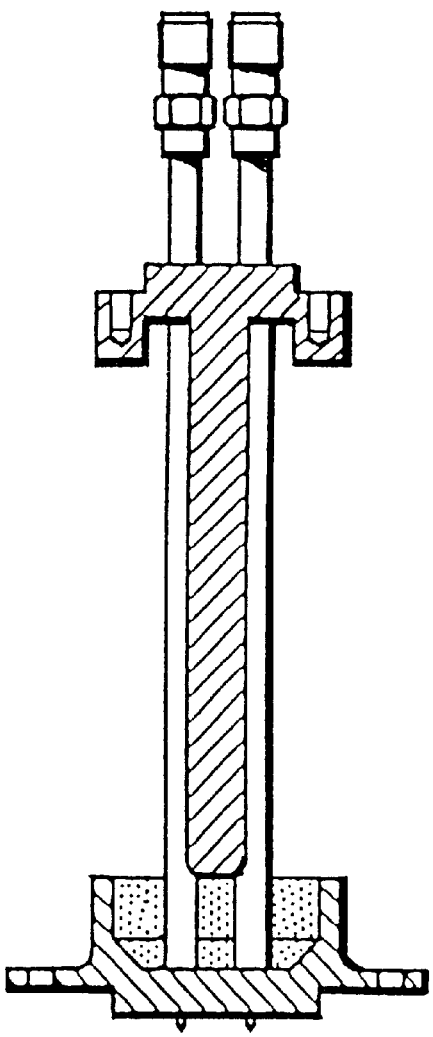
Figure 32B:
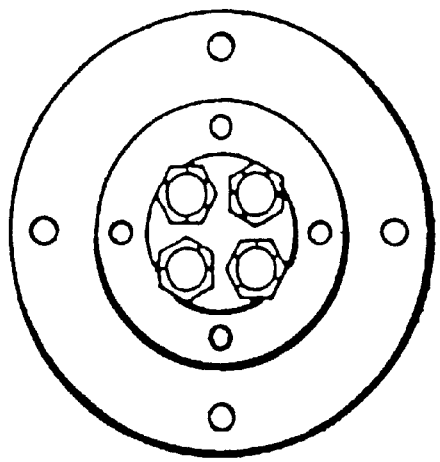
Figure 33A:
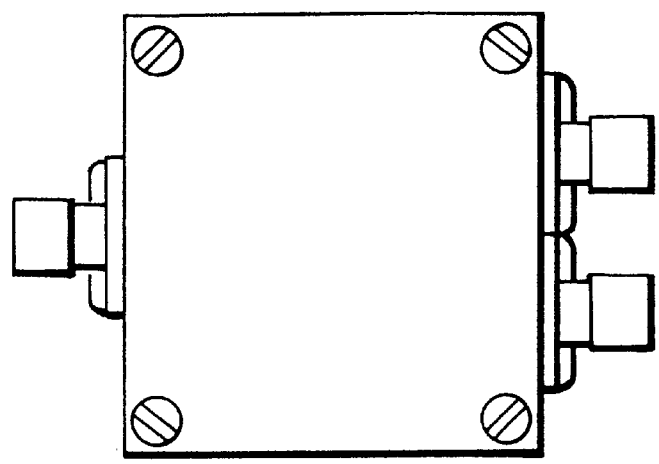
FIGS. 33A, 33B and 33C are schematic representations of a connector assembly which can be used herein.
Figure 33B:
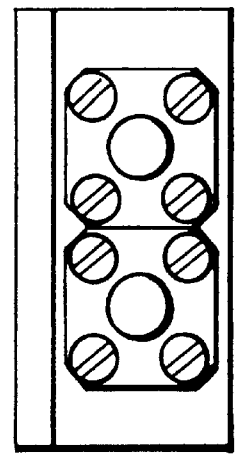
Figure 33C:
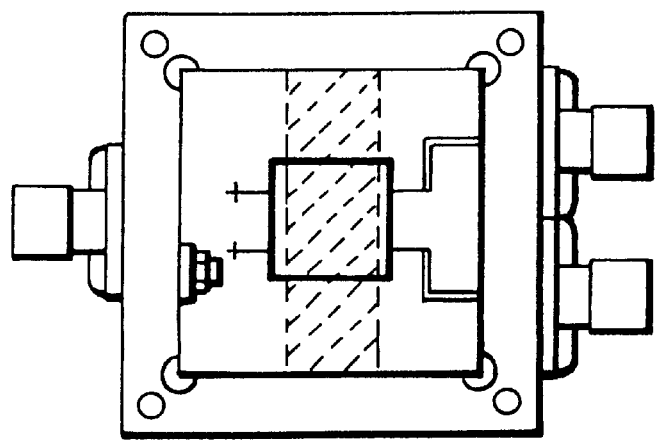
Figures 34A, 34B:
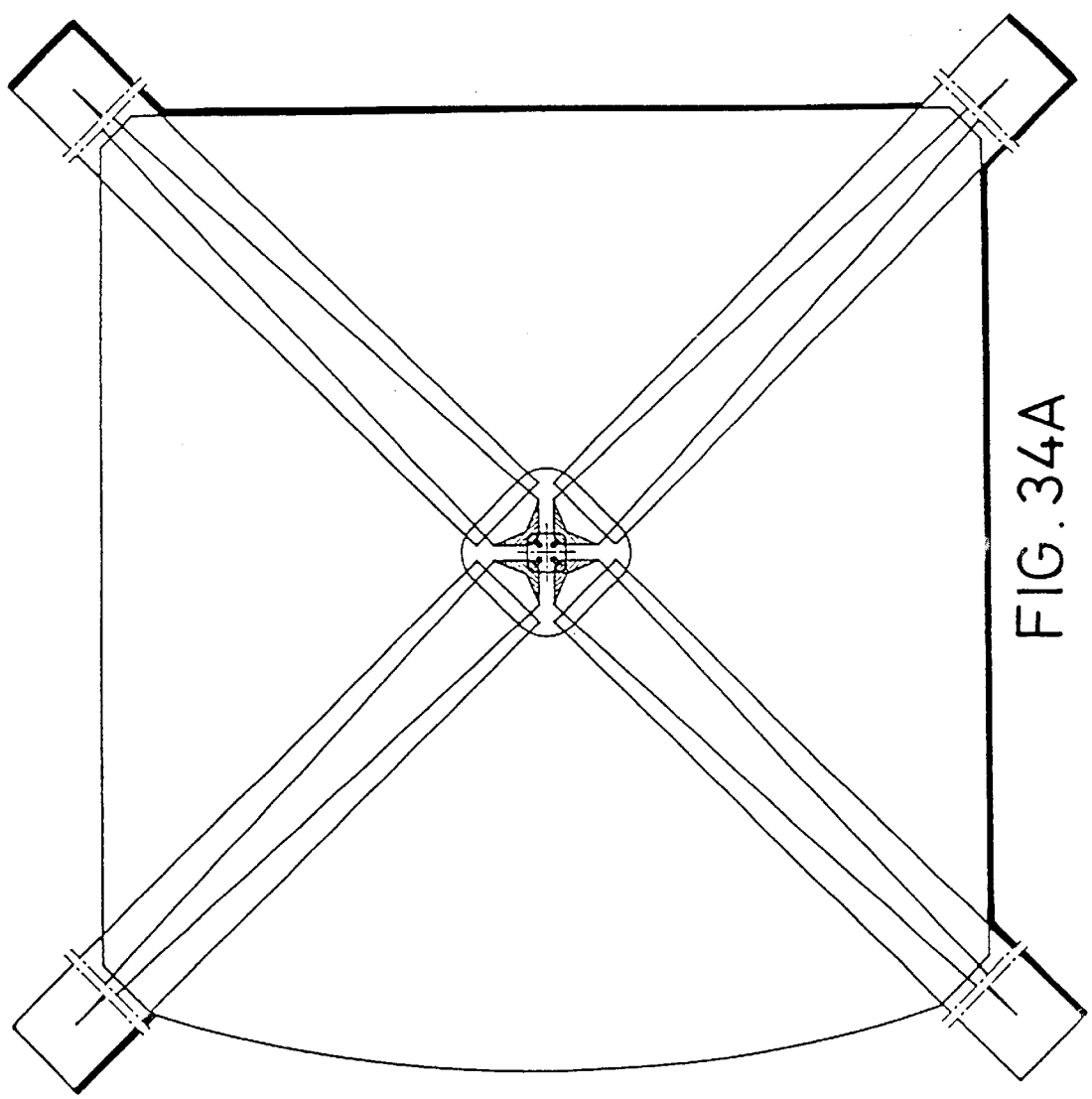
FIGS. 34A and 34B are schematic representations which together depict the element structure and layout for one embodiment of a two-element array as used herein.
Figure 35A:
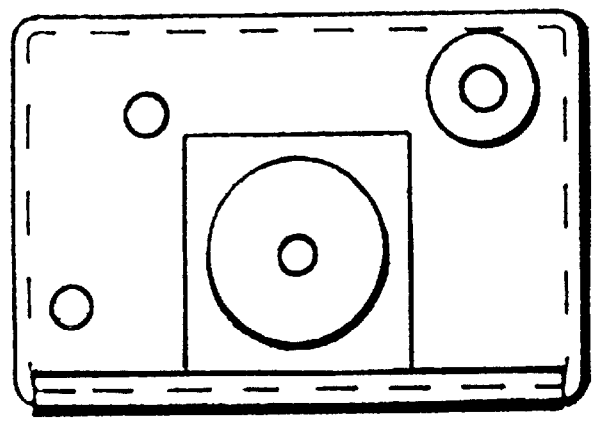
FIGS. 35A, 35B, 35C, 35D and 35A are schematic representations of mounting and feed elements which can be used herein.
Figure 35B:
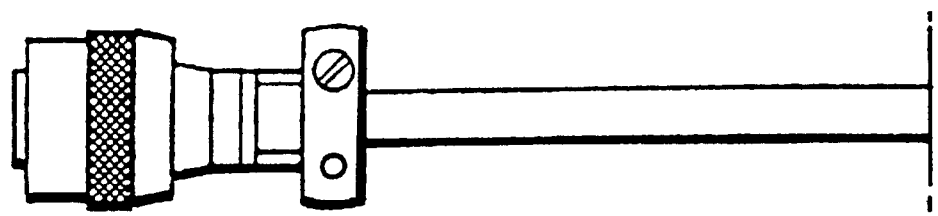
Figure 35C:
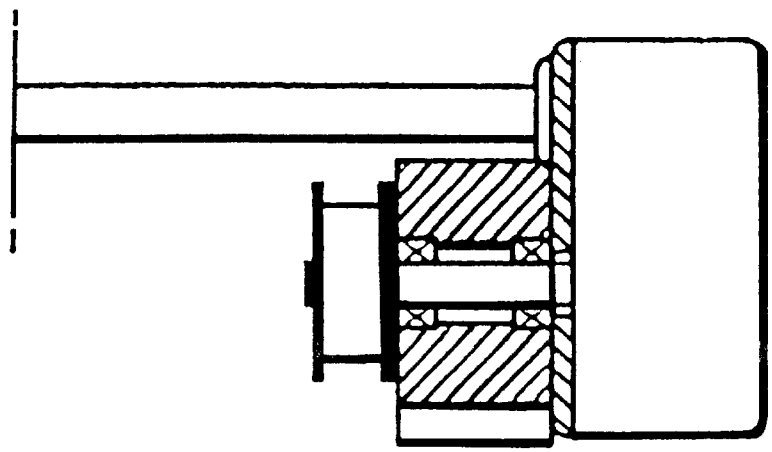
Figure 35D:
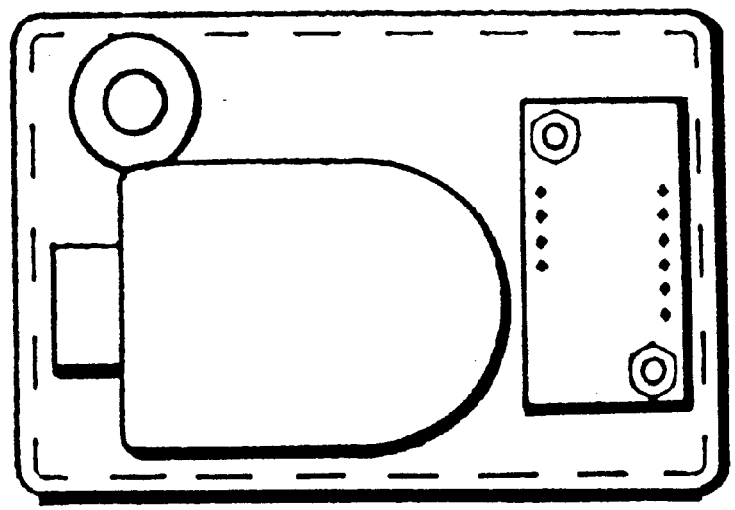
Figure 35E:
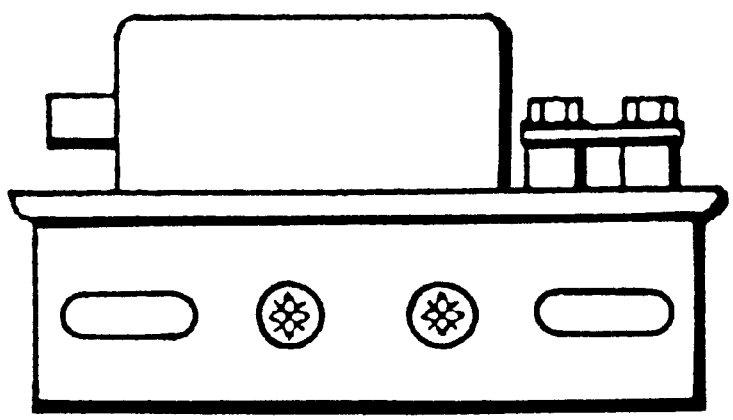
Figure 37A:
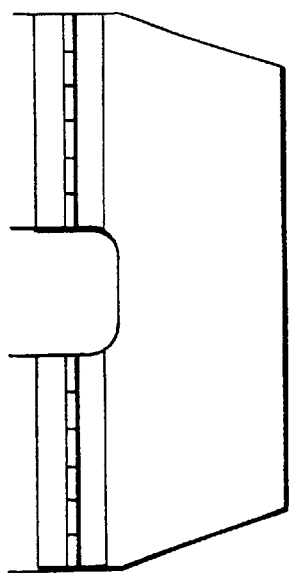
Figure 37B:
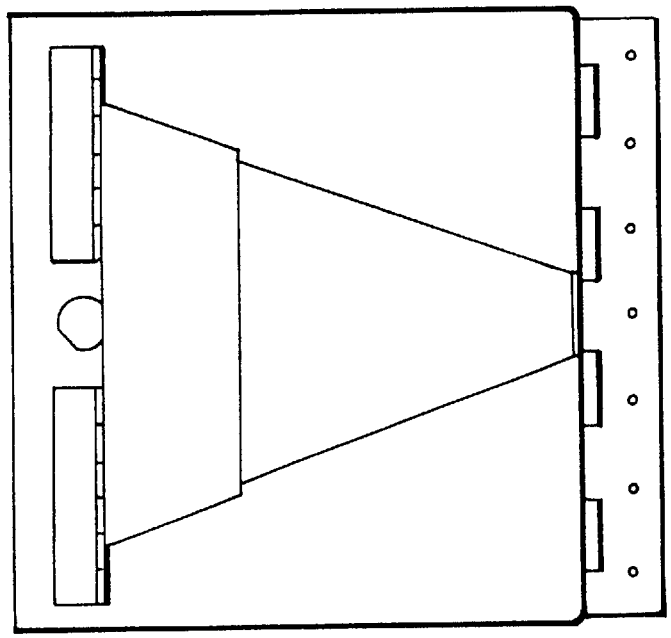
Figure 37C:
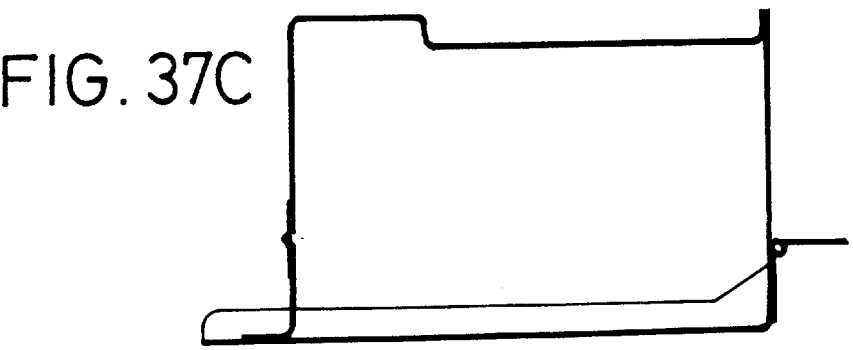
Figure 38A:
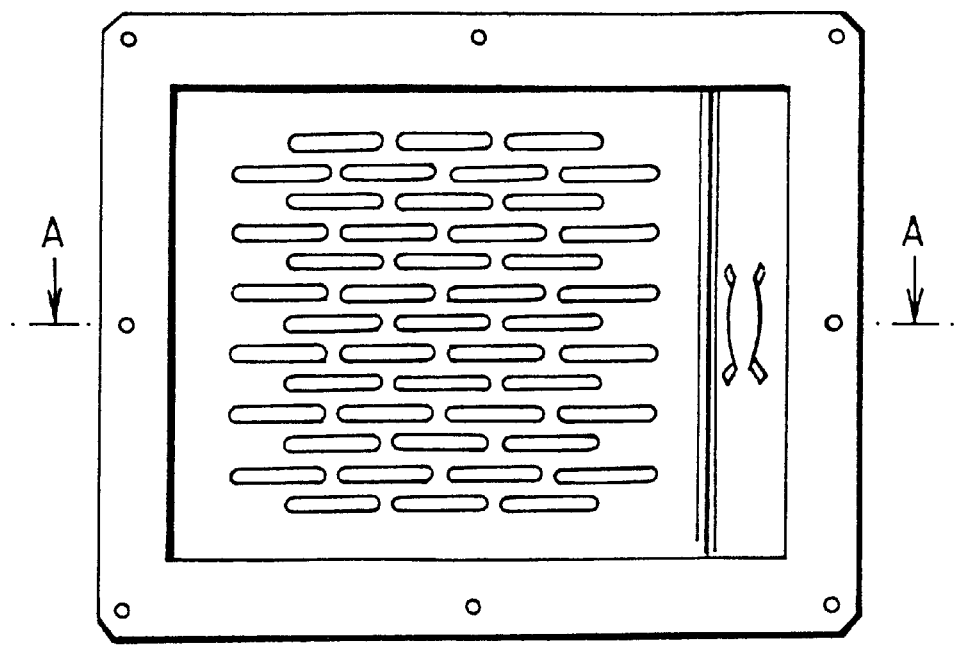
Figure 38B:
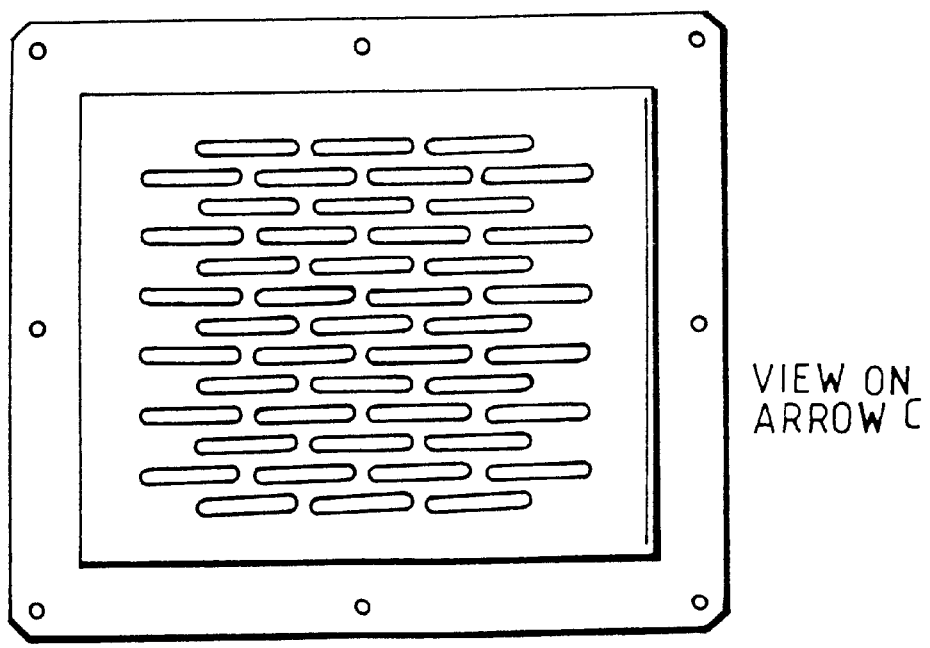
Figure 38C:
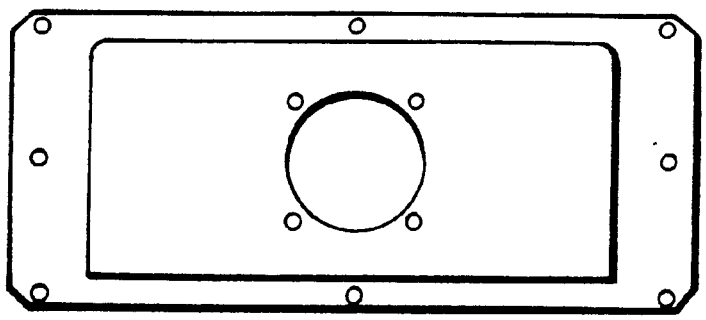
Figure 38D:
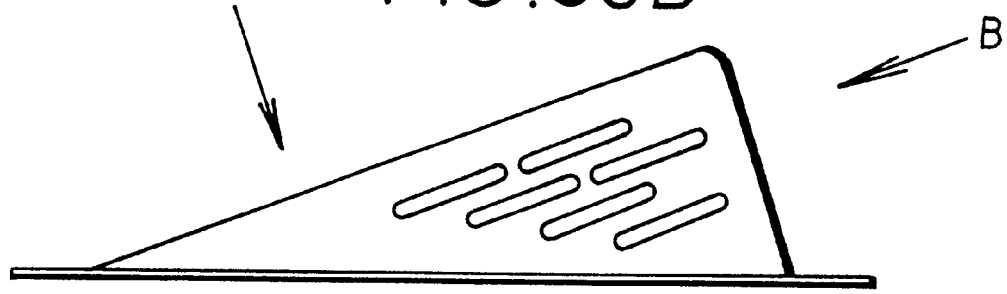
Figure 38E:
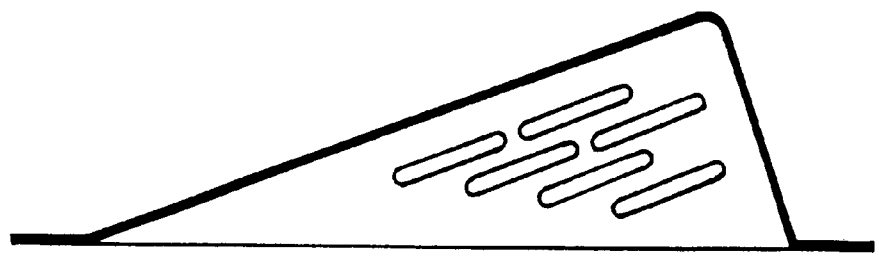
Figure 41A:
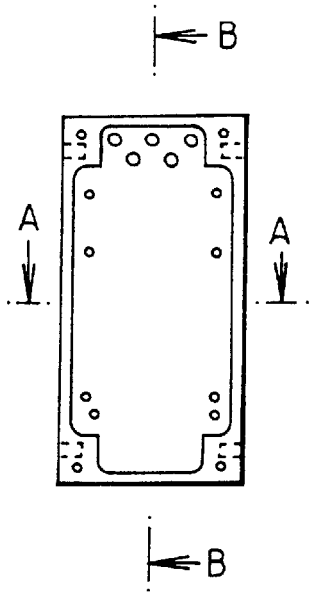
FIGS. 41A, 41B, 41C and 41D are schematic representations of various hardware elements for use herein.
Figure 41B:
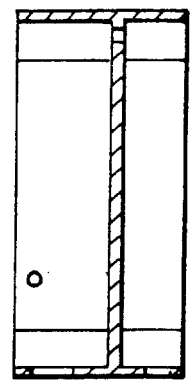
Figure 41C:
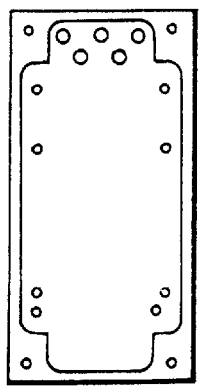
Figure 41D:
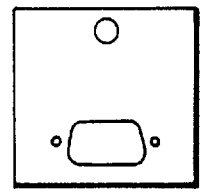
Figure 41E:
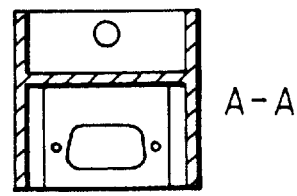

FIGS. 31A and 31B together show the structure of a delay coil (implementable as any of elements 344, 342, 342', 348) for use herein as part of the antenna module 340. The delay coils are used to implement a time delay for use in the transmit/receive pulse signal blanking cycles. FIGS. 32A, 32B and 32C show one embodiment of an antenna feed element which can be used herein. FIGS. 33A, 33B and 33C depict a connector assembly which can be used herein. FIGS. 34A and 34B together depict the element structure and layout for one embodiment of a two-element array as used herein. FIGS. 35A, 35B, 35C, 35D and 35A show mounting and feed elements which can be used herein. FIGS. 36A, 36B, 38A, 37B, 37C, 38A, 38B, 38C and 38D show various hardware elements which may be used. FIGS. 40A, 40B, 40C, 40D, 40E, and 40F, and, FIGS. 41A, 41B, 41C and 41D show various hardware elements for use herein, in conjunction with Table A.

Figure 42:
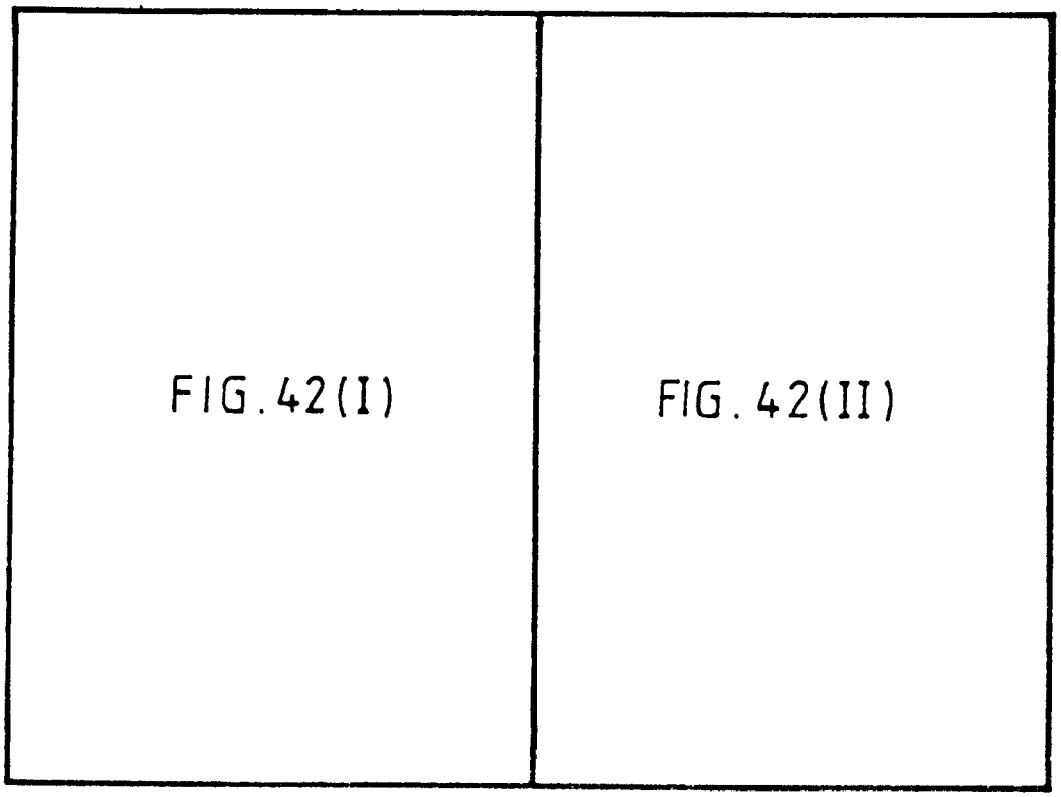
FIG. 42 is a flow block diagram representing the two-channel RADAR (Pipehawk II) system's internal bus architecture.
Figure 42I:
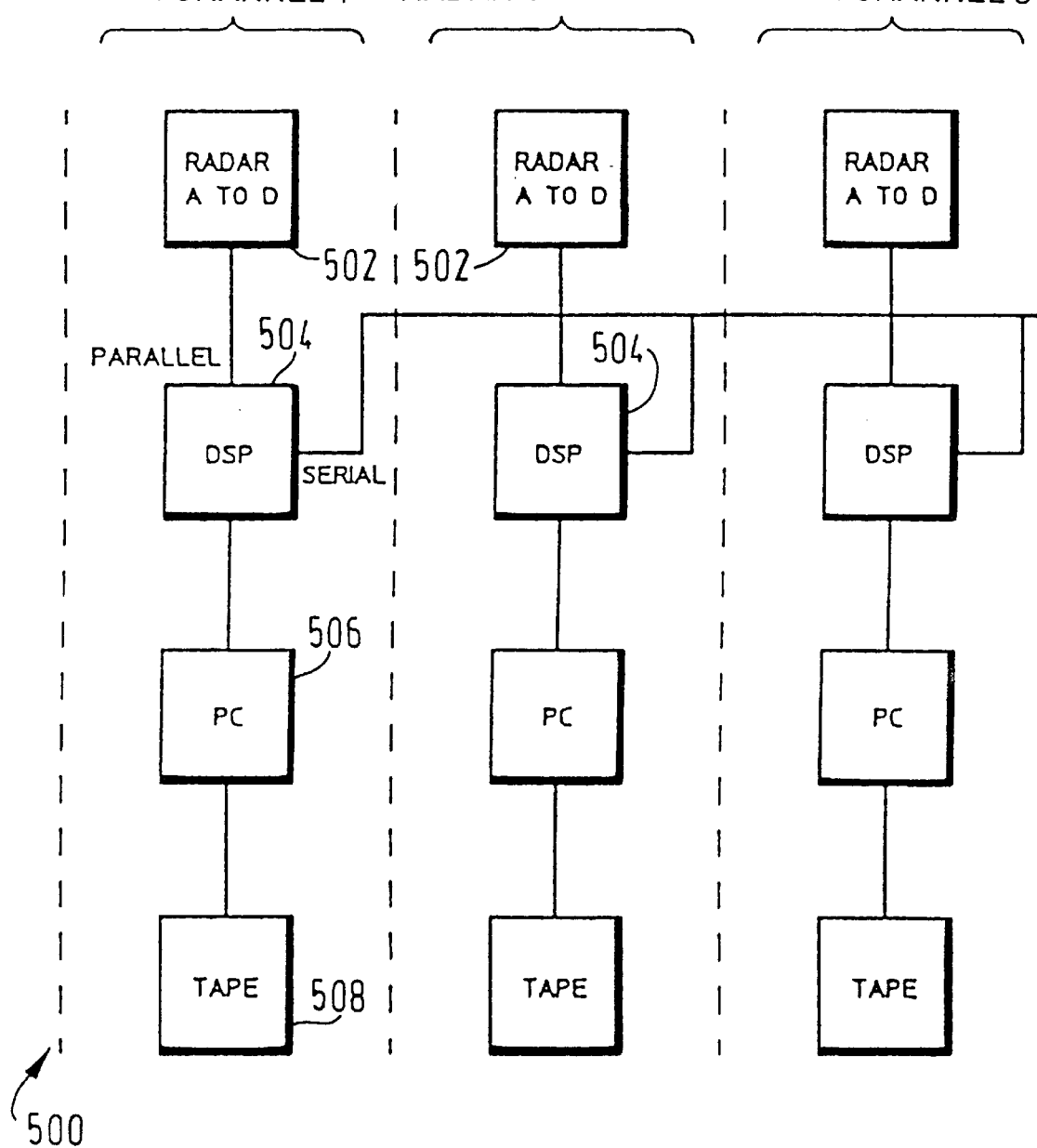

While the Pipehawk system is a single channel ground probing RADAR system which is capable of detecting underground objects, the system must make numerous scans to assure large enough signal to noise ratios for accurate detection decisions. In order to increase productivity, a second preferred embodiment of this invention includes a two-channel RADAR system (referred to interchangeably as "the upgraded system") capable of operating four data channels. Accordingly, a two-channel RADAR system 500 will now be described in accordance with FIGS. 42–48. FIG. 42 is a flow block diagram of the two-channel RADAR system's internal bus architecture.

The two-channel system 500 solves the problem of the need for taking more measurements for increased performance in a complicated underground environment. Cross-channel information is generated thereby, which is difficult to interpret in isolation, but useful in resolving ambiguities that occur in co-channel information. Co-channel data provides an initial model, subsequently aided by cross-channel data. Accordingly, the two-channel system operates four channels, including two antenna modules, two transmitters and two receivers. Each transmitter is used in turn send out a transmit signal, and both receivers are used to receive the reflected transmit signal; four channels are relayed thereby: Tx 1 Rx 1, Tx 1 Rx 2, Tx 2 Rx 2 and Tx 2 Rx 1, which will be referred to interchangeably as RADAR channels 1, 2, 3 and 4, respectively. The thus-described four RADAR channels essentially comprise the same four system blocks, RADAR A/D 502, digital signal processor (DSP) 504, a microprocessor 506, and a tape unit 508. The RADAR A/Ds are electrically connected to the transmitters/receivers, not shown explicitly in FIG. 42. Each RADAR A/D 502 is also electrically connected in parallel to the DSPs 504 for parallel data transfer therebetween. The DSP data is also transferred in parallel between the microprocessors 506. Each DSP 504 is also connected to a serial time division multiplexed bus for communication with a fifth DSP 504. A fifth microprocessor 506 takes processed data and places it on display 510 for operator access.

Figure 45:
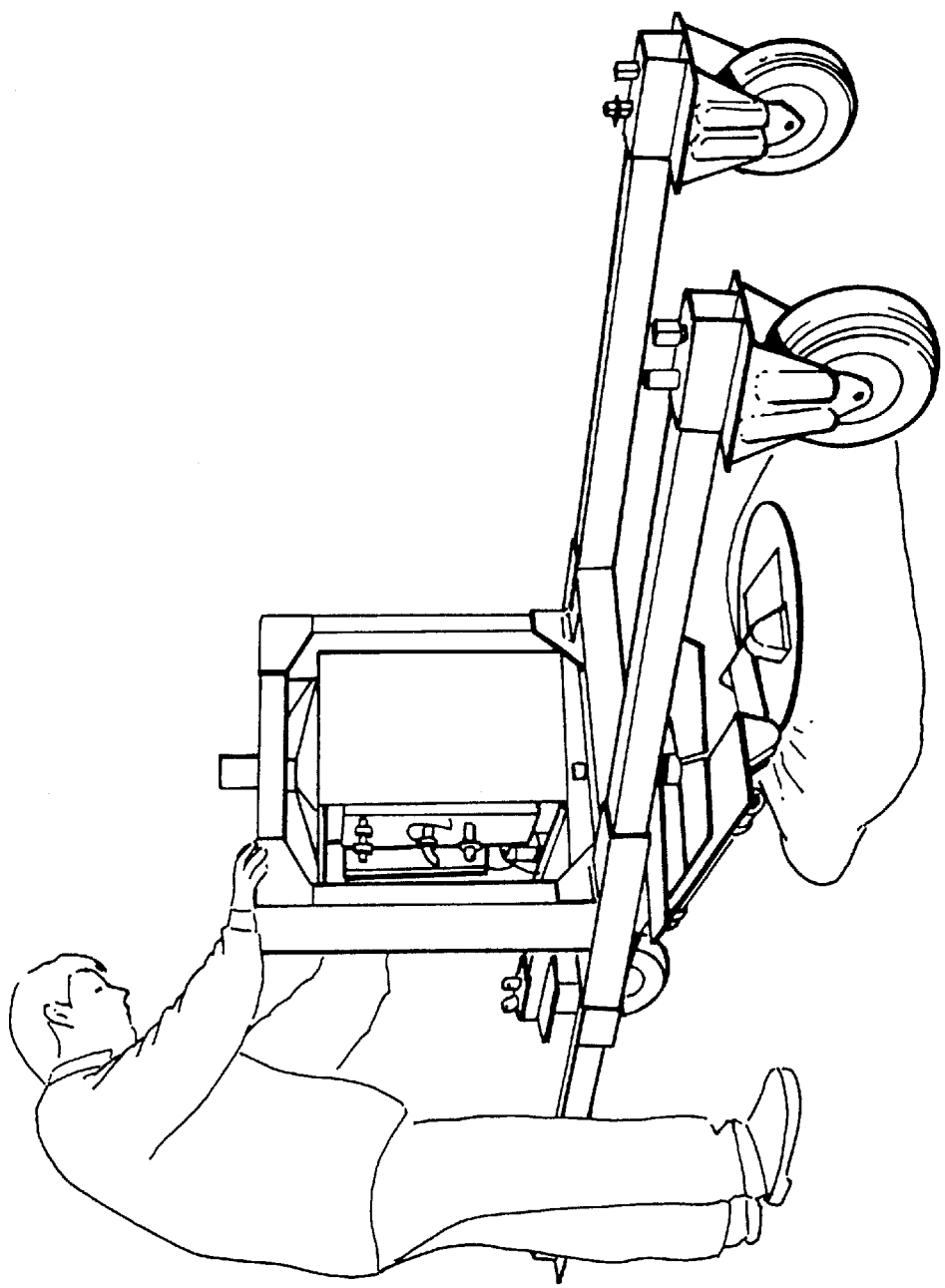
FIG. 45 is a copy of a photograph of a two channel experimental rig or platform of the Pipehawk II embodiment.
Figure 46B:
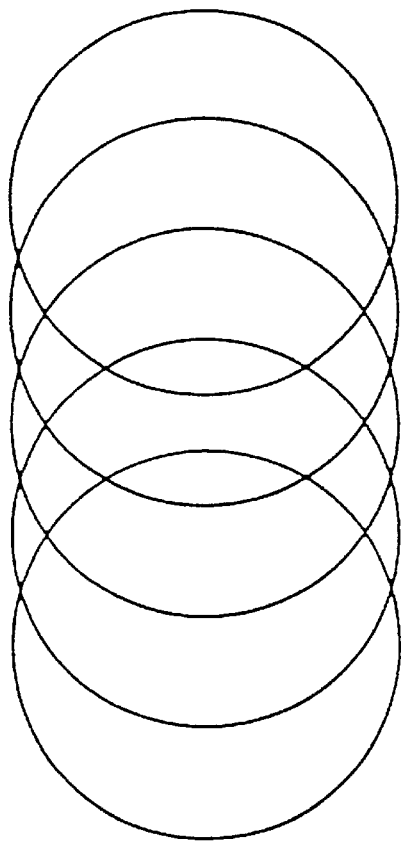
FIGS. 46A and 46B are pictorial representations of an antenna measurement path in a dense pipe and open pipe environment generated by Pipehawk II.
Figure 46A:
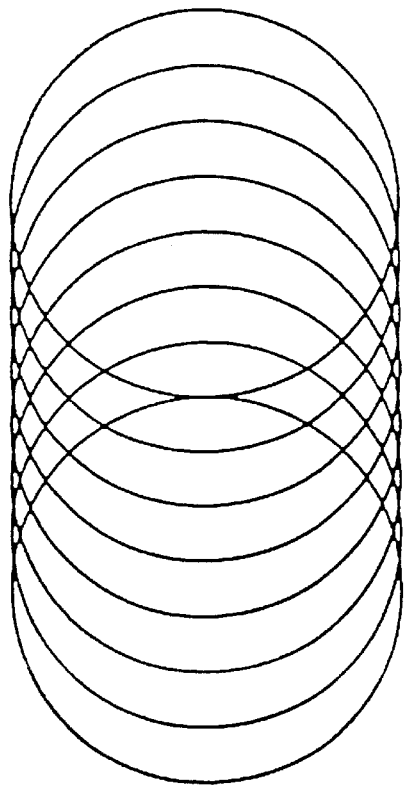

The measurement geometry that evolved for this work consists of two antennae mounted on a single shaft (not shown in FIG. 42) and rotated to sweep over the areas of interest. A platform, the structure of which may be provided by one skilled in the art to meet application needs, is caused to advance as the antennae rotate the search pattern of the ground, as shown in FIG. 44. FIG. 45 shows a prototype of the two-channel RADAR system 500, i.e., the upgraded system. FIGS. 45A and 45B show search patterns for a search performed on the upgraded system mounted within a non-rotarized platform, which required that antennae be alternately rotated and moved forward. As can be seen in FIGS. 45A and 45B, by changing the ratio of forward to rotational movement, the density of measurement points may be changed. The platform (or "rig") of FIG. 44 was arranged such that the antennae were set for a radius of 0.8 m and fifty measurement points corresponded to 180° of rotation. Two sets of scans were collected, one corresponding to the forward sweep of the rig and one to the rear sweep, thereby collecting full-circle data.

The analysis of data generated when the two-channel RADAR system runs along an object is simple. Applications of the SAR processing technique (in the DSP) with automatic depth calibration leads to a position of an object determined, and further analysis generates an angle of rotation corresponding to the center of the object. From the angle and radius of rotating the offset of the object relative to the center line of the measurement platform can be determined. If this is represented by $X_f$ for the front scan and $X_r$ for the rear scan, then the average position of the object relative to the rig is determined from the average of the two, and the rate of change of position along the length from the difference.

It is these two parameters, the average of the front $X_f$ and rear $X_r$ scans, and their difference which allows the unique processing function to be performed. The control method is based on a second order differential equation with two parameters differentially connected: position and rate of change of position. Accordingly, the processing allows for the data to be extrapolated such that a "k-space" analysis can be realized, thereby synthesizing many alternative measurement lines through the measurement space. As such, detection margins are increased to provide better spatial resolution in dense-pipe environments. By motorizing the structural rig which carries the system, with, for example, a stepper, the search pattern is placed under correlated software control.

Figure 47A:
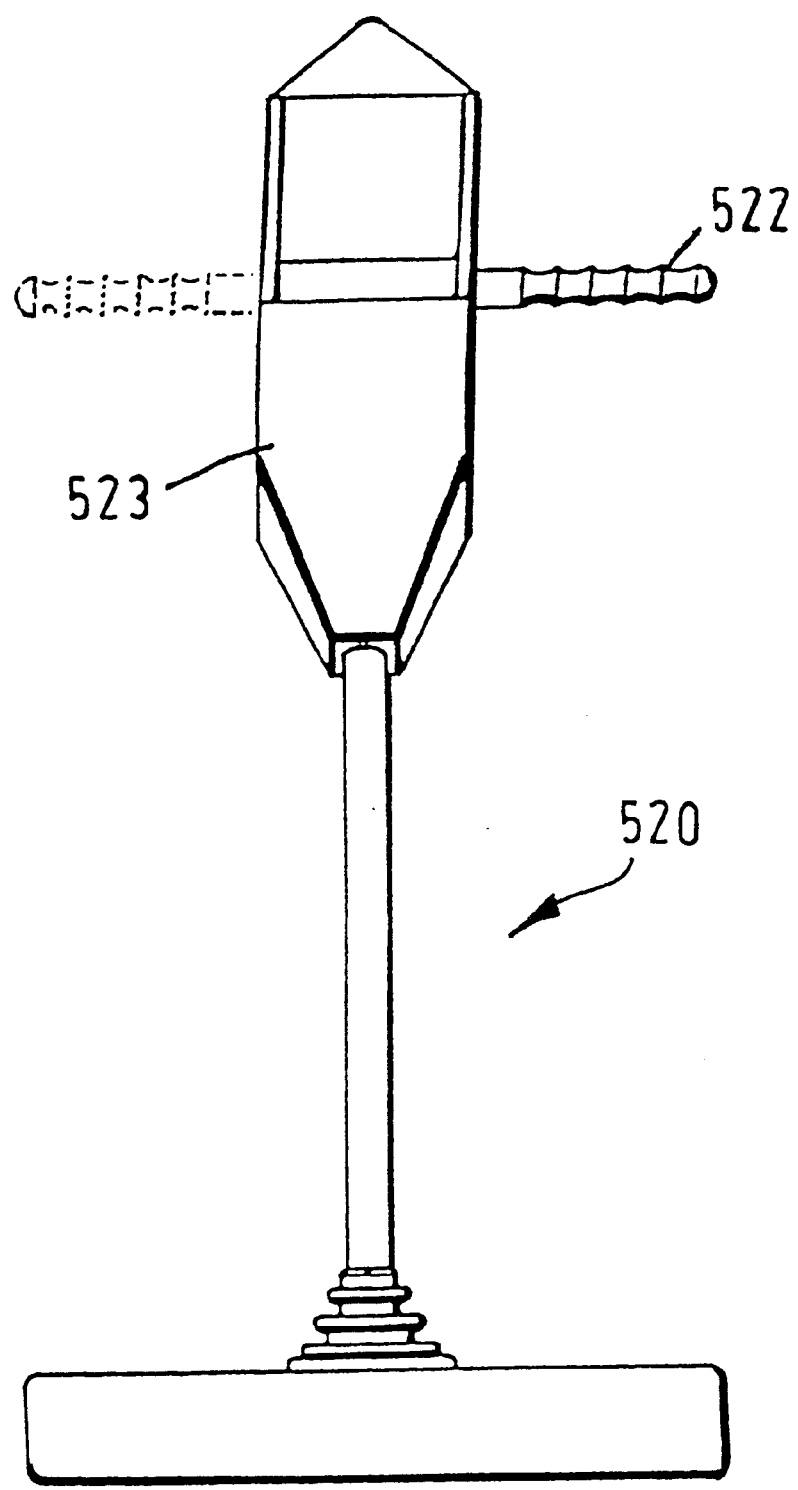

In a variation on the Pipehawk system embodiment, a hand-held version of the Pipehawk II system 520 is shown in FIG. 47A and 47B. The system 520 includes a handle grip 522 for user handling and communication and power connection ports 524. The system also includes a fold-away color display 526 and detachable antennae unit 528 which incorporates a motion sensor (not shown in FIG. 47B). The Pipehawk II system 520 is also shown therein to include in housing 523 a concealed operator interface 570 which is accessible with display raised, a standard sampling receiver 532, a standard pulse generator 534 and a standard baluns 536, all shown in FIG. 48A. FIGS. 48B and 48C identify location of repackaged electronics, which utilize standard STS formal circuit boards.

Figure 49I:
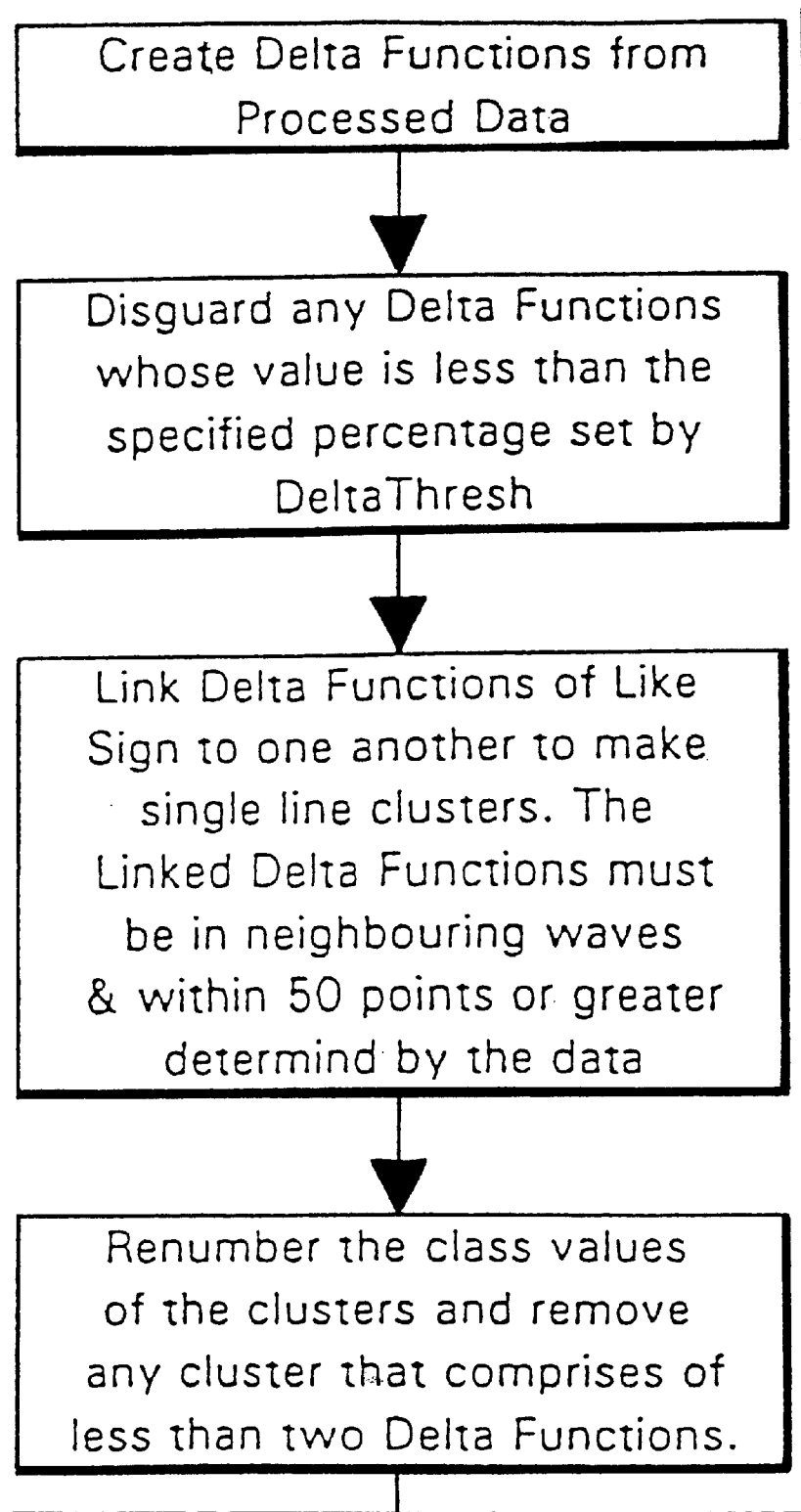
FIG. 49 is a flow diagram describing some of the DSP processing implemented by the present invention.
Figure 49:
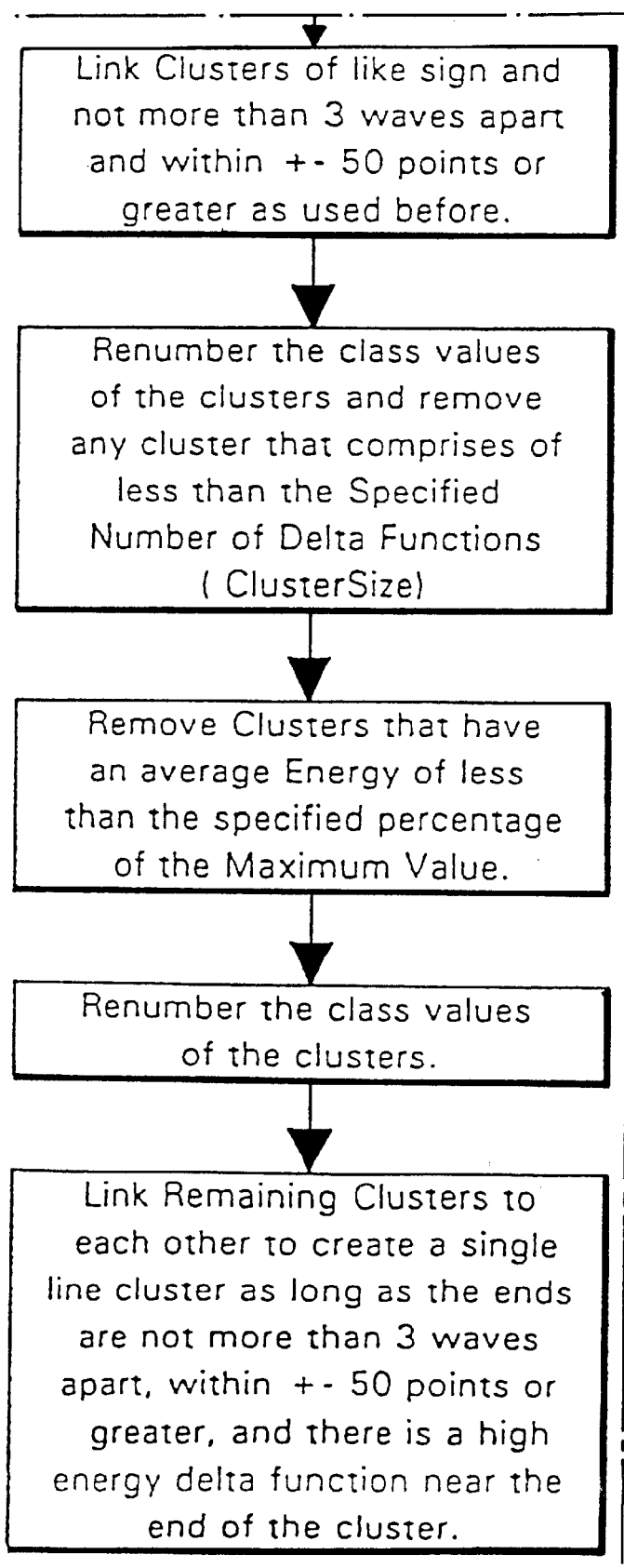
Figure 49:
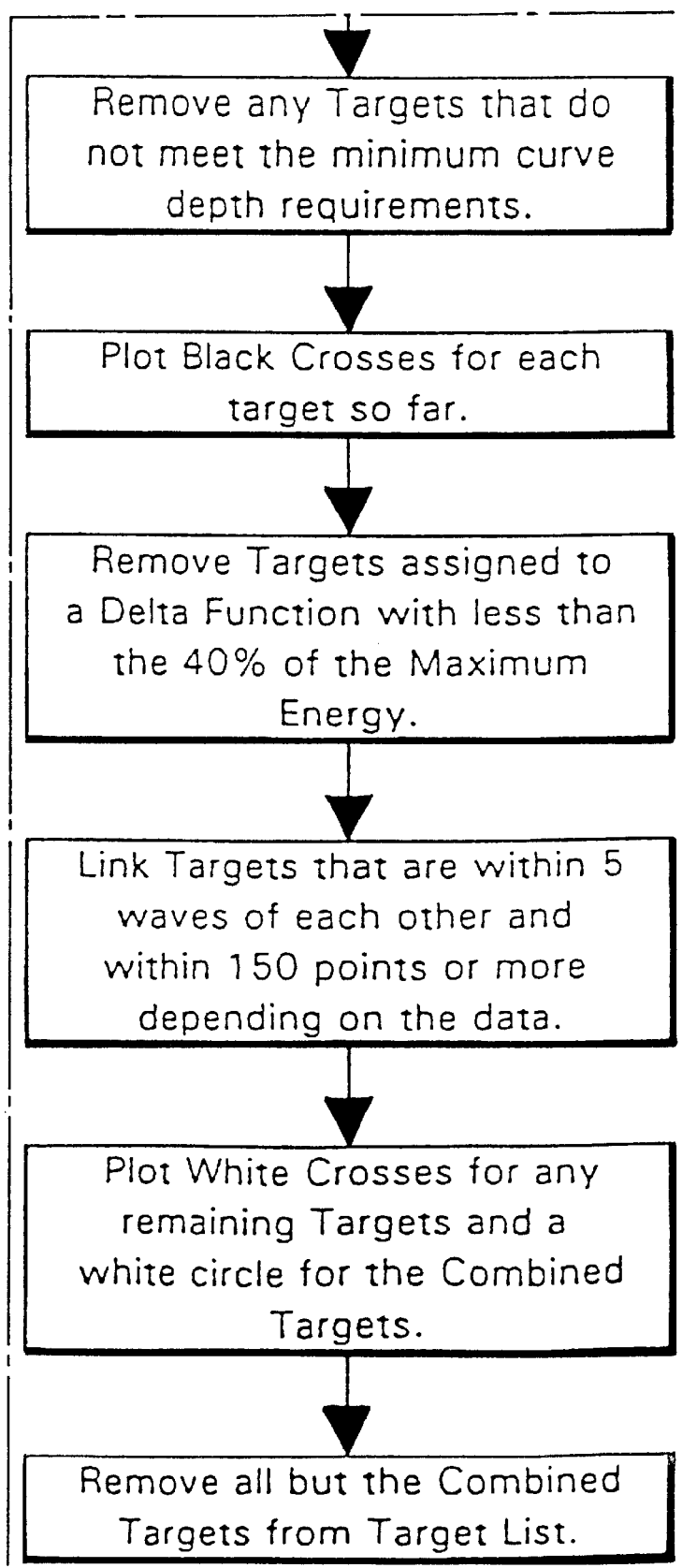
Figure 50I:
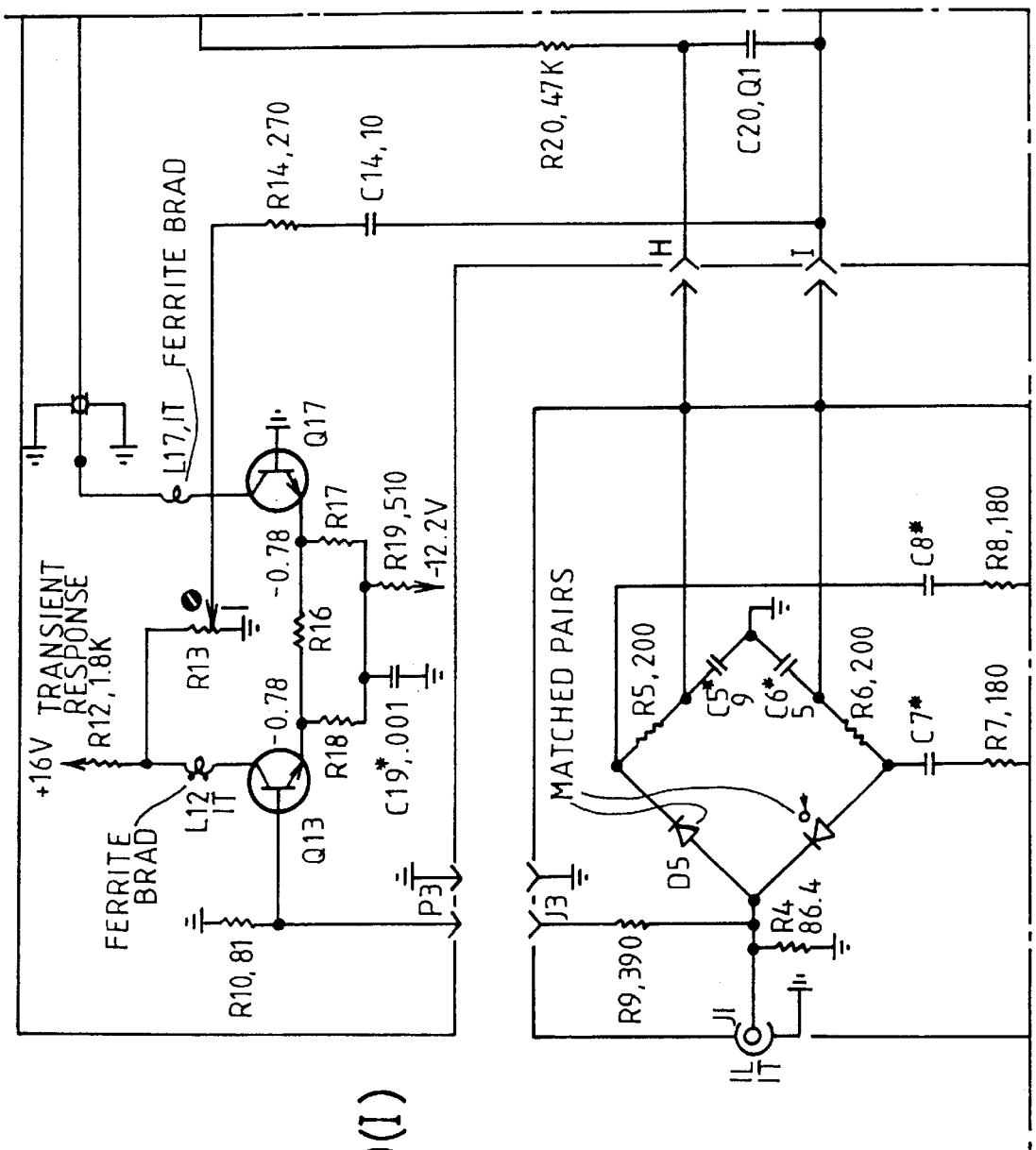
FIG. 50 is an electrical schematic diagram of sampling circuitry for use with the present invention.
Figure 50:
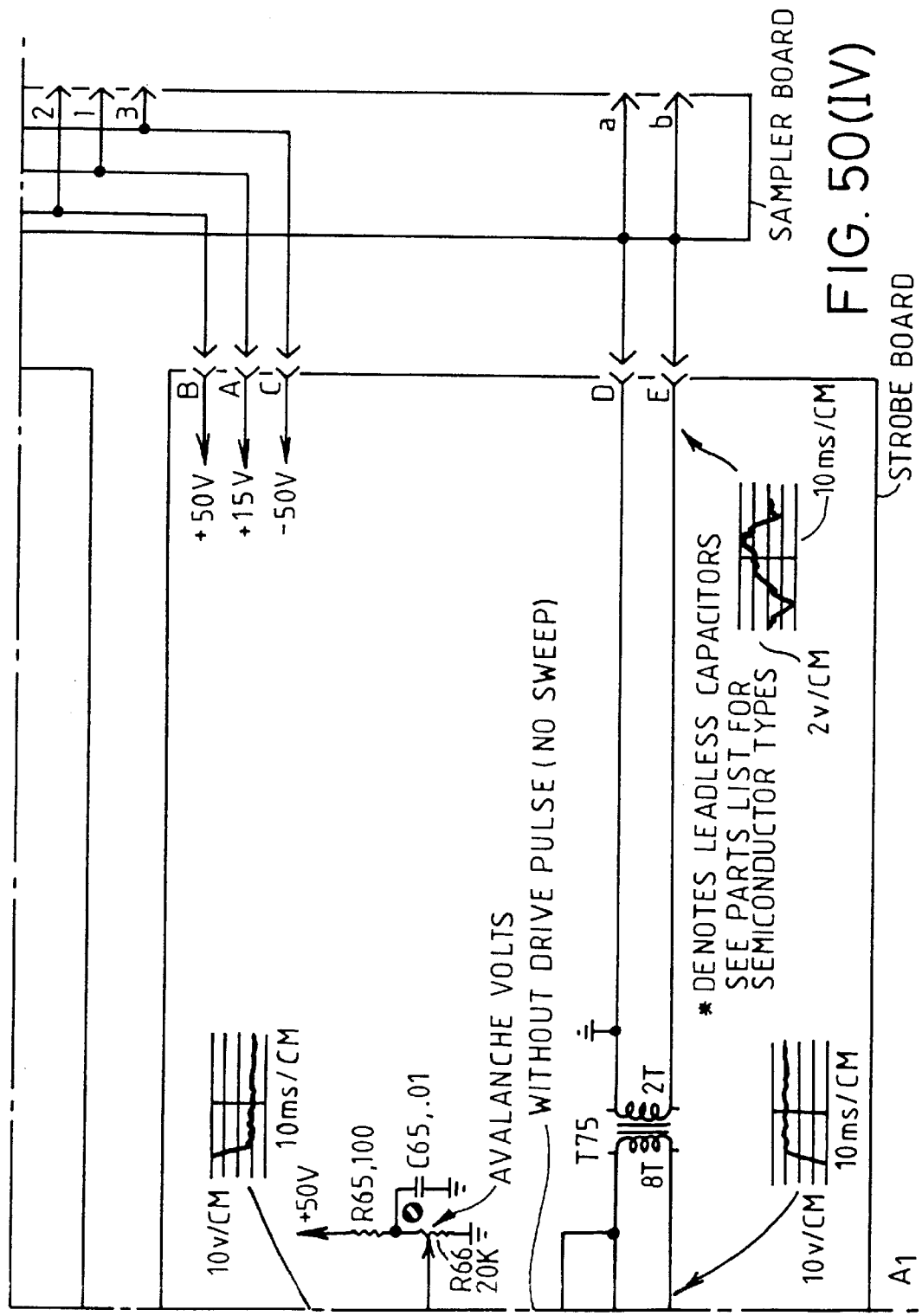
Figure 51A:
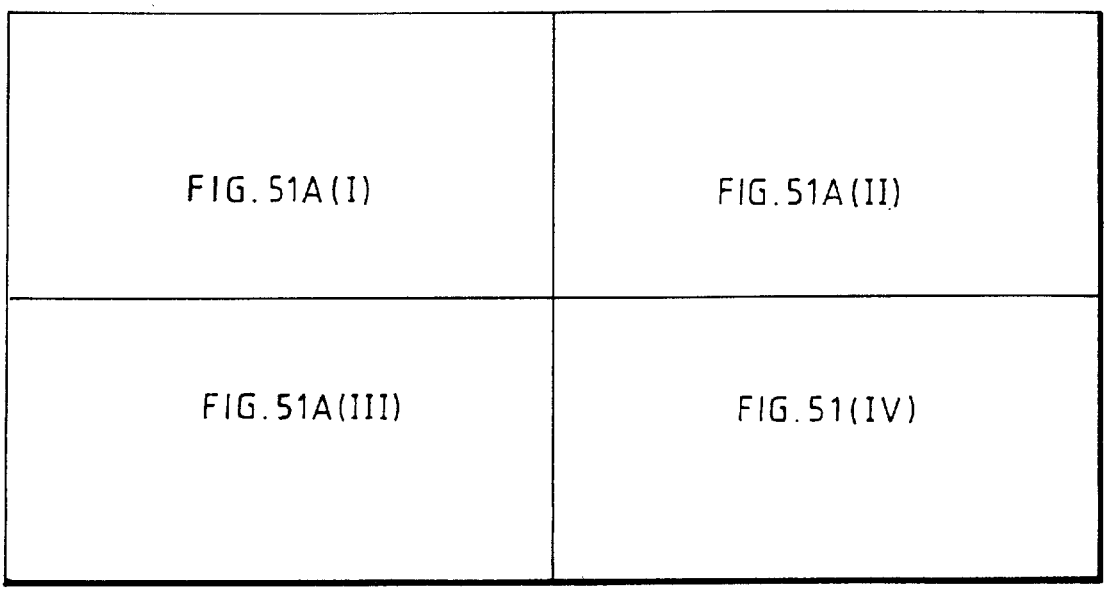
FIGS. 51A and 51B are electrical schematic diagrams, the hardware implementation of which represents a portion of the sampling circuitry for use with the Pipehawk II.
Figure 51B:
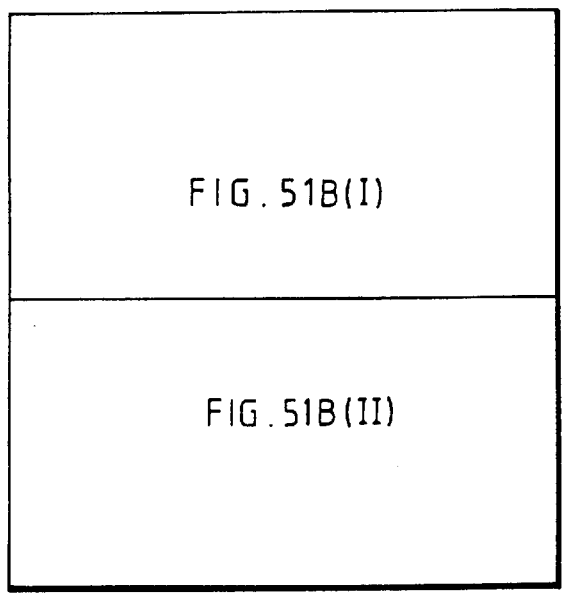
Figure 51A:
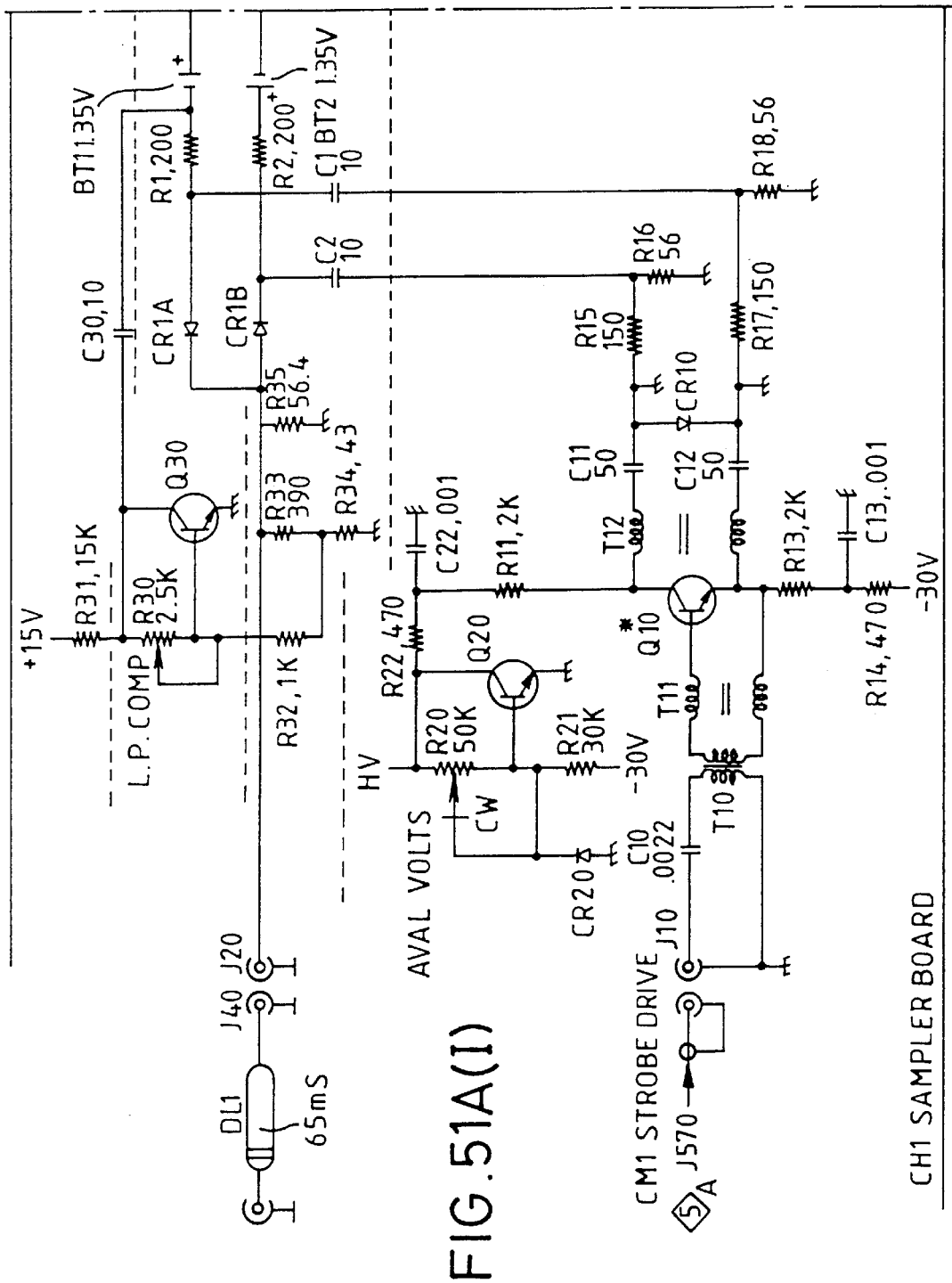
Figure 51B:
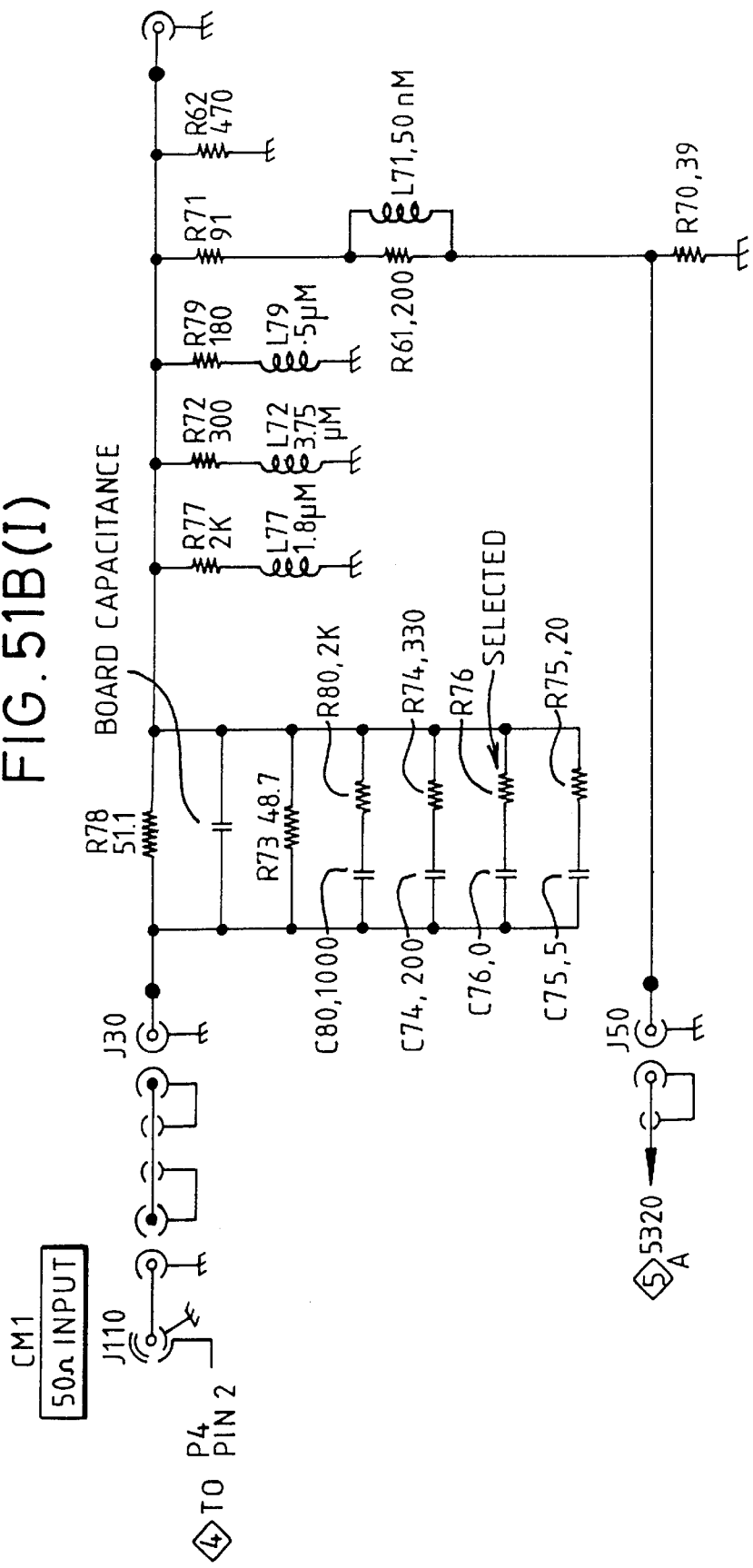
Figure 52:
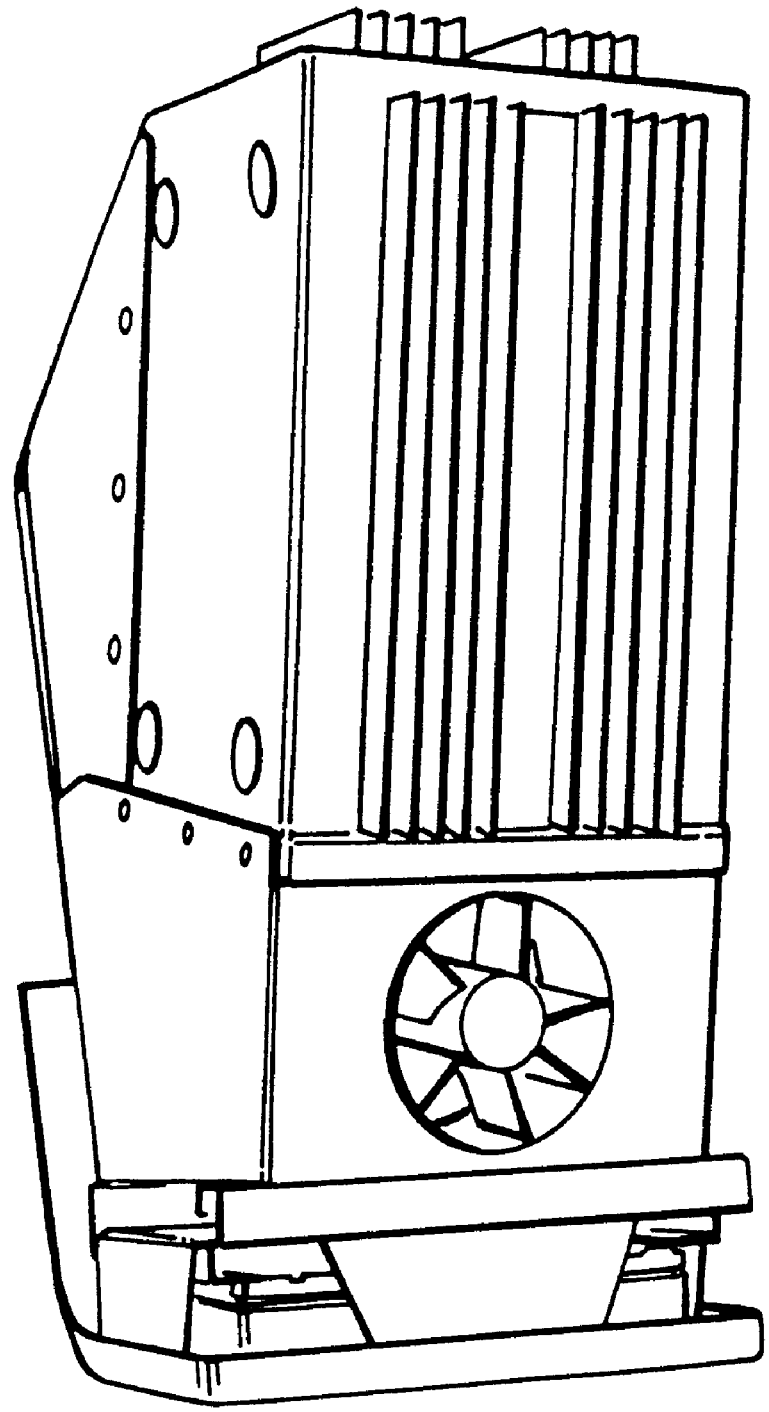
FIG. 52 is a copy of a picture of a prototype of the Pipehawk invention which highlights the backplane.
Figure 53:
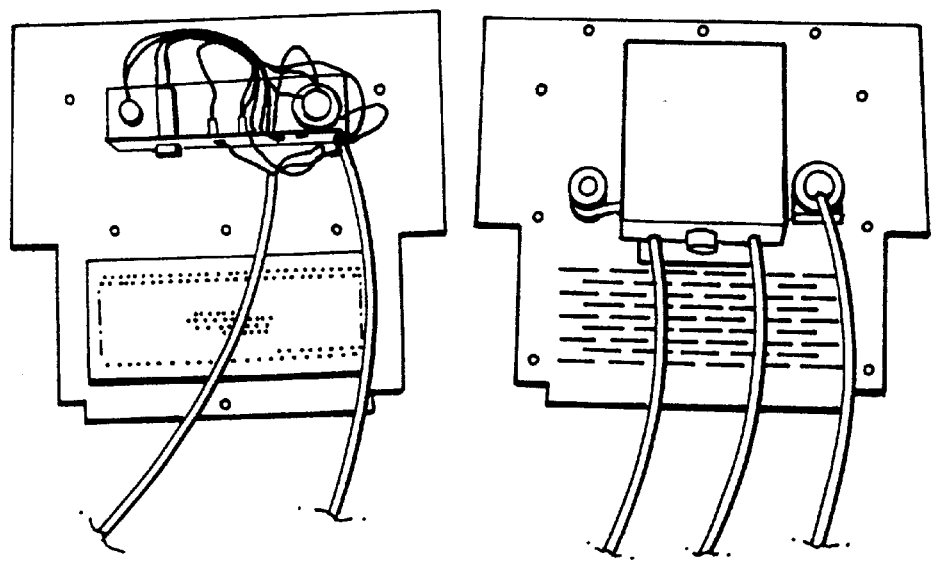
FIG. 53 is a copy of a picture of a prototype of the Pipehawk invention which highlights the data port and power connection.
Figure 54:
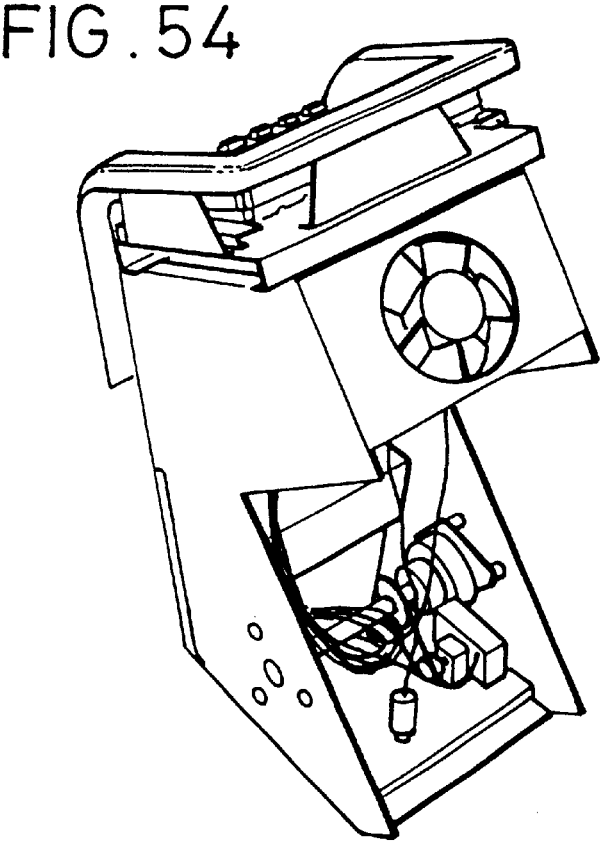
FIG. 54 is a copy of a picture of a prototype of the Pipehawk invention which highlights the housing.
Figure 55:
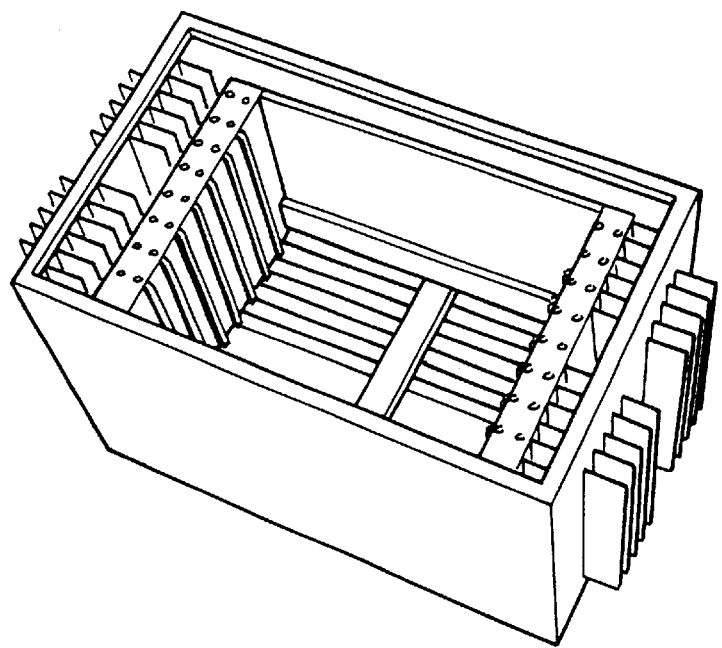
FIG. 55 is a copy of a picture of a prototype of the Pipehawk invention which highlights the system's heat dissipation ability.
Figure 56:
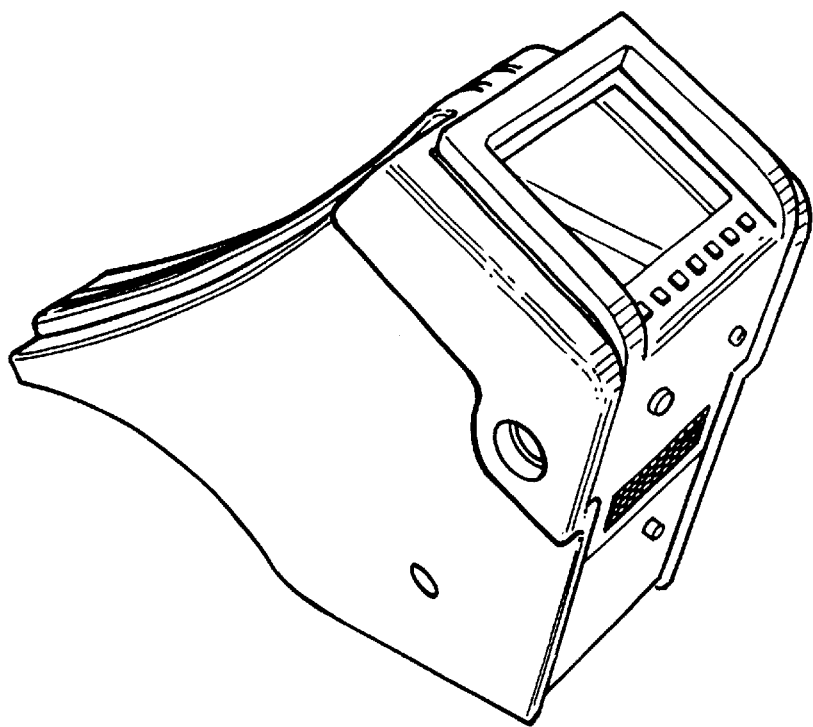
FIG. 56 is a copy of a picture of a prototype of the Pipehawk invention which highlights the system's display.
Figure 58:
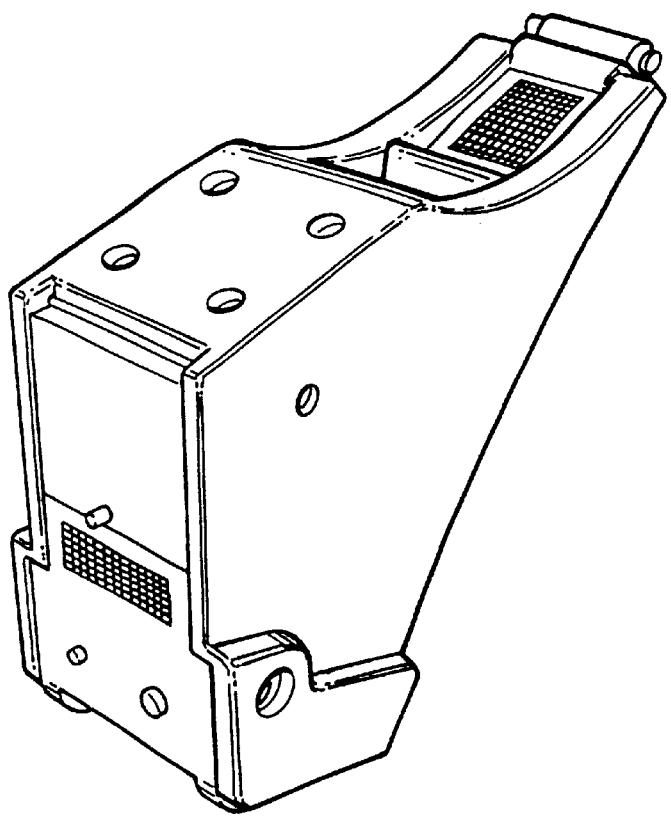
FIGS. 57 and 58 are copies of pictures of a prototype of the Pipehawk invention which highlights the complete housing.
Figure 57:
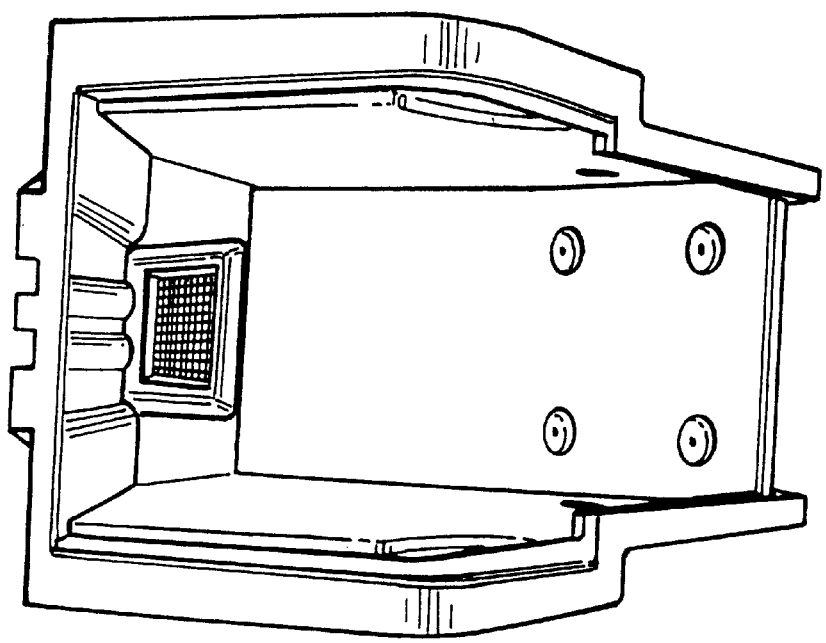

FIG. 49 is a flow diagram describing some of the DSP processing implemented by the present invention. FIG. 50 is an electrical schematic diagram of sampling circuitry for use herein, with FIGS. 51A and 51B shows electrical schematic diagrams of the sampling circuitry. FIG. 52 is a copy of a picture of a prototype of the Pipehawk invention which highlights the backplane; FIG. 53 is a copy of a picture which highlights the data port and power connection; FIG. 54 is a copy of a picture which highlights the housing; FIG. 55 is a copy of a picture which highlights the system's heat dissipation ability; FIG. 56 is a copy of a picture which highlights the system's display; FIGS. 57 and 58 are copies of pictures of a prototype of the Pipehawk invention which highlights the complete housing.

Figure 59A:
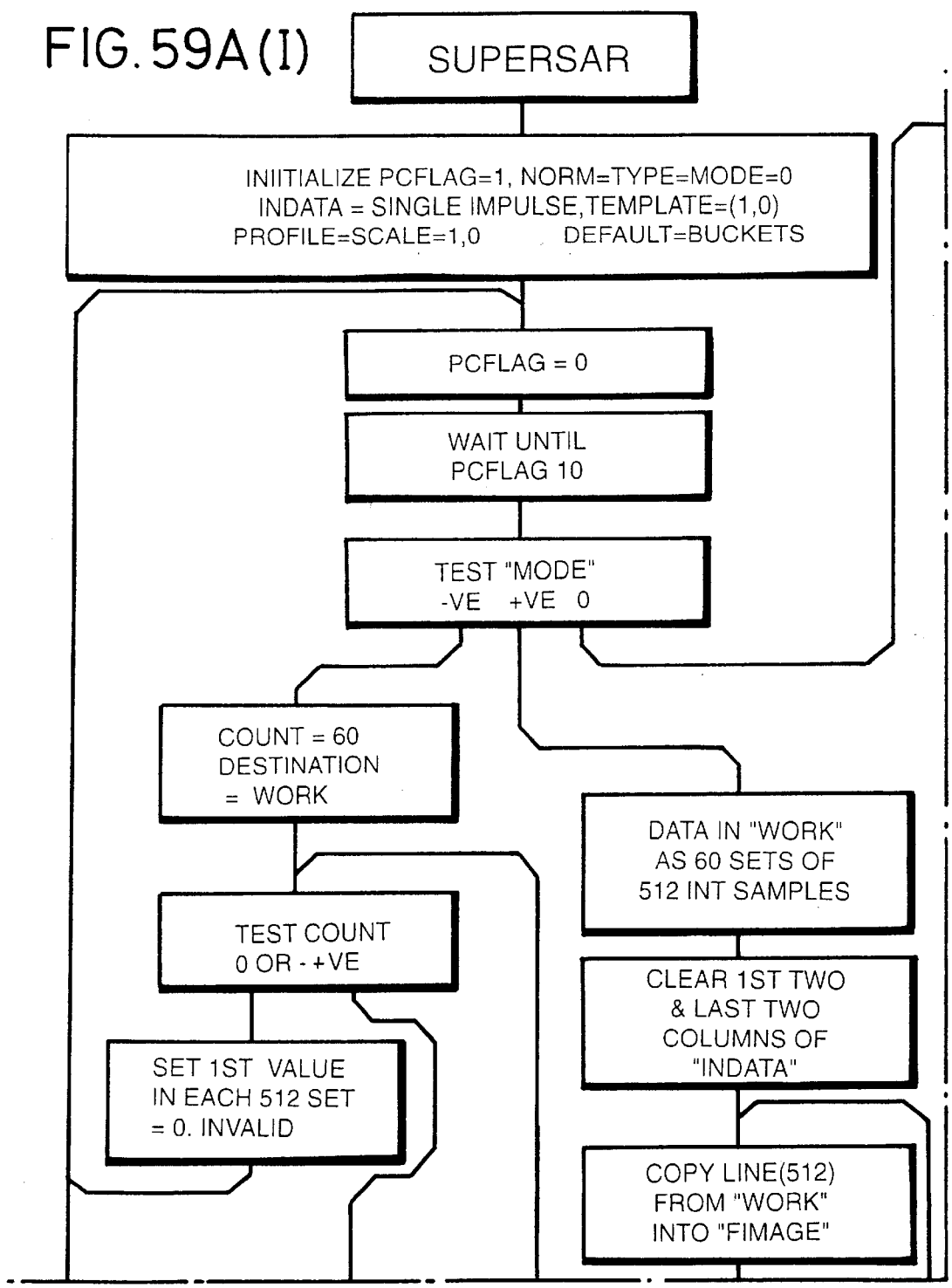
FIGS. 59A and 59B are schematic flow diagrams which together define one embodiment of the super-SAR processing implemented herein.
Figure 59A:
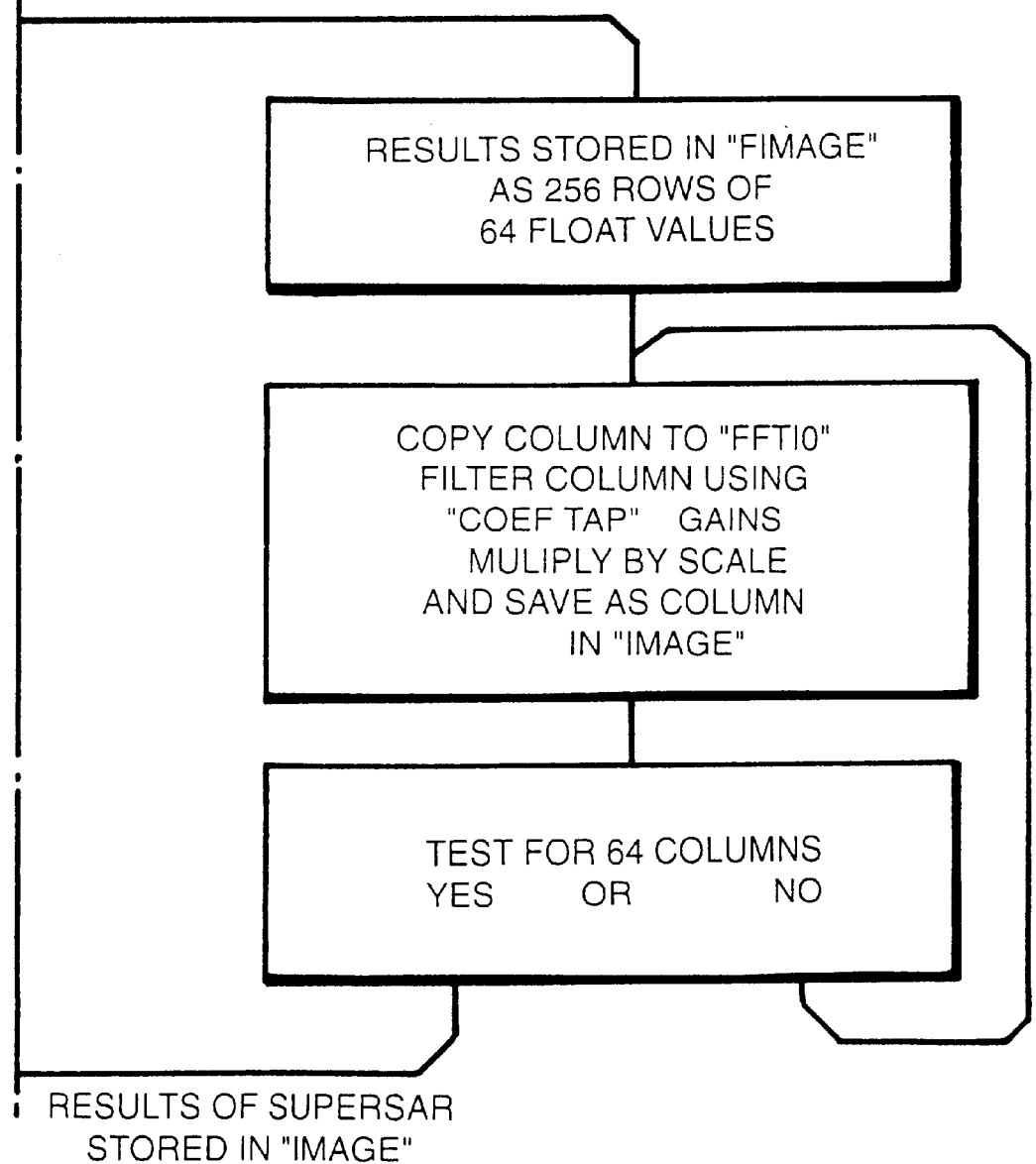
Figure 59B:
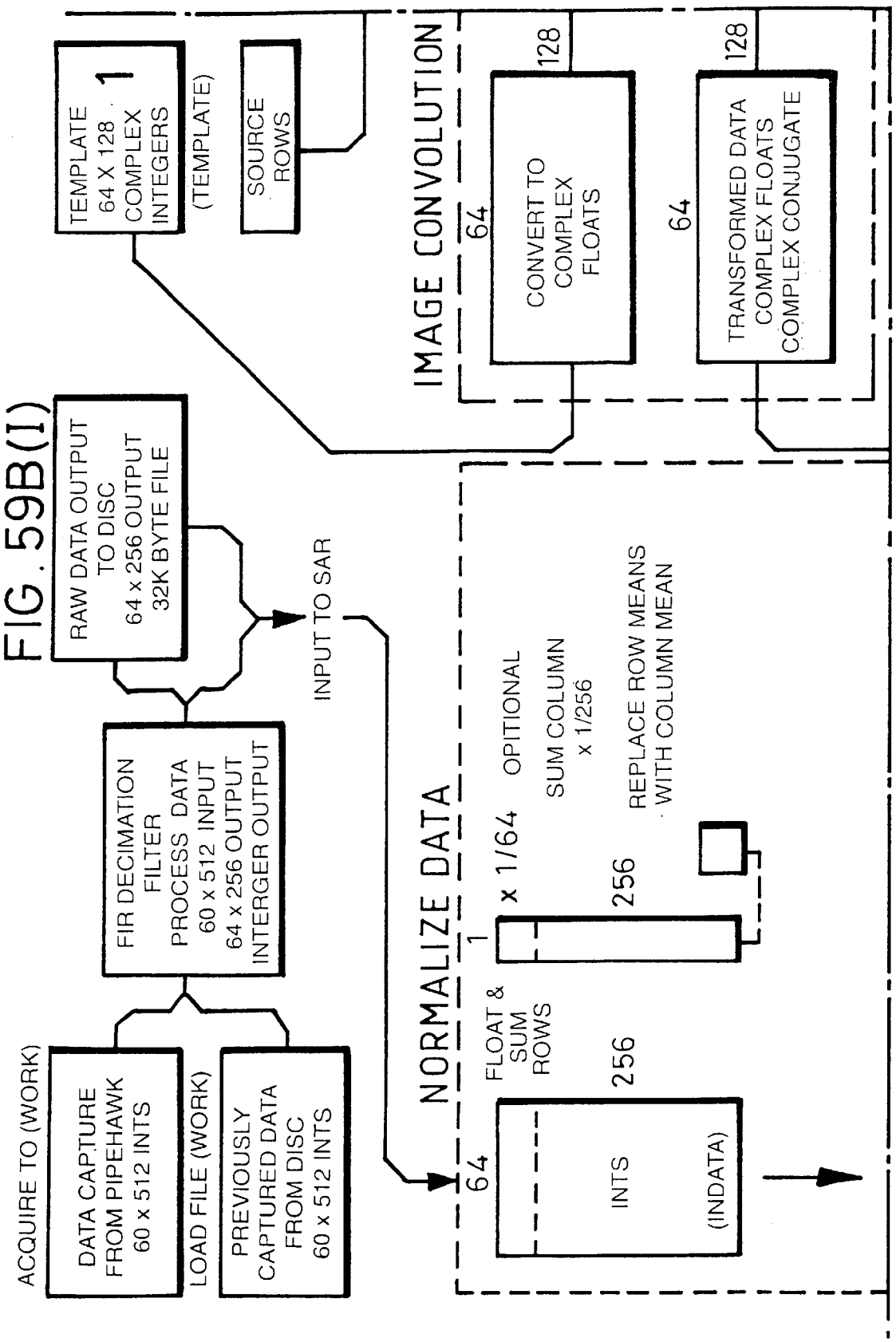

FIGS. 59A and 59B are schematic flow diagrams which together define one embodiment of the super-SAR processing implemented herein. The sampling receiver includes sampling and hold and amplifier circuitry for processing within a bandwidth range of 1.8 to 3 gigahertz. The circuitry highlights a GaAs sampling bridge, and fast slope recovery diodes, as disclosed in FIGS. 50, 51A and 51B.

What has been described herein is merely descriptive of the preferred embodiments of this invention. The description is not meant to, and should not be interpreted as, limiting the scope or spirit thereof

TABLE A

COORDINATE HOLE / FORM DATA

| REF | SIZE / DESCRIPTION | X DM | Y DM | Z DM |
|---|---|---|---|---|
| A1 | THREAD M3 | 3.50 | 3.50 | 0.00 |
| A2 | THREAD M3 | 7.00 | 21.00 | 0.00 |
| A3 | THREAD M3 | 7.00 | 81.00 | 0.00 |
| A4 | THREAD M3 | 3.50 | 90.00 | 0.00 |
| A5 | THREAD M3 | 7.00 | 159.00 | 0.00 |
| A6 | THREAD M3 | 3.50 | 176.50 | 0.00 |
| A7 | THREAD M3 | 66.50 | 176.50 | 0.00 |
| A8 | THREAD M3 | 63.00 | 159.00 | 0.00 |
| A9 | THREAD M3 | 66.50 | 90.00 | 0.00 |
| A10 | THREAD M3 | 63.00 | 81.00 | 0.00 |
| A11 | THREAD M3 | 63.00 | 21.00 | 0.00 |
| A12 | THREAD M3 | 66.50 | 3.50 | 0.00 |
| B1 | THREAD M4 | 3.50 | 12.00 | 0.00 |
| B2 | THREAD M4 | 3.50 | 168.00 | 0.00 |
| B3 | THREAD M4 | 66.50 | 168.00 | 0.00 |
| B4 | THREAD M4 | 66.50 | 12.00 | 0.00 |
| C1 | FORM RADIUS 4.0 | 11.00 | 7.00 | 0.00 |
| C2 | FORM RADIUS 4.0 | 11.00 | 14.07 | 0.00 |
| C3 | FORM RADIUS 4.0 | 7.00 | 18.63 | 0.00 |
| C4 | FORM RADIUS 4.0 | 7.00 | 29.00 | 0.00 |
| C5 | FORM RADIUS 4.0 | 7.00 | 73.00 | 0.00 |
| C6 | FORM RADIUS 4.0 | 7.00 | 83.07 | 0.00 |
| C7 | FORM RADIUS 4.0 | 11.00 | 87.93 | 0.00 |
| C8 | FORM RADIUS 4.0 | 7.00 | 96.93 | 0.00 |
| C9 | FORM RADIUS 4.0 | 7.00 | 151.00 | 0.00 |
| C10 | FORM RADIUS 4.0 | 7.00 | 161.37 | 0.00 |
| C11 | FORM RADIUS 4.0 | 11.00 | 165.93 | 0.00 |
| C12 | FORM RADIUS 4.0 | 11.00 | 173.00 | 0.00 |
| C13 | FORM RADIUS 4.0 | 59.00 | 173.00 | 0.00 |
| C14 | FORM RADIUS 4.0 | 59.00 | 165.93 | 0.00 |
| C15 | FORM RADIUS 4.0 | 63.00 | 161.37 | 0.00 |
| C16 | FORM RADIUS 4.0 | 63.00 | 151.00 | 0.00 |
| C17 | FORM RADIUS 4.0 | 63.00 | 96.93 | 0.00 |
| C18 | FORM RADIUS 4.0 | 59.00 | 87.93 | 0.00 |
| C19 | FORM RADIUS 4.0 | 63.00 | 83.07 | 0.00 |
| C20 | FORM RADIUS 4.0 | 63.00 | 73.00 | 0.00 |
| C21 | FORM RADIUS 4.0 | 63.00 | 29.00 | 0.00 |
| C22 | FORM RADIUS 4.0 | 63.00 | 18.63 | 0.00 |
| C23 | FORM RADIUS 4.0 | 59.00 | 14.07 | 0.00 |
| C24 | FORM RADIUS 4.0 | 59.00 | 7.00 | 0.00 |
| D1 | HOLE GROUP SEE DETAIL | 0.00 | 51.00 | 33.55 |
| D2 | HOLE GROUP SEE DETAIL | 0.00 | 128.00 | 33.55 |
| E1 | HOLE GROUP SEE DETAIL | 0.00 | 51.00 | 13.70 |
| F1 | SLOT DETAIL | 7.00 | 38.25 | 0.00 |
| F1 | SLOT DETAIL | 7.00 | 63.75 | 0.00 |

What is claimed is:

1. A ground-probing radar system, comprising:
an antenna module including at least one dipole element;
a transmit/receive sub-system electrically coupled to said antenna module, said system including structure for generating a radar signal and transferring the signal to said antenna module for radiation into the ground, and receiving a portion of the radar signal reflected therefrom;

a digital signal processing sub-system electronically connected to said transmit/receive system comprising structure for processing said received portion of said reflected radar signal to extract raw data corresponding to detected differences in dielectric constant in the ground as a function of spatial variance in three dimensions, and generating display data therefrom;

a positioning sub-system electrically connected to said master controller for maintaining the exact ground location of said radar system and generating location data therefrom;

wherein the digital signal processor sub-system is controlled to input and process raw data, in accordance with location data and display data such that underground composition may be identified and mapped, wherein the structure for processing said received portion of said reflected radar signal uses synthetic aperture radar processing, dependent on the dielectric constant of the ground, and wherein the dielectric constant of the ground is determined by comparing the raw data with memory-stored expected responses from a buried object for a plurality of discrete depths and over a first range of dielectric constants, and wherein a second narrower range of dielectric constants is selected based on the comparison, the best matching dielectric being selected from the second range.

2. The radar system of claim 1, wherein said antenna module, said transmit/receive sub-system and said digital signal processing sub-system operate as a single-channel system.

3. The radar system of claim 1, wherein said digital signal processing sub-system structure extracts hyperbolic object data from said raw data.

4. The RADAR system of claim 3, wherein said digital signal processing sub-system structure performs cluster processing on said raw data to generate said hyperbolic object data.

5. The RADAR system of claim 4, wherein said digital signal processing sub-system structure performs a Hough transform on said object data to extract linear features of detected objects therefrom.

6. The RADAR system of claim 3, wherein said digital signal processing sub-system structure includes an AT&T DSP 326 processor.

7. (amended) The radar system of claim 1, wherein the master controller includes an Intel 80486 processor.

8. The radar system of claim 1, wherein said display system includes a transflective display.

9. The radar system of claim 1, wherein said data storage mechanism includes a hard disc and hard disc controller.

10. The radar system of claim 1, wherein said user interface includes a set of softkeys, a softkey controller and a medium for storing a set of instructions for defining operation of said softkey controller.

11. The RADAR system of claim 1, further comprising a communications port for communicating said display data to electronic means.

12. The RADAR system of claim 11, wherein said port is connected to a CAD/CAM system.

13. The radar system of claim 1, wherein said transmit/receive sub-system includes a sampling head utilizing pulse-signal shaping.

14. The radar system of claim 1, further including mechanical means connected to said antenna module, the mechanical means being provided for rotating said at least one dipole element to define a scanning profile.

15. The radar system of claim 1, further comprising a ruggedly constructed cart including a main body housing.

16. The RADAR system of claim 15, wherein said main body housing includes a one piece rotational housing with a control panel.

17. The RADAR system of claim 15, wherein said cart includes a set of wheels and a handle for pushing said cart.

18. The RADAR system of claim 17, wherein said wheels communicate position data to said positioning sub-system.

19. The RADAR system of claim 15, wherein said antenna module is mounted on said housing with a compliant hinge.

20. The RADAR system of claim 19, wherein said antenna module includes a sacrificial wear membrane.

21. The RADAR system of claim 15, wherein said housing acts as a platform for said display sub-system.

22. The RADAR system of claim 15, wherein said housing includes system cooling means.

23. The RADAR system of claim 22, wherein said system cooling means includes at least one cooling for having at least one vent for exhausting air.

24. The radar system claim 1, wherein said transmit/receive sub-system generates a fast risetime electromagnetic pulse signal.

25. The RADAR system of claim 24, wherein said signal has a peak amplitude of around fifty (50) volts and a time constant of around one nanosecond (10–9 sec.).

26. The RADAR system of claim 15, wherein said housing includes an electronics module, rear panel module, battery module, reset panel, cooling fan module and wheel sensor module.

27. The radar system of claim 1, wherein said antenna module includes at least one delay coil.

28. The radar system of claim 1, wherein said antenna module includes at least two dipole elements.

29. The RADAR system of claim 28, wherein said transmit/receive sub-system and said digital signal processing sub-system operate in conjunction with said antenna module and said microcontroller for two-channel operation.

30. The RADAR system of claim 29, wherein said digital signal processing sub-system structure utilizes a synthetic aperture RADAR processing which isolates and uses the dielectric constant of the medium of operation and focuses hyperbolic object data to a single port based thereon.

31. The RADAR system of claim 28, wherein said two-channel system operates four data channels to allow co-channel data processing.

32. The RADAR system of claim 31, further comprising two antenna modules and wherein said transmit/receive sub-system includes two transmitters and two receivers.

33. The RADAR system of claim 32, wherein said two antenna modules are mounted on a single rotating shaft for rotation of areas of interest.

34. The radar system of claim 1, wherein the system is housed in a hand-held mechanical structure.

35. The radar system of claim 34, wherein said system includes mechanical structure to house and support said system in a form of a moving vehicle.

36. The Radar system of claim 28, wherein said antenna module includes a resistively loaded antenna element, comprising an elongate strip of sheet material, which sheet has, over its area, a uniform electrical resistance, the width of said strip being varied along its length in order to provide a desired resistive loading of the antenna element.

37. The radar system of claim 36, wherein said sheet material of said antenna element comprises a synthetic plastics substrate having deposited thereon a coating of electrically resistive material.

38. The RADAR system of claim 37, wherein the surface electrical resistance of said coating of said antenna element is from 10–20 ohms per square.

39. The radar system of claim 36, wherein said elongate strip of said antenna element is at least partly of triangular form and has an electrically conductive contact area provided across the wider end of the strip.

40. The radar system of claim 39, wherein said strip of said antenna element comprises a section of rectangular configuration located between said contact area and the wider end of the triangular part of the strip.

41. The radar system of claim 39, wherein said contact area of said antenna element is of V-shaped configuration.

42. The radar system of claim 36, wherein said antenna module comprises at least one pair of resistively loaded antenna elements connected to form a dipole.

43. The RADAR system of claim 42, comprising two pairs of said elements arranged as a crossed dipole.

44. The radar system of claim 42, wherein each of said elements is folded upon itself.

45. The radar system of claim 44, wherein each of said elements has an upper portion terminating in said contact areas and housed in one limb of a support of cruciform section the center portion of which support accommodates electrical conductors coupled to the contact areas of elements extending within respective limbs of said support, and further has a lower portion extending below the corresponding limb and being resiliently deformable to conform to a surface in contact therewith.

46. The RADAR system of claim 28, wherein said antenna module includes elements which are disposed on a circumferential surface of a body of generally circular cross-section, said body being mounted for rotation to enable it to be rolled over a surface.

47. The RADAR system of claim 46, wherein said antenna elements of said array are coupled to an input and/or output via a commutating means associated with the rotary mounting of said body, whereby only antenna elements or elements having a predetermined orientation relatively to said mounting are coupled to said input and/or output.

48. The radar system of claim 46, wherein said body is provided with a replaceable ablative layer.

49. The radar system of claim 46, wherein said body comprises a hollow drum having a peripheral surface of dielectric material which is transparent to, or presents a relatively low loss to, a radar signal, and said antenna elements are disposed on the internal surface of said drum.

50. The RADAR system of claim 49, wherein said drum contains electronic apparatus coupled to said antenna elements, and wherein said drum incorporates anechoic cavities between the antennae and said apparatus to provide for absorption of radiation transmitted or reflected in a direction from the periphery of the drum towards said apparatus.

51. The Radar system of claim 13, wherein said sampling head includes a GaAs sampling bridge and fast step recovery diodes such that sampling may be accomplished in a range of from about 1.8 to 3 Ghz.

52. The radar system of claim 1, wherein the system further comprises:

a master controller electrically connected to said digital signal processor sub-system for controlling operation of said radar system, including system data flow control;

a display sub-system electrically connected to said master controller for displaying said display data;

a user interface comprising structure enabling a user to communicate with said master controller thereby affecting system processing operating parameters; and a data storage mechanism electrically connected to said master controller for storing raw data, display data and said operating parameters.

53. A RADAR antenna system comprises an array of antenna elements disposed over an endless surface, said endless surface being mounted for movement over another surface by circulation whereby each antenna element is brought in its turn into close proximity with said other surface.

* * * * *